US011843766B2

(12) United States Patent
Iwamura et al.

(10) Patent No.: US 11,843,766 B2
(45) Date of Patent: *Dec. 12, 2023

(54) IMAGE ENCODING DEVICE, IMAGE DECODING DEVICE, AND PROGRAM THEREOF

(71) Applicant: NIPPON HOSO KYOKAI, Tokyo (JP)

(72) Inventors: Shunsuke Iwamura, Tokyo (JP); Atsuro Ichigaya, Tokyo (JP); Shinichi Sakaida, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/860,421

(22) Filed: Apr. 28, 2020

(65) Prior Publication Data

US 2020/0260073 A1 Aug. 13, 2020

Related U.S. Application Data

(63) Continuation of application No. 15/899,130, filed on Feb. 19, 2018, now Pat. No. 10,681,346, which is a
(Continued)

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/117* (2014.11); *H04N 19/12* (2014.11);
(Continued)

(58) Field of Classification Search
CPC .... H04N 19/105; H04N 19/117; H04N 19/12; H04N 19/147; H04N 19/176;
(Continued)

(56) References Cited

U.S. PATENT DOCUMENTS 5,237,410 A * 8/1993 Inoue ................. H04N 19/14
375/E7.218
8,681,872 B2 3/2014 Sasai et al.
(Continued)

FOREIGN PATENT DOCUMENTS

EP 1404136 A1 3/2004
JP 2011-066569 A 3/2011
(Continued)

OTHER PUBLICATIONS

Ichigaya et al., ("Video coding technology proposal by NHK and Mitsubishi": JCT-VC meeting; Apr. 15, 2010-Apr. 23, 2010; Dresden; (JointCollaborative Team on Video Coding of ISO/IEC JTC1/SC29/WG11 and ITU-TSG.16); URL: http://wftp3.itu.int/av-arch/jctvc-site/, Apr. 18, 2010) (Year: 2010).*

(Continued)

*Primary Examiner* — Howard D Brown, Jr.
(74) *Attorney, Agent, or Firm* — Studebaker & Brackett PC

(57) ABSTRACT

An image encoding device for block-dividing and encoding an original image of a frame unit constituting a moving image is disclosed that includes a predictor circuitry configured to generate a predicted image, a weighted average processor configured to generate a block of a new predicted image, a prediction residual signal generator circuitry configured to calculate an error of each prediction signal of the block of the predicted image and to generate a prediction residual signal, a sub-block divider circuitry configured to divide the prediction residual signal configured to divide the predict residual signal, and a transformation selection applier circuitry configured to selectively apply a plurality of types of transformation processes for a divided sub-block of the prediction residual signal.

2 Claims, 28 Drawing Sheets

Related U.S. Application Data continuation of application No. PCT/JP2016/074293, filed on Aug. 19, 2016.

(51) Int. Cl.

| | | |
|---|---|---|
| *H04N 19/147* | (2014.01) | |
| *H04N 19/625* | (2014.01) | |
| *H04N 19/12* | (2014.01) | |
| *H04N 19/593* | (2014.01) | |
| *H04N 19/46* | (2014.01) | |
| *H04N 19/124* | (2014.01) | |
| *H04N 19/44* | (2014.01) | |
| *H04N 19/117* | (2014.01) | |
| *H04N 19/61* | (2014.01) | |

(52) U.S. Cl.
CPC ......... *H04N 19/124* (2014.11); *H04N 19/147* (2014.11); *H04N 19/176* (2014.11); *H04N 19/45* (2014.11); *H04N 19/46* (2014.11); *H04N 19/593* (2014.11); *H04N 19/619* (2014.11); *H04N 19/625* (2014.11)

(58) Field of Classification Search
CPC .... H04N 19/46; H04N 19/593; H04N 19/619; H04N 19/625
See application file for complete search history.

(56) References Cited

U.S. PATENT DOCUMENTS

| | | | |
|---|---|---|---|
| 9,277,245 B2 | 3/2016 | Sole et al. | |
| 2004/0005004 A1* | 1/2004 | Demos | H04N 19/187 375/E7.22 |
| 2004/0008782 A1* | 1/2004 | Boyce | H04N 19/197 375/E7.211 |
| 2008/0013839 A1* | 1/2008 | Kimura | H04N 19/44 382/233 |
| 2008/0089417 A1* | 4/2008 | Bao | H04N 19/523 375/E7.176 |
| 2011/0069752 A1* | 3/2011 | Watanabe | H04N 19/86 375/240.03 |
| 2012/0128068 A1* | 5/2012 | Thoreau | H04N 19/46 375/E7.243 |
| 2013/0077884 A1* | 3/2013 | Ikai | G06T 9/004 382/233 |
| 2013/0094581 A1* | 4/2013 | Tanizawa | H04N 19/103 375/240.12 |
| 2013/0336393 A1* | 12/2013 | Matsumura | H04N 19/117 375/240.03 |

FOREIGN PATENT DOCUMENTS

| | | | |
|---|---|---|---|
| JP | 2011-205602 A | 10/2011 | |
| JP | 2013-522957 A | 6/2013 | |
| JP | 2014-036278 A | 2/2014 | |
| WO | 2008/048489 A2 | 4/2008 | |
| WO | WO 2011/112239 A1 | 9/2011 | |

OTHER PUBLICATIONS

An, J. et al., "Non-CE7: Boundary-Dependent Transform for Inter-Predicted Residue", *Joint Collaborative Team on Video Coding (JCT-VC) of ITU-T SG16 WP3 and ISO/IEC JTC1/SC29/WG11*, 7th Meeting: Geneva, CH, Nov. 21-30, 2011, 11 pages.

Ichigaya, A. et al., "Inter Coding With Orthogonal Transforms Derived from DCT", *NHK Science and Technology Research Laboratories, ITE Annual Convention*, 2012, 2 pages (included English language abstract).

Zheng, W. et al., "Analysis of Space-Dependent Characteristics of Motion-Compensated Frame Differences Based on a Statistical Motion Distribution Model", *D-II*, vol. J84, No. 9, 2001, pp. 2001-2010. * See Reference A6 for English language translation.

Zheng, W. et al., "Analysis of Space-Dependent Characteristics of Motion-Compensated Frame Differences Based on a Statistical Motion Distribution Model", *IEEE Transactions on Image Processing*, vol. 11, No. 4, Apr. 2002, pp. 377-386.

International Search Report, and English language translation thereof, in corresponding International Application No. PCT/JP2016/074293, dated Nov. 8, 2016, 5 pages.

Ichigaya (NHK) et al., "Video coding technology proposal by NHK and Mitsubishi" 1. JCT-VC Meeting; Apr. 15-23, 2010; Dresden; (Joint Collaborative Team on Video Coding of ISO/IEC JTC/SC29/WG11 and ITU-TSG.16); obtained from the Internet at URL: <http://wftp3.itu.int/av-arch/jctvc-site/>, No. JCTVC-A122, dated Apr. 18, 2010, XP030007569, 42 pages.

Rose et al., "DCT/DST Alternate-Transform Image Coding", IEEE Transactions on Communications, dated Jan. 1, 1990, pp. 94-101, XP055297931, DOI: 10.1109/26.46533, obtained from the Internet at URL: <http://ieeexplore.ieee.org/ielx1/26/1757/00046533.pdf?tp=&arnumber=46533&isnumber=1757>, 8 pages.

Shun-Ichi Sekiguchi et al., "A Novel Video Coding Scheme for Super Hi-Vision", Picture Coding Symposium 2010; Dec. 8-12, 2010, Nagoya, dated Dec. 8, 2010, XP030081994, 4 pages.

Extended European Search Report in Europe Application No. 16837189.6, dated Feb. 18, 2019, 12 pages.

Office Action in China Application No. 201680053613.9, including English translation, dated Nov. 20, 2019, 8 pages.

Rajan Joshi et al., High Efficiency Video Coding (HEVC) Screen Content Coding Draft 1, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, dated Sep. 27, 2014, 6 pages.

Francois Pasteau et al., Adaptive Color Decorrelation for Predictive Image Codecs, European Signal Processing Conference, EUSIPCO, Aug. 2011, Barcelona, Spain, pp. 1-5, dated Sep. 2, 2011, 6 pages.

First Office Action in India Application No. 201827006152, dated Feb. 27, 2020, 6 pages.

* cited by examiner

INTER PREDICTION

INTRA BLOCK COPY PREDICTION

CROSS COMPONENT SIGNAL PREDICTION

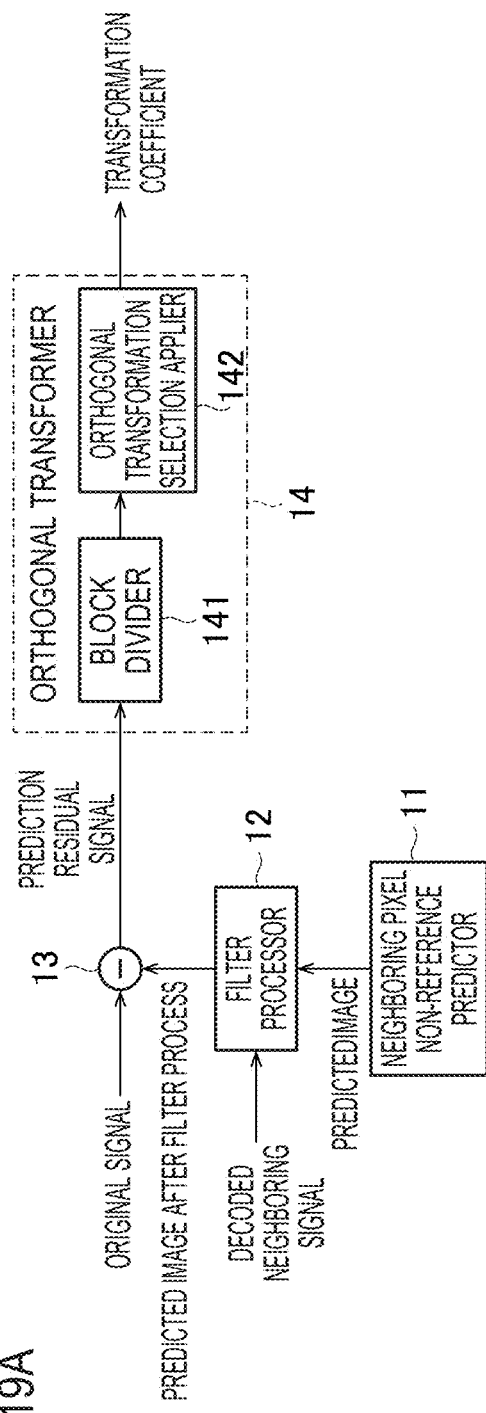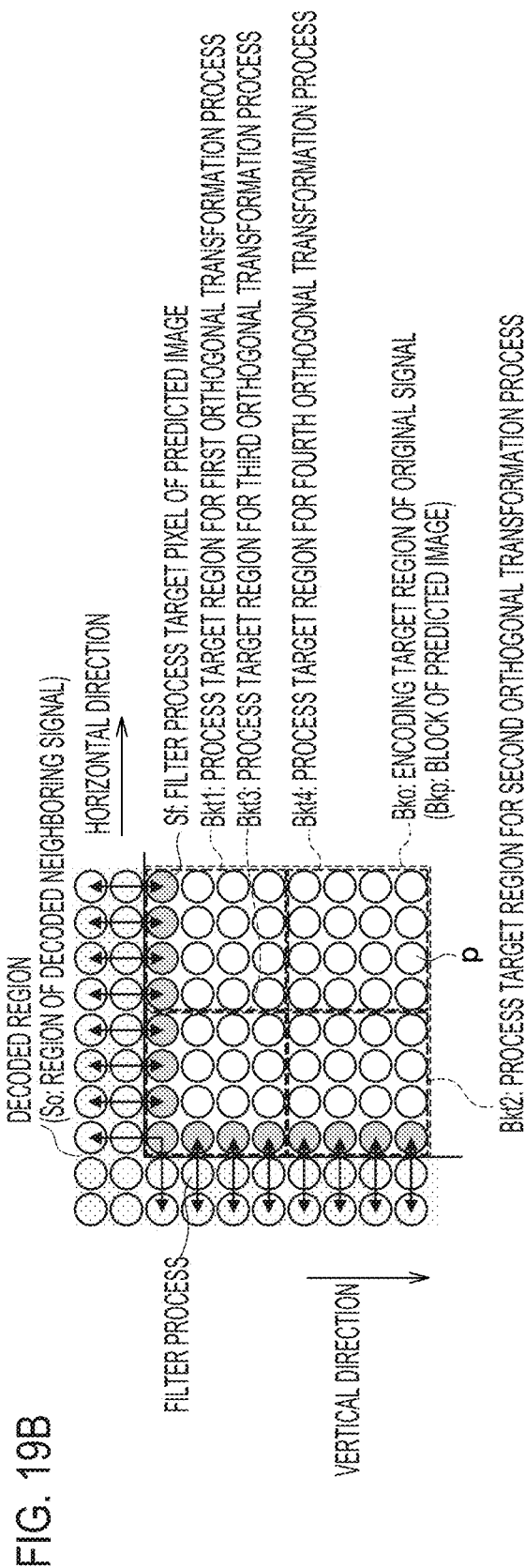

BLOCK DIVISION EXAMPLE

LONGITUDINAL DST APPLICATION BLOCK

TRANSVERSE DST APPLICATION BLOCK

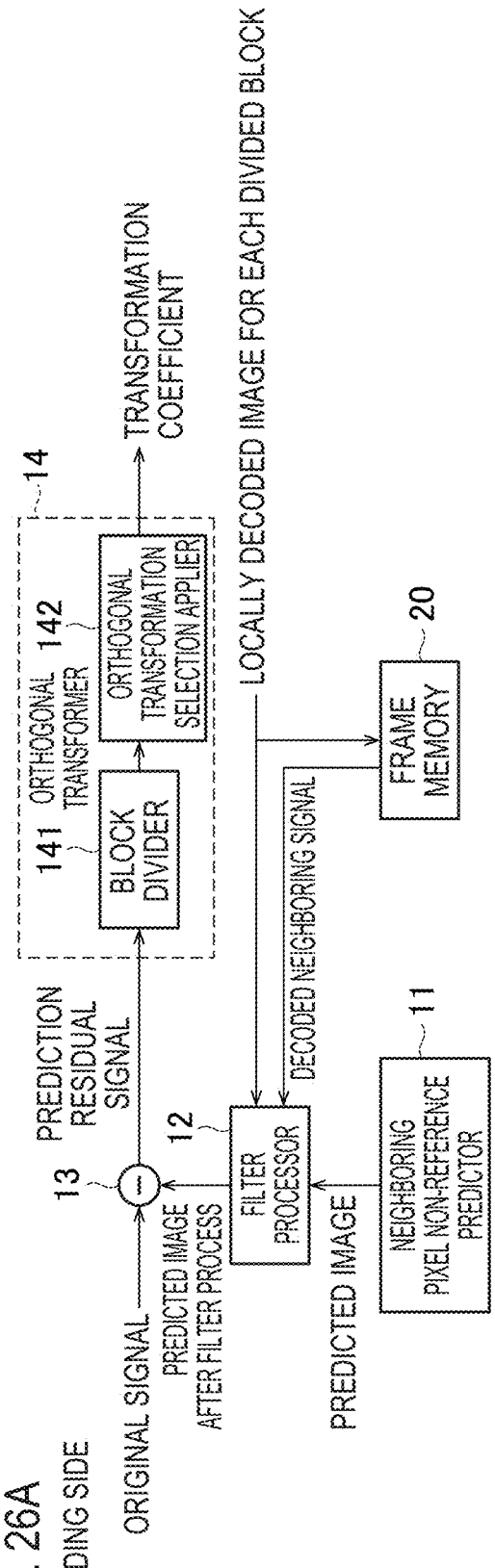
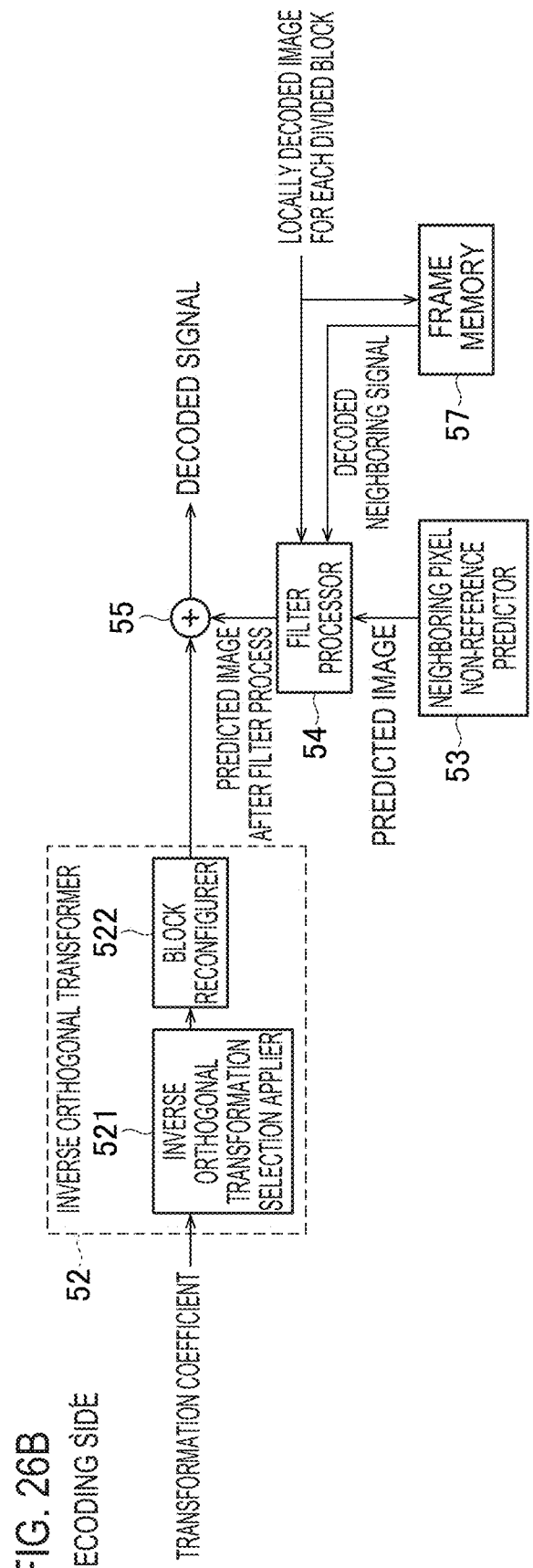
FIG. 26A ENCODING SIDE
FIG. 26B DECODING SIDE

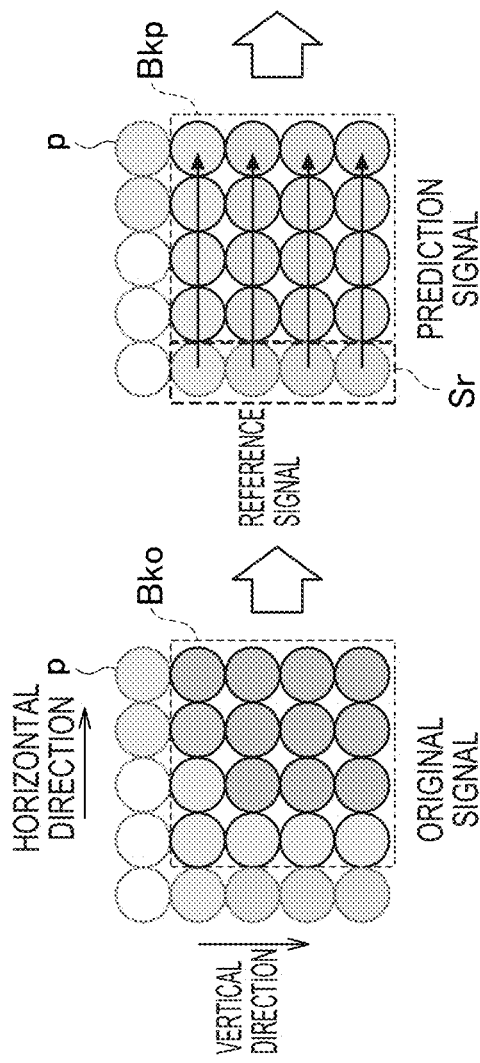

IMAGE ENCODING DEVICE, IMAGE DECODING DEVICE, AND PROGRAM THEREOF

RELATED APPLICATIONS

This application is a continuation of and claims priority to U.S. patent application Ser. No. 15/899,130, filed on Feb. 19, 2018, which is a continuation of PCT/JP2016/074293 filed on Aug. 19, 2016, which claims priority to Japanese Application Nos. 2015-163259, 2015-163257 and 2015-163260, all filed on Aug. 20, 2015. The entire contents of these applications are incorporated herein by reference.

BACKGROUND OF THE INVENTION

1. Field of the Invention

The present disclosure relates to an image encoding device, an image decoding device, and a program thereof, which are applicable to a video encoding method such as MPEG-2, AVC/H.264, MPEG-H, HEVC/H.265, or the like.

2. Description of the Related Art

Generally, it is known that an image signal has a high signal correlation between neighboring pixels, regardless of a still image and a moving image. By using this property, for example, two prediction modes of an intra-prediction and an inter-prediction are prepared in a video encoding method such as MPEG-2, AVC/H.264, MPEG-H, or HEVC/H.265. The intra-prediction is a technique for performing signal prediction only by signals in an encoded frame, and performs a DC prediction, a Planer prediction, or a directional prediction with respect to pixel signals (original signals) in an encoding target block of an original image by using pixel signals of encoded and decoded blocks neighboring to a left side or an upper side of the encoding target block, and generates a block of a predicted image including pixel signals (prediction signals) predicted by extrapolation. In this way, the pixel signals in the encoding target block are efficiently predicted by using the pixel signals of the decoded block neighboring to the encoding target block.

For example, a property of a prediction residual signal by the intra-prediction will be described with reference to FIG. 29 by using, as an example, a prediction (horizontal prediction) in a horizontal direction of the intra-prediction. In the example illustrated in FIG. 29, the prediction is performed on an original signal in an encoding target block Bko of an original image including pixel signals p having a block size of 4 (horizontal)×4 (vertical) pixels (hereinafter simply referred to as "4×4" and the same applies to other block sizes) (see FIG. 29A) by using a pixel signal of a left-neighboring decoded block as a reference signal Sr in order for the horizontal prediction, and generates a block Bkp of a predicted image including a prediction signal corresponding to the pixel signal of the encoding target block (see FIG. 29B).

Then, a block Bkd of the prediction residual signal can be obtained from a difference between the original signal in the encoding target block Bko of the original image and the prediction signal of the block Bkp of the predicted image (see FIG. 29C). In the prediction residual signal by the intra-prediction, when a pixel position approaches the reference signal, prediction efficiency increases and a residual component decreases (signal intensity decreases), in other words, when the pixel position goes away from the reference signal, the prediction efficiency decreases and the residual component increases (signal intensity increases) (see FIG. 29D).

Here, in the example illustrated in FIG. 29, the prediction is performed by using inter-pixel correlation in the horizontal direction, and the signal of the encoded and decoded block also exists above the encoding target block. In the example illustrated in FIG. 29, although the prediction is efficiently performed by using the correlation in the horizontal direction by the intra-prediction in the horizontal direction to generate the prediction residual signal, the correlation in a vertical direction is not used.

In this regard, in the currently defined H.265, by using the fact that the correlation with the pixel signals in the block above the encoding target block is high, a filter process that reflects a signal change for the upper block is applied only to an uppermost prediction signal in the block Bkp of the predicted image in order to improve accuracy of the prediction signal. With this configuration, not only the correlation in the horizontal direction by the prediction in the horizontal direction but also the correlation in the vertical direction can be used, and an average residual component in the block Bkd of the prediction residual signal further decreases and encoding efficiency is improved. Similarly, in the case of an intra-prediction in the vertical direction, a filter process is applied by using neighboring pixels in the horizontal direction that are not used for that prediction, and in the DC prediction that does not use horizontal and vertical neighboring pixels, the filter process using the horizontal and vertical neighboring pixels is applied, so that the encoding efficiency is greatly improved as compared with the previous video encoding method such as MPEG-2 and H.264.

In addition, in the inter-prediction, a motion prediction is performed from a temporally close encoded and decoded reference frame to calculate a motion vector, and a predicted image is generated by using the motion vector. A difference between the predicted image and the original image is generated as the prediction residual signal. In the conventional technique, however, height of correlation of a signal with a neighboring block is positively used in the intra-prediction, but a property indicating the height of the correlation of the signal with the neighboring block is not used in the inter-prediction.

Then, the block of the prediction residual signal generated through the intra-prediction or the inter-prediction is subjected to an orthogonal transformation process and a quantization process and is encoded.

It should be noted that discrete cosine transform (DCT) is mainly applied in the orthogonal transformation process of the intra-prediction in the currently defined H.265, but there is prepared a mode in which the orthogonal transformation process by discrete sine transform (DST) is applied for the prediction residual signal of the intra-prediction of a part of the block size. However, when the block size of the encoding target block is large (when larger than 4×4), the merit of DST application due to the signal features of the left side block or the upper side block is reduced, and application of DST is not permitted by the standard due to cost problem in implementation. In addition, in the orthogonal transformation process of the inter-prediction in the currently defined H.265, the DCT is applied regardless of the block size.

As the feature of a motion compensation process in the inter-prediction, a prediction error amount is statistically large at the end point of the prediction region related to the encoding (that is, the prediction residual signal for the pixel signal located in the outer periphery of the predicted image block) (see, for example, Non-patent Literature 1). Therefore, when the prediction region is further divided into blocks and is set to the transformation regions, there is a transformation region that matches the feature of the base of the DST used for encoding the prediction residual signal. A technique for applying the DST by using this is disclosed (see, for example, Patent Literature 1).

CITATION LIST

Patent Literature

Patent Literature 1: Japanese Patent Application Laid-Open No. 2014-36278.

Non-Patent Literature

Non-patent Literature 1: Chung Feng, et al., "Characteristic Analysis of Motion Compensated Interframe Difference Signal Based on Statistical Motion Distribution Model", D-II Vol. J84-D-II, No. 9, pp. 2001-2010, Sep. 1, 2001.

SUMMARY OF THE INVENTION

As described above, in Non-patent Literature 1, as the feature of a motion compensation process in the inter-prediction, a prediction error amount is statistically large at the end point of the prediction region related to the encoding (that is, the prediction residual signal for the pixel signal located in the outer periphery of the predicted image block), and a technique for applying a DST based on this is disclosed in Patent Literature 1.

However, since this is statistically shown, there is a problem that the encoding efficiency is deteriorated instead by applying a DST in an image out of the statistics (for example, in a case where there is a feature such as strong edges in the vicinity of the periphery of a block of a predicted image). In addition, in order to solve these problems, if a flag is set to indicate which of DST and DCT is to be applied and transmitted as additional information, there is a possibility that the encoding efficiency is lowered due to the increase of the flag.

An object of the present disclosure is to provide an image encoding device with improved encoding efficiency, an image decoding device, and a program thereof.

Similarly to an intra-prediction for a predicted image used for an inter-prediction, an image encoding process in the present disclosure reduces a prediction residual signal for a leftmost and an uppermost regions of the predicted image of the inter-prediction by applying a low-pass filter process by using an encoded and decoded neighboring signal, divides a block of the prediction residual signal, determines which one of DST and DCT is applied according to directionality of the low-pass filter process without any flag, and performs a corresponding orthogonal transformation process. Then, in the image decoding process in the present disclosure, which of the DST and the DCI is to be applied according to the directionality of the low-pass filter process is determined without any flag, and the original image is reconstructed.

That is, the image encoding device of the present disclosure is an image encoding device for block-dividing and encoding an original image of a frame unit constituting a moving image and includes: a neighboring pixel non-reference prediction means for generating a predicted image of a block unit including a prediction signal by predetermined neighboring pixel non-reference prediction that performs signal prediction for each pixel signal of an original image of a block unit without using a decoded neighboring signal; a filter processing means for generating a block of a new predicted image by performing a low-pass filter process to a prediction signal located at a boundary of a block of the predicted image by using the decoded neighboring signal neighboring to the block of the predicted image; a prediction residual signal generating means for calculating an error of each prediction signal of the block of the predicted image after the low-pass filter process for each pixel signal of an encoding target block of the original image and generating a prediction residual signal of a block unit; an orthogonal transformation means including: a block dividing means for dividing the prediction residual signal of the block unit into block shapes designated in advance; and an orthogonal transformation selection applying means for selectively applying a plurality of types of orthogonal transformation processes corresponding to positions to which the low-pass filter process is applied for each divided block of the block divided prediction residual signal.

In addition, in the image encoding device of the present disclosure, the predetermined neighboring pixel non-reference prediction includes any one of the inter-prediction, an intra-block copy prediction, and a cross component signal prediction.

In addition, in the image encoding device of the present disclosure, the filter processing means performs the low-pass filter process so that a prediction signal neighboring to the decoded neighboring signal is smoothed among prediction signals in the block of the predicted image generated by the neighboring pixel non-reference prediction means.

In the image encoding device of the present disclosure, the block dividing means in the orthogonal transforming means includes a means for dividing the divided block at the position neighboring to the decoded neighboring signal so as to have the defined block size when dividing the block of the prediction residual signal corresponding to the block of the predicted image of the block size larger than the size doubled vertically and horizontally with respect to the predefined block size.

In addition, in the image encoding device of the present disclosure, the block dividing means in the orthogonal transforming means sets the previously defined block size to the divided block including the pixel position to which the low-pass filter process is applied.

In addition, in the image encoding device of the present disclosure, the orthogonal transformation selection applying means in the orthogonal transforming means applies a first orthogonal transformation process of longitudinal DST and transverse DCT to the divided block of the prediction residual signal located on the uppermost side when the pixel to which the low-pass filter process is applied is on the uppermost side and the application direction of the low-pass filter process is the vertical direction, among the divided blocks of the divided prediction residual signal, applies a second orthogonal transformation process of transverse DST and longitudinal DCT to the divided block of the prediction residual signal located on the leftmost side when the pixel to which the low-pass filter process is applied is on the leftmost side and the application direction of the low-pass filter process is the horizontal direction, applies a third orthogonal transformation process of longitudinal and transverse DSTs when the pixel to which the low-pass filter process is applied is the uppermost side and the leftmost side and the application direction of the low-pass filter process is the application direction of the angular filter process, and a fourth orthogonal transformation process of DCT in the longitudinal and transverse directions for a divided block of a prediction residual signal having no pixel to which the low-pass filter process is applied.

In addition, in the image encoding device of the present disclosure, the filter processing means includes a means for acquiring a locally decoded image for each divided block based on the block dividing means, replacing the prediction signal in the block of the predicted image generated by the neighboring pixel non-reference prediction whenever the locally decoded image is acquired, and performing a low-pass filter process according to each block size by using the decoded neighboring signal neighboring to the predicted image and the locally decoded image for each divided block in the block size unit of the divided block among the prediction signals in the block of the replaced predicted image.

Furthermore, the image decoding device of the present disclosure is an image decoding device for decoding a signal encoded by block-dividing a frame constituting a moving image and includes: a neighboring pixel non-reference prediction means for generating a predicted image of a block unit including a prediction signal by the predetermined neighboring pixel non-reference prediction that performs signal prediction for each pixel signal of a block unit without using a decoded neighboring signal; a filter processing means for generating a block of a new predicted image by performing a low-pass filter process to a prediction signal located at a boundary of a block of the predicted image by using the decoded neighboring signal neighboring to the block of the predicted image; an inverse orthogonal transformation means including: an orthogonal transformation selection applying means for selectively applying a plurality of types of inverse orthogonal transformation processes corresponding to positions to which the low-pass filter process is applied with respect to the transformation coefficients in which transformation coefficients of a reconstructed block unit have been block-divided by the image encoding side, and generating a divided block of the prediction residual signal; and a block reconfiguring means for reconfiguring a blocks corresponding to the block size of the predicted image based on the divided block of the prediction residual signal.

In addition, in the image decoding device of the present disclosure, the filter processing means includes a means for acquiring a locally decoded image for each divided block based on the block dividing means, replacing the prediction signal in the block of the predicted image generated by the neighboring pixel non-reference prediction whenever the locally decoded image is acquired, and performing a low-pass filter process according to each block size by using the decoded neighboring signal neighboring to the predicted image and the locally decoded image for each divided block in the block size unit of the divided block among the prediction signals in the block of the replaced predicted image.

Furthermore, a program of the present disclosure causes a computer to function as the image encoding device or the image decoding device of the present disclosure.

According to the present disclosure, since a signal error occurring between a prediction signal of a predicted image and a neighboring decoded block signal is reduced and encoding efficiency is improved, it is possible to achieve an image encoding device and an image decoding device using a video encoding method with high encoding efficiency. That is, on an encoding side, a residual component in a prediction residual signal can be decreased, and the encoding efficiency can be improved by reducing an amount of information to be encoded and transmitted. Also, on a decoding side, it is possible to perform decoding even with such a reduced amount of information.

BRIEF DESCRIPTION OF THE DRAWINGS

FIG. 19A is a block diagram of a periphery of a filter processor related to a predicted image in an image encoding device according to a fourth embodiment of the present disclosure, and FIG. 19B is an explanatory diagram illustrating an example of the filter process of the predicted image.

FIGS. 26A and 26B are block diagrams of a periphery of a filter processor in an image encoding device and an image decoding device according to a fifth embodiment of the present disclosure.

FIGS. 29A, 29B, 29C, and 29D are explanatory diagrams of an intra-prediction in a conventional technique.

DETAILED DESCRIPTION OF THE PREFERRED EMBODIMENTS

Hereinafter, an image encoding device and an image decoding device according to each embodiment of the present disclosure will be described in this order.

First Embodiment

Image Encoding Device

First, a filter processor 12 related to a predicted image, which is a main component of the present disclosure in an image encoding device 1 according to a first embodiment of the present disclosure, will be described with reference to FIGS. 1 and 2, and a specific typical example of the image encoding device 1 will be described with reference to FIGS. 3 to 5.

Figure 1A:
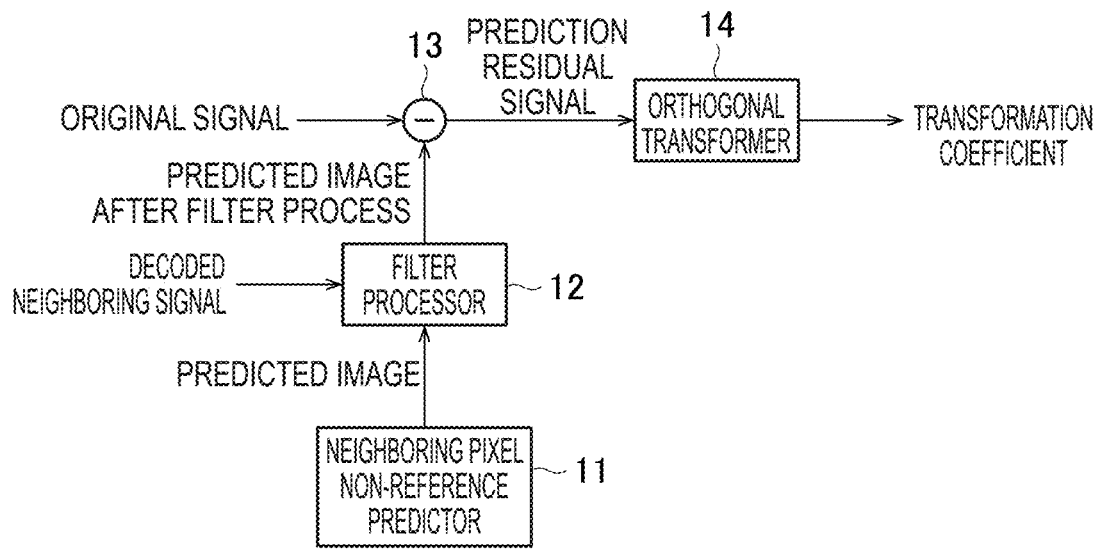
FIG. 1A is a block diagram of a periphery of a filter processor related to a predicted image in an image encoding device according to a first embodiment of the present disclosure.
Figure 1B:
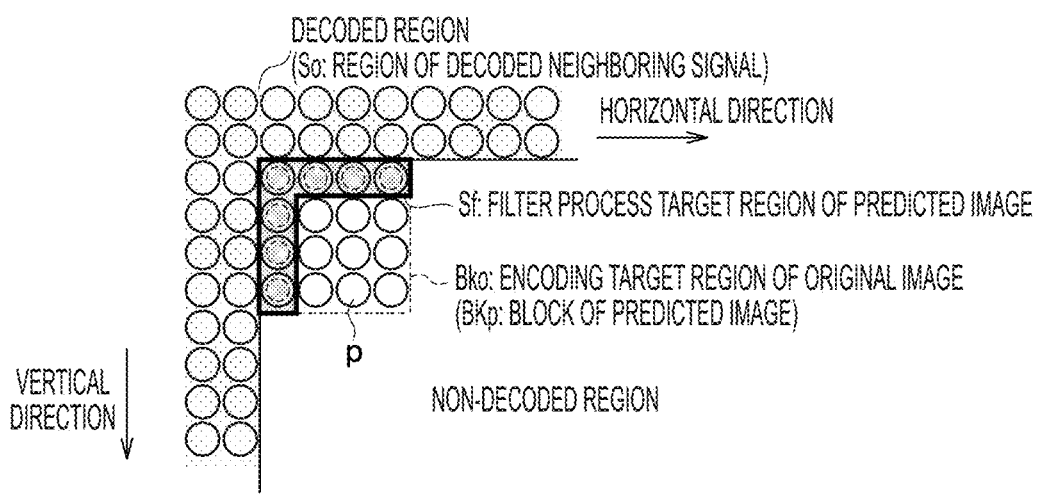
FIG. 1B is an explanatory diagram illustrating an example of a filter process of the predicted image.

FIG. 1A is a block diagram of a periphery of the filter processor 12 related to the predicted image in the image encoding device 1 according to the first embodiment of the present disclosure, and FIG. 1B is an explanatory diagram illustrating an example of a filter process of the predicted image by the filter processor 12.

As illustrated in FIG. 1A, the image encoding device 1 according to the first embodiment of the present disclosure includes a neighboring pixel non-reference predictor 11, the filter processor 12, a prediction residual signal generator 13, and an orthogonal transformer 14.

The neighboring pixel non-reference predictor 11 is a functional part that performs a signal prediction process of generating the predicted image without using neighboring decoded signals (decoded neighboring signals) in an encoding target region of an original image. In the present specification, such a signal prediction is referred to as a "neighboring pixel non-reference prediction". The neighboring pixel non-reference prediction includes, for example, an inter-prediction for performing a motion compensation prediction between frames, an intra-block copy prediction for copying different decoded partial images of the same frame to generate a predicted image, and a signal prediction (referred to as a "cross component signal prediction" in the present specification) for generating a predicted image by using a correlation between component signals of luminance signals and color difference signals at corresponding block positions of a certain frame.

Figure 2A:
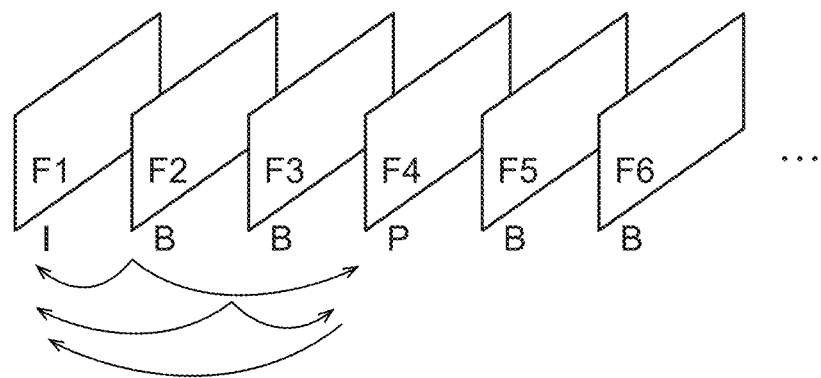
FIGS. 2A, 2B, and 2C are explanatory diagrams exemplifying a neighboring pixel non-reference prediction according to the present disclosure.

For example, in the inter-prediction, as illustrated in FIG. 2A, when a frame F1 is an I frame (intra-frame) in a plurality of frames F1 to F6 of a certain GOP structure, in the case of generating a predicted image by referring to a past frame or a P frame like a P frame (predictive inter-frame), or a predicted image is generated with referring to a plurality of frames such as past and future frames such as a B frame (bi-predictive inter-frame).

Figure 2B:
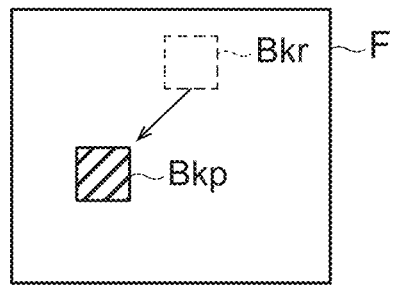

In addition, in the intra-block copy prediction, as illustrated in FIG. 2B, a different decoded partial image Bkr of the same frame F is referred to and copied to generate a predicted image Bkp.

Figure 2C:
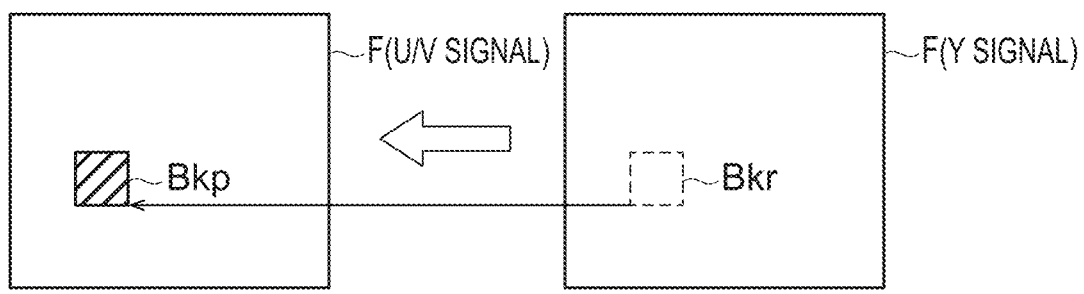

In addition, in the cross component signal prediction, as illustrated in FIG. 2C, by using correlation between component signals, a locally decoded image Bkr of a luminance signal (for example, Y signal) at a corresponding block position of a certain frame F is referred to, and a synthesis process is performed on the predicted image of the color difference signal (for example, U/V signal) by weighted addition to generate a corrected predicted image Bkp of a color difference signal (for example, U/V signal). See Japanese Patent Application Laid-open No. 2014-158270 for details related to such a cross component signal prediction.

These neighboring pixel non-reference predictions are common in that the signal prediction is performed without using height of correlation between neighboring pixels while having a decoded region as a region neighboring to a block of the encoding target region of the original image.

The filter processor 12 in the first embodiment is a functional part that generates a predicted image including a new prediction signal by performing a low-pass filter process on the prediction signal by using the decoded signals (decoded neighboring signals) neighboring to a left side and an upper side of the predicted image among the pixel signals (prediction signals) in the block of the predicted image generated by the neighboring pixel non-reference predictor 11, and outputs the predicted image to the prediction residual signal generator 13.

For example, as illustrated in FIG. 1B, when a block Bkp of the predicted image including 4×4 pixel signals p corresponding to a block Bko of the encoding target region of the original image is generated by the neighboring pixel non-reference predictor 11, the filter processor 12 generates the predicted image including the new prediction signal by performing the low-pass filter process such as a smoothing filter in a horizontal direction and a vertical direction, for example, by setting the pixel signals (prediction signals) on a leftmost side and un uppermost side in the predicted image as a signal Sf of a filter target region, by using a decoded neighboring signal So in a periphery of a block boundary of the block Bkp of the predicted image neighboring on the left side and the upper side of the predicted image.

The prediction residual signal generator 13 calculates an error of each pixel signal (prediction signal) of the block Bkp of the predicted image obtained from the filter processor 12 for each pixel signal (original signal) of the block (encoding target block) Bko of the encoding target region of the original image, and outputs the error to the orthogonal transformer 14 as a prediction residual signal.

The orthogonal transformer 14 performs a predetermined orthogonal transformation process on the prediction residual signal input from the prediction residual signal generator 13, and generates a transformation coefficient signal. For example, as the predetermined orthogonal transformation process, an orthogonal transformation process used in an encoding method such as DCT or DST, or an integer orthogonal transformation process defined by H.264 or H.265 approximated to an integer can be used, as long as the process conforms to the encoding method to be used.

The image encoding device 1 according to the first embodiment performs a quantization process and an entropy encoding process on the transformation coefficient signal and outputs the resultant signal to the outside. Then, in the entropy encoding process, it is possible to transmit a video by transforming the video into a code by arithmetic encoding and the like represented by CABAC, together with various encoding parameters and the like. Note that the encoding parameter can be transmitted by including parameters that can be selected and set, such as inter-prediction parameters or intra-prediction parameters, parameters of a block size related to block division (block division parameter), and quantization parameters related to the quantization process.

Next, an inter-predictor 11a based on the inter-prediction will be described as a representative example of the neighboring pixel non-reference predictor 11, and a configuration and an operation example of the image encoding device 1 that performs the filter process on the prediction signal of the block of the predicted image by the filter processor 12 will be described with reference to FIGS. 3 to 5.

Figure 3:
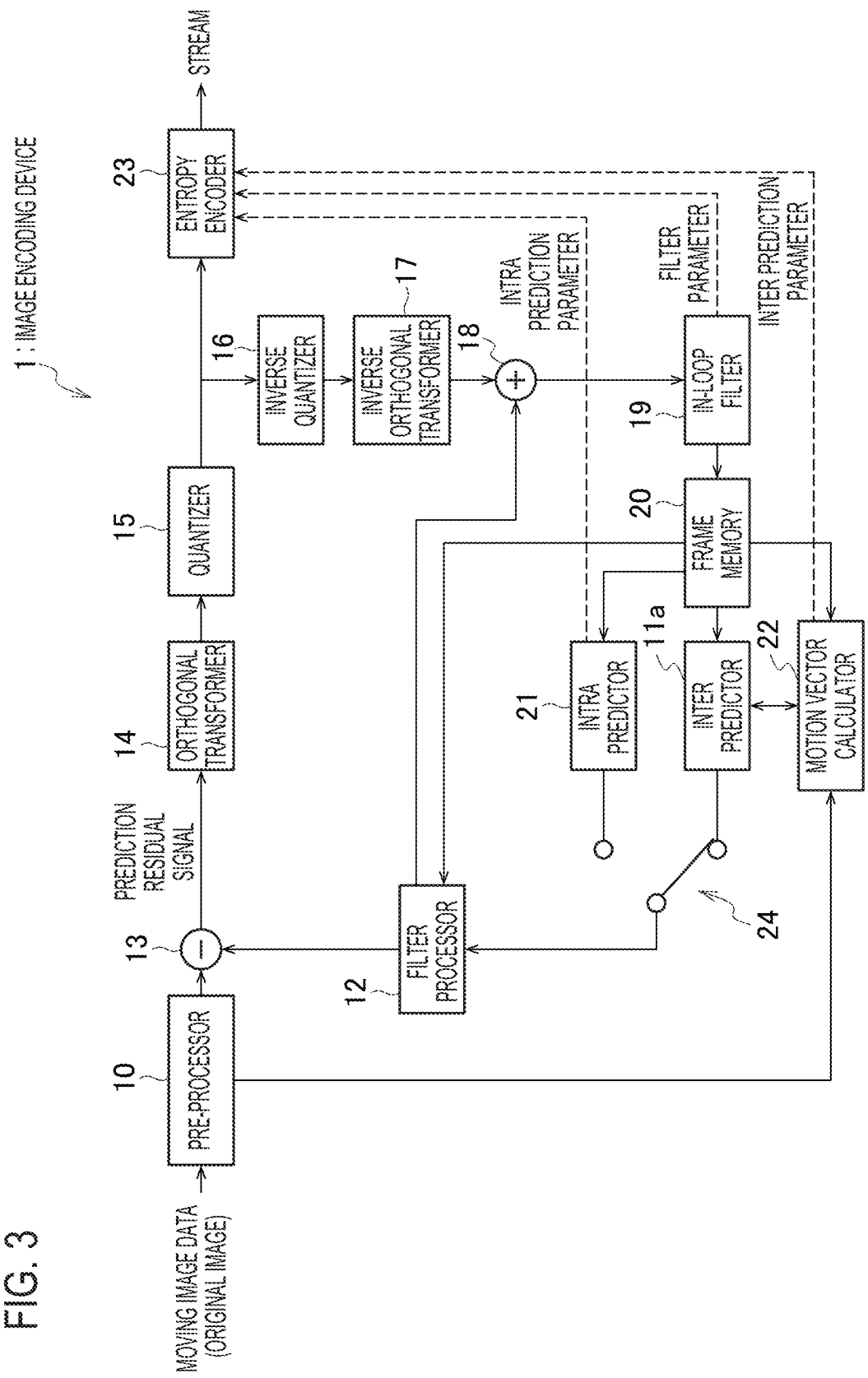
FIG. 3 is a block diagram illustrating an example of an image encoding device according to the first embodiment of the present disclosure.
Figure 4:
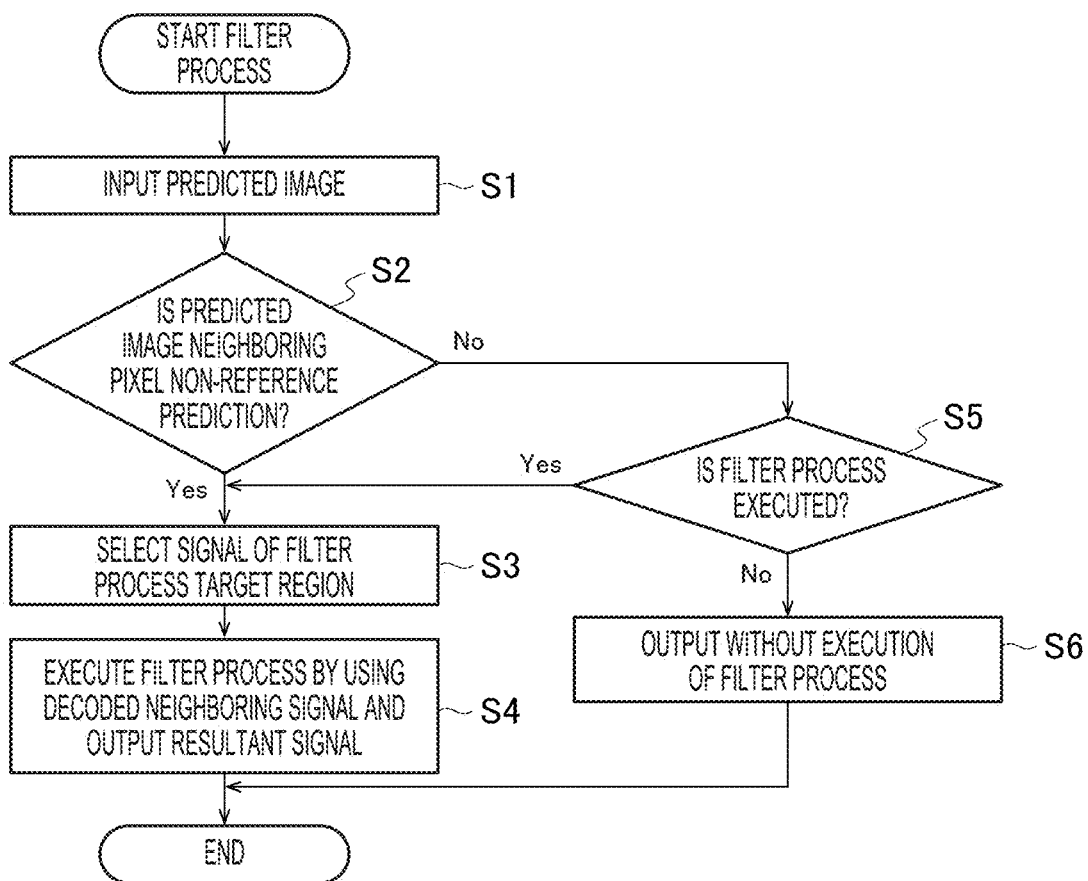
FIG. 4 is a flowchart of the filter process of the predicted image in the image encoding device according to the first embodiment of the present disclosure.

FIG. 3 is a block diagram illustrating an example of the image encoding device 1 according to the first embodiment of the present disclosure. The image encoding device 1 illustrated in FIG. 3 includes a pre-processor 10, the inter-predictor 11a, the filter processor 12, the prediction residual signal generator 13, the orthogonal transformer 14, a quantizer 15, an inverse quantizer 16, an inverse orthogonal transformer 17, a decoded image generator 18, an in-loop filter 19, a frame memory 20, an intra-predictor 21, a motion vector calculator 22, an entropy encoder 23, and a predicted image selector 24.

The pre-processor 10 divides the original image for each frame of the input moving image data into encoding target blocks having a predetermined block size and outputs the encoding target blocks to the prediction residual signal generator 13 in a predetermined order.

The prediction residual signal generator 13 calculates an error of each pixel signal of a block of the predicted image obtained from the filter processor 12 for each pixel signal of the encoding target block and outputs the error to the orthogonal transformer 14 as an orthogonal transformation as a prediction residual signal of a block unit.

The orthogonal transformer 14 performs a predetermined orthogonal transformation process on the prediction residual signal input from the prediction residual signal generator 13, and generates a transformation coefficient signal.

The quantizer 15 performs a predetermined quantization process on the transformation coefficient signal obtained from the orthogonal transformer 14 and outputs the resultant signal to the entropy encoder 23 and the inverse quantizer 16.

The inverse quantizer 16 performs an inverse quantization process on the quantized transformation coefficient signal obtained from the quantizer 15, and outputs the resultant signal to the inverse orthogonal transformer 17.

The inverse orthogonal transformer 17 reconstructs the prediction residual signal by performing an inverse orthogonal transformation process on the inversely quantized transformation coefficient signal obtained from the inverse quantizer 16 and outputs the reconstructed prediction residual signal to the decoded image generator 18.

The decoded image generator 18 adds the prediction residual signal reconstructed by the inverse orthogonal transformer 17 to the block of the predicted image predicted by the intra-predictor 21 or the inter-predictor 11a and obtained from the filter processor 12, generates a block of a locally decoded image, and outputs the block of the locally decoded image to the in-loop filter 19.

With respect to the block of the locally decoded image obtained from the decoded image generator 18, the in-loop filter 19 performs in-loop filter processes with, for example, an adaptive loop filter (ALF), a pixel adaptive offset (SAO: sample adaptive offset), a deblocking filter, or the like, and outputs the resultant signal to the frame memory 20. The filter parameters related to these filter processes are output to the entropy encoder 23 as one of encoding parameters to be used as additional information of the encoding process.

The frame memory 20 stores the block of the locally decoded image obtained through the in-loop filter 19 and holds the block of the locally decoded image as a reference image that is usable by the intra-predictor 21, the inter-predictor 11a, and the motion vector calculator 22.

At the time of selecting the signal for performing the signal prediction only with the signal within the frame to be predicted by the predicted image selector 24, the intra-predictor 21 performs a DC prediction, a Planer prediction, or a directional prediction with respect to pixel signals (original signals) in an encoding target block of an original image by using pixel signals of encoded and decoded blocks neighboring to a left side or an upper side of the encoding target block stored as a reference image in the frame memory 20, generates a block of a predicted image including pixel signals (prediction signals) predicted by extrapolation, and outputs the block of the predicted image to the filter processor 12.

The intra-prediction parameter for identifying the DC prediction, the Planer prediction, or the directional prediction used in the intra-predictor 21 is output to the entropy encoder 23 as one of the encoding parameters used as the additional information of the encoding process.

At the time of selecting the signal for performing the inter-frame motion compensation prediction on the P/B frame by the predicted image selector 24, the inter-predictor 11a generates the block of the predicted image by motion-compensating data stored as a reference image in the frame memory 20 with the motion vector provided from the motion vector calculator 22 with respect to the pixel signal (original signal) in the encoding target block of the original image, and outputs the block of the predicted image to the filter processor 12.

The motion vector calculator 22 searches for a position most similar to the encoding target block of the original image by using a block matching technique or the like with respect to the data of the reference image stored in the frame memory 20, calculates a value indicating a spatial shift as a motion vector, and outputs the value to the inter-predictor 11a.

The inter-prediction parameter used for the inter-prediction including the motion vector calculated by the motion vector calculator 22 is output to the entropy encoder 23 as one of the encoding parameters to be the additional information of the encoding process.

The entropy encoder 23 performs an entropy encoding process on the output signal from the quantizer 15 and various encoding parameters and outputs a stream signal of the encoded moving image data.

An operation example of the filter processor 12 will be described with reference to FIGS. 4 and 5. As illustrated in FIG. 4, when the predicted image from the intra-predictor 21 or the inter-predictor 11a is input (step S1), the filter processor 12 identifies whether the predicted image is a neighboring pixel non-reference prediction, that is, in this example, identifies whether the predicted image is the inter-prediction based on the signal selection by the predicted image selector 24 (step S2). The same applies to a case where the neighboring pixel non-reference prediction is an intra-block copy prediction or a cross component signal prediction to be described above.

Subsequently, when the filter processor 12 determines that the predicted image is not the neighboring pixel non-reference prediction, that is, the intra-prediction in this example (step S2: No), the filter processor 12 determines whether or not to perform the filter process by a predetermined processing method (step S5). When the filter process is not performed on the predicted image of the intra-prediction (step S5: No), the filter processor 12 outputs the prediction signal to the prediction residual signal generator 13 without performing the filter process thereon (step S6). On the other hand, when filter process is performed on the predicted image of the intra-prediction (step S5: Yes), the filter processor 12 proceeds to step S3. Since the filter process on the predicted image of the intra-prediction may be performed in the same manner as the currently defined H.265 and is not directly related to the gist of the present disclosure, the description of the step S3 is described as an example that performs the filter process on the predicted image of the inter-prediction.

When the filter processor 12 determines that the predicted image is the neighboring pixel non-reference prediction, that is, the inter-prediction in this example (step S2: Yes), the filter processor 12 extracts a pixel signal of a filter process target region in advance from the predicted image (prediction signal) (step S3). For example, as illustrated in FIG. 5, the pixel signals (prediction signals) on the leftmost side and the uppermost side of the predicted image among the pixel signals (prediction signals) in the 4×4 predicted image block are defined as a filter process target regions Sf.

Subsequently, the filter processor 12 generates a predicted image including a new prediction signal by performing a low-pass filter process on the pixel signal (prediction signal) of the selected filter process target region by using the decoded signal (the decoded neighboring signal) neighboring on the left side and the upper side of the predicted image, and outputs the generated predicted image to the prediction residual signal generator 13 (step S4). For example, as illustrated in FIG. 5, the filter processor 12 performs a smoothing filter process with a predetermined weighting factor for each of a horizontal filter region, a vertical filter region, and an angular filter region in the filter process target region Sf among the pixel regions (prediction signals) in the block Bkp of the 4×4 predicted image, and outputs the resultant signal to the prediction residual signal generator 13.

Figure 5:
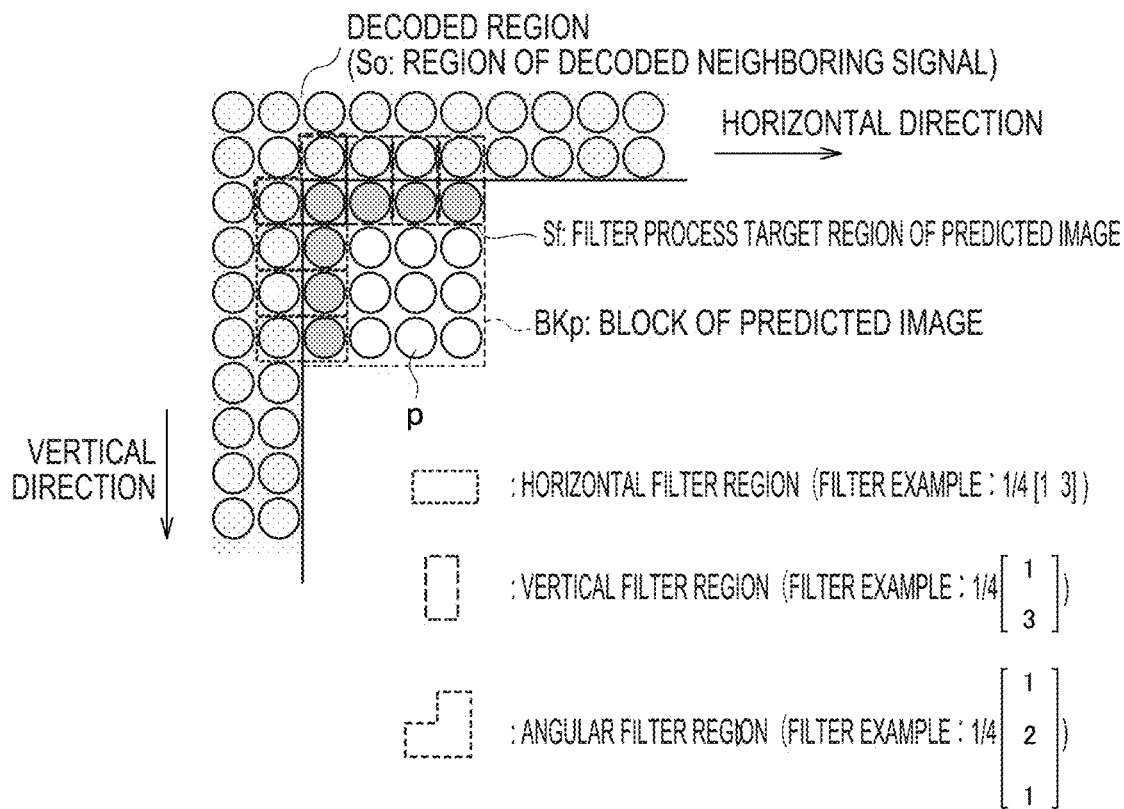
FIG. 5 is an explanatory diagram of the filter process of the predicted image in the image encoding device according to the first embodiment of the present disclosure.

It should be noted that the filter process by the filter processor 12 may be a low-pass filter process, filter processes other than the smoothing filter may be applied, and the region of the decoded neighboring signal or the weighting factor used for the filter process are not necessarily limited to the example illustrated in FIG. 5. For example, in the case of a large-size encoded block, the filter process may be applied to a plurality of rows or columns. In addition, the filter type, the filter process target region, and the weighting factor, which are related to the filter process performed by the filter processor 12, may be configured to be transmitted as additional information of the encoding process, but need not be transmitted if they are determined in advance between transmission and reception (between encoding and decoding).

By performing the filter process on the predicted image by the filter processor 12 in this way, a signal error occurring between the pixel signals (prediction signals) on the leftmost side and the uppermost side in the predicted image and the neighboring decoded signal is reduced, regardless of the type of the orthogonal transformation process of the orthogonal transformer 14, and it is possible to improve the encoding efficiency of the video.

Image Decoding Device

Next, a filter processor 54 and its peripheral functional blocks, which are the main components of the image decoding device 5 according to the first embodiment of the present disclosure, will be described with reference to FIG. 6, and a specific typical example of the image decoding device 5 will be described with reference to FIG. 7.

Figure 6:
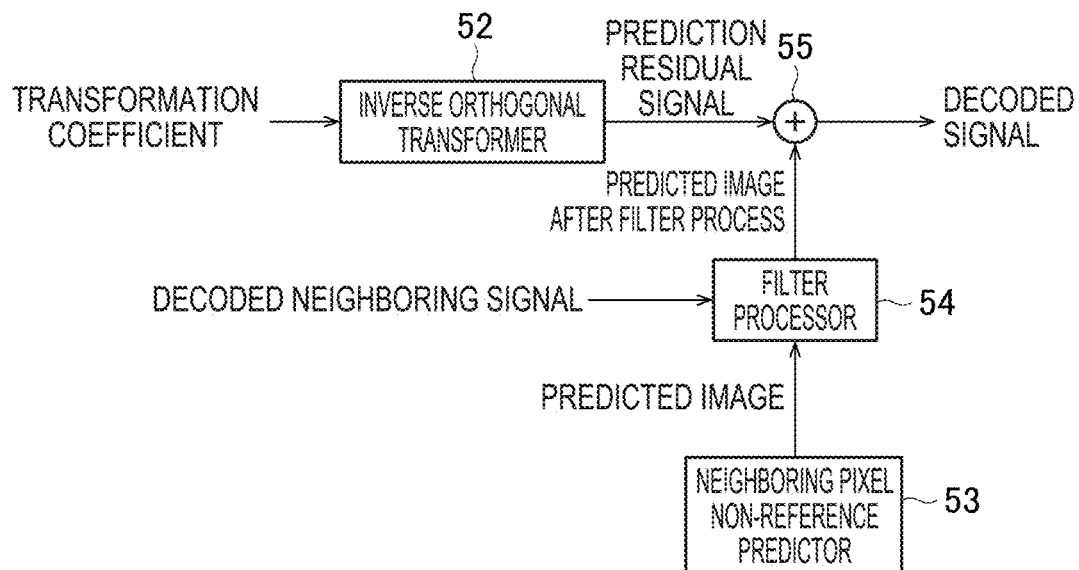
FIG. 6 is a block diagram of the periphery of the filter processor related to the predicted image in the image decoding device according to the first embodiment of the present disclosure.

FIG. 6 is a block diagram of the periphery of a filter processor 54 with respect to a predicted image in the image decoding device 5 according to the first embodiment of the present disclosure. As illustrated in FIG. 6, the image decoding device 5 according to the first embodiment of the present disclosure includes an inverse orthogonal transformer 52, a neighboring pixel non-reference predictor 53, a filter processor 54, and a decoded image generator 55.

The inverse orthogonal transformer 52 receives the stream signal transmitted from the image encoding device 1 side, performs an inverse orthogonal transformation process on transformation coefficients reconstructed through a entropy decoding process and an inverse quantization process, and outputs the obtained prediction residual signal to the decoded image generator 55.

The neighboring pixel non-reference predictor 53 is a functional part corresponding to the neighboring pixel non-reference predictor 11 on the image encoding device 1 side, and performs a signal prediction process for generating a predicted image without using neighboring decoded signals (decoded neighboring signals). The neighboring pixel non-reference prediction includes, for example, the inter-prediction for performing the motion compensation prediction between frames, the intra-block copy prediction for generating a predicted image by copying different decoded partial images of the same frame, and the cross component signal prediction for generating a predicted image by using a correlation between component signals of a luminance signal and a color difference signal at the corresponding block position of a certain frame.

The filter processor 54 of the first embodiment is a functional part corresponding to the filter processor 12 of the image encoding device 1 side, and generates a predicted image including a new prediction signal by performing a low-pass filter process on the prediction signal by using decoded signals (decoded neighboring signals) neighboring to the left side and the upper side of the predicted image, among the pixel signals (prediction signals) in the block of the predicted image generated by the neighboring pixel non-reference predictor 53, and outputs the predicted image to the decoded image generator 55.

The decoded image generator 55 is a functional part that adds the prediction residual signal reconstructed by the inverse orthogonal transformer 52 to the block of the predicted image obtained from the filter processor 54 to be described later to generate the block of the decoded image including the decoded signal.

That is, the prediction residual signal generated through the filter process on the predicted image by the filter processor 12 in the image encoding device 1 is transmitted in a state in which the video encoding efficiency is improved, and the image decoding device 5 can efficiently reconstruct the video related to this transmission. Similarly to the case of the filter processor 12, the filter processor 54 may use a filter other than the smoothing filter as long as the filter process is a low-pass filter process, and the region of the decoded neighboring signal or the weighting factor used for the filter process may be appropriately determined. Then, when the filter type, the filter process target region, and the weighting factor, which are related to the filter process by the filter processor 12 from the image encoding device 1 side, are determined in advance between transmission and reception (between encoding and decoding), or are transmitted as additional information of the encoding process, the accuracy of the decoded signal can be improved by performing the filter process similarly to the filter processor 54 of the image decoding device 5 according to this.

Next, the inter-predictor 53a based on the inter-prediction will be described as a representative example of the neighboring pixel non-reference predictor 53, and a configuration and an operation example of the image decoding device 5 that performs the filter process on the prediction signal based on the inter-prediction by the filter processor 54 will be described with reference to FIG. 7.

Figure 7:
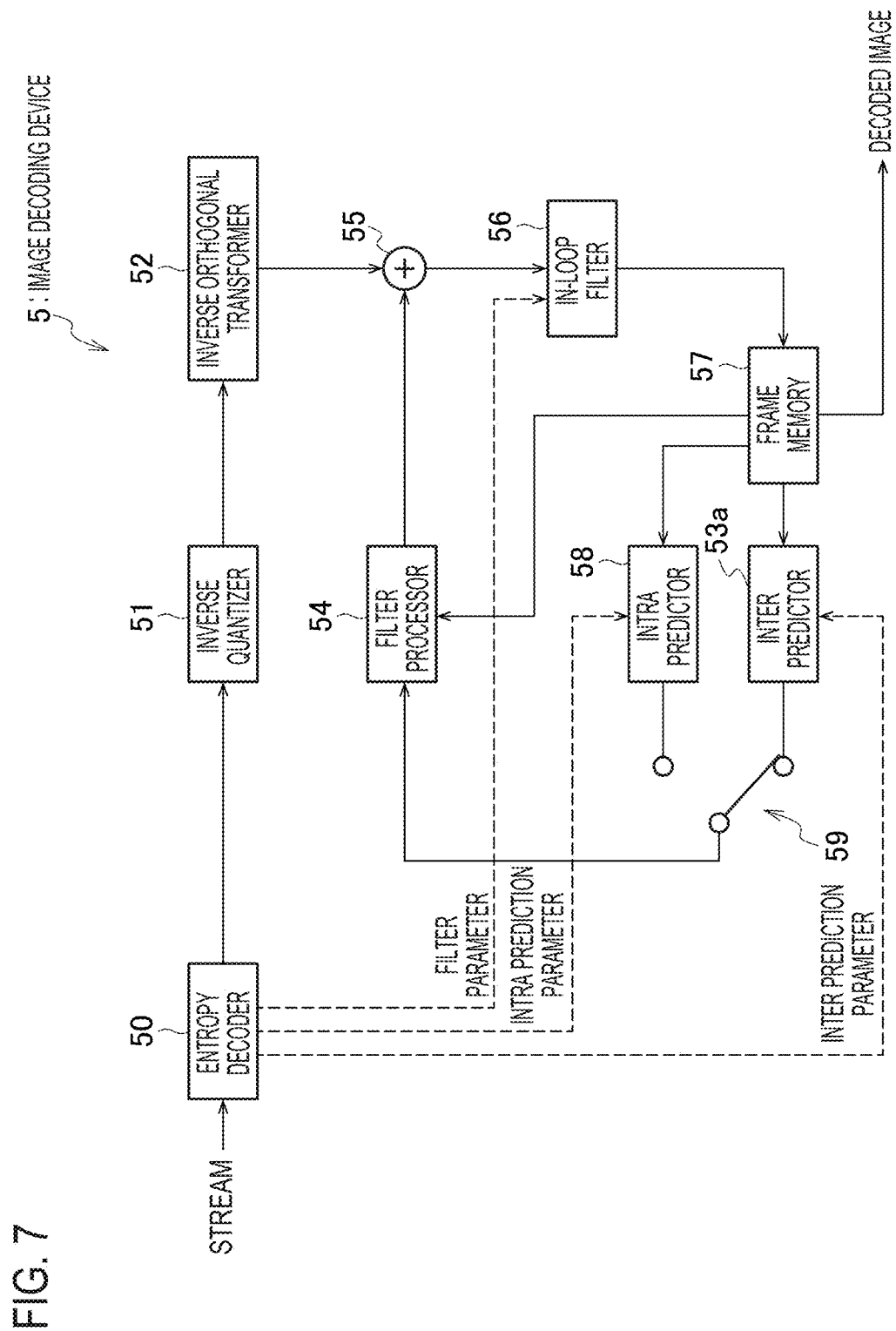
FIG. 7 is a block diagram illustrating an example of the image decoding device according to the first embodiment of the present disclosure.

FIG. 7 is a block diagram illustrating an example of the image decoding device 5 according to the first embodiment of the present disclosure. The image decoding device 5 illustrated in FIG. 7 includes an entropy decoder 50, an inverse quantizer 51, an inverse orthogonal transformer 52, an inter-predictor 53a, a filter processor 54, a decoded image generator 55, an in-loop filter 56, a frame memory 57, an intra-predictor 58, and a predicted image selector 59.

The entropy decoder 50 receives a stream signal transmitted from the image encoding device 1 side, outputs, to each function block, various encoding parameters obtained by performing an entropy decoding process corresponding to the entropy encoding process of the image encoding device 1, and outputs quantized transformation coefficients to the inverse quantizer 51. As various encoding parameters, for example, the filter parameter, the intra-prediction parameter, and the inter-prediction parameter are output to the in-loop filter 56, the intra-predictor 58, and the inter-predictor 53a, respectively.

The inverse quantizer 51 performs an inverse quantization process corresponding to the quantization process of the image encoding device 1 on the quantized transformation coefficients obtained from the entropy decoder 50, and outputs the transformation coefficient to the inverse orthogonal transformer 52.

The inverse orthogonal transformer 52 reconstructs the prediction residual signal by performing an inverse orthogonal transformation process corresponding to the orthogonal transformation process of the image encoding device 1 to the transformation coefficient obtained from the inverse quantizer 51, and outputs the reconstructed prediction residual signal to the decoded image generator 55.

The decoded image generator 55 adds the prediction residual signal reconstructed by the inverse orthogonal transformer 52 to the block of the predicted image predicted by the intra-predictor 58 or the inter-predictor 53a and generated by performing a low-pass filter by the filter processor 54, generates the block of the decoded image, and outputs the block of the decoded image to the in-loop filter 56.

The in-loop filter 56 performs a filter process corresponding to the filter process of the in-loop filter on the image encoding device 1 side and outputs the resultant signal to the frame memory 57.

The frame memory 57 stores the block of the decoded image obtained through the in-loop filter 56 and holds the block of the decoded image as a reference image that is usable by the intra-predictor 58 and the inter-predictor 53a.

At the time of selecting the signal for performing the signal prediction only with the signal within the frame to be predicted by the predicted image selector 59, the intra-predictor 58 generates a block of a predicted image by performing the prediction process corresponding to the intra-predictor 21 on the image encoding device 1 side by using the intra-prediction parameter and pixel signals of decoded blocks neighboring to a left side or an upper side of the decoding target block stored in the frame memory 57 as the reference image, and outputs the block of the predicted image to the filter processor 54.

At the time of selecting the signal for performing the inter-frame motion compensation prediction on the P/B frame by the predicted image selector 59, the inter-predictor 53a generates the block of the predicted image by motion-compensating data stored as a reference image in the frame memory 20 by using the motion vector included from the inter-prediction parameter, and outputs the block of the predicted image to the filter processor 54.

It is possible to construct the frame from the decoded data stored in the frame memory 57 and to output the frame as the decoded image.

The filter processor 54 operates in the same manner as that illustrated and described with reference to FIGS. 4 and 5. That is, in the filter process in the filter processor 54 according to the present disclosure, when the predicted image is the neighboring pixel non-reference prediction, that is, in this example, when it is the inter-prediction, the pixel signal (prediction signal) of the predetermined filter process target region is selected from the predicted image, a predicted image including a new prediction signal is generated by performing a low-pass filter process on the pixel signal (prediction signal) of the selected filter process target region by using decoded signals (decoded neighboring signals) neighboring on the left side or the upper side of the predicted image, and the generated predicted image is output to the decoded image generator 55. For example, as illustrated in FIG. 5, the filter processor 54 performs a smoothing filter process with a predetermined weighting factor for each of the horizontal filter region, the vertical filter region, and the angular filter region in the filter process target region Sf among the pixel signals (prediction signals) in the block Bkp of the predicted image by using the decoded neighboring signal So around the block boundary of the block Bkp of the predicted image, and outputs the resultant signal to the decoded image generator 55.

According to the image encoding device 1 and the image decoding device 5 of the first embodiment configured as described above, since a signal error occurring between the prediction signal of the predicted image and the neighboring decoded block signal is reduced and the encoding efficiency is improved, it is possible to realize an image encoding device and an image decoding device of a video encoding method with high encoding efficiency. That is, the residual component in the prediction residual signal can be made smaller, and the encoding efficiency can be improved by reducing the amount of information to be encoded and transmitted.

Second Embodiment

Next, the filter processors 12 and 54 in the image encoding device 1 and the image decoding device 5 according to the second embodiment of the present disclosure will be described with reference to FIG. 8. In the filter processors 12 and 54 of the first embodiment, an example that generates the predicted image including the new prediction signal by performing the low-pass filter process on the prediction signal by using the decoded signals (decoded neighboring signals) neighboring to the left side and the upper side of the predicted image, among the pixel signals (prediction signals) in the block of the predicted image generated by the neighboring pixel non-reference prediction has been described.

On the other hand, the filter processors 12 and 54 of the present embodiment are configured to perform a correlation determination for determining whether a low-pass filter process is performed on the prediction signal to be subjected to the low-pass filter process by using the decoded neighboring signal referred to in the low-pass filter process among the pixel signals (prediction signals) in the blocks of the predicted image generated by the neighboring pixel non-reference prediction, and determine whether to apply the low-pass filter process according to the result of the correlation determination. Like components are denoted by the same reference numerals. Accordingly, since the filter processors 12 and 54 of the present embodiment can be applied to the image encoding device 1 and the image decoding device 5 illustrated in FIGS. 3 and 7, only the processing contents related to the filter processors 12 and 54 of the present embodiment will be described, and a further detailed description will be omitted.

Figure 8:
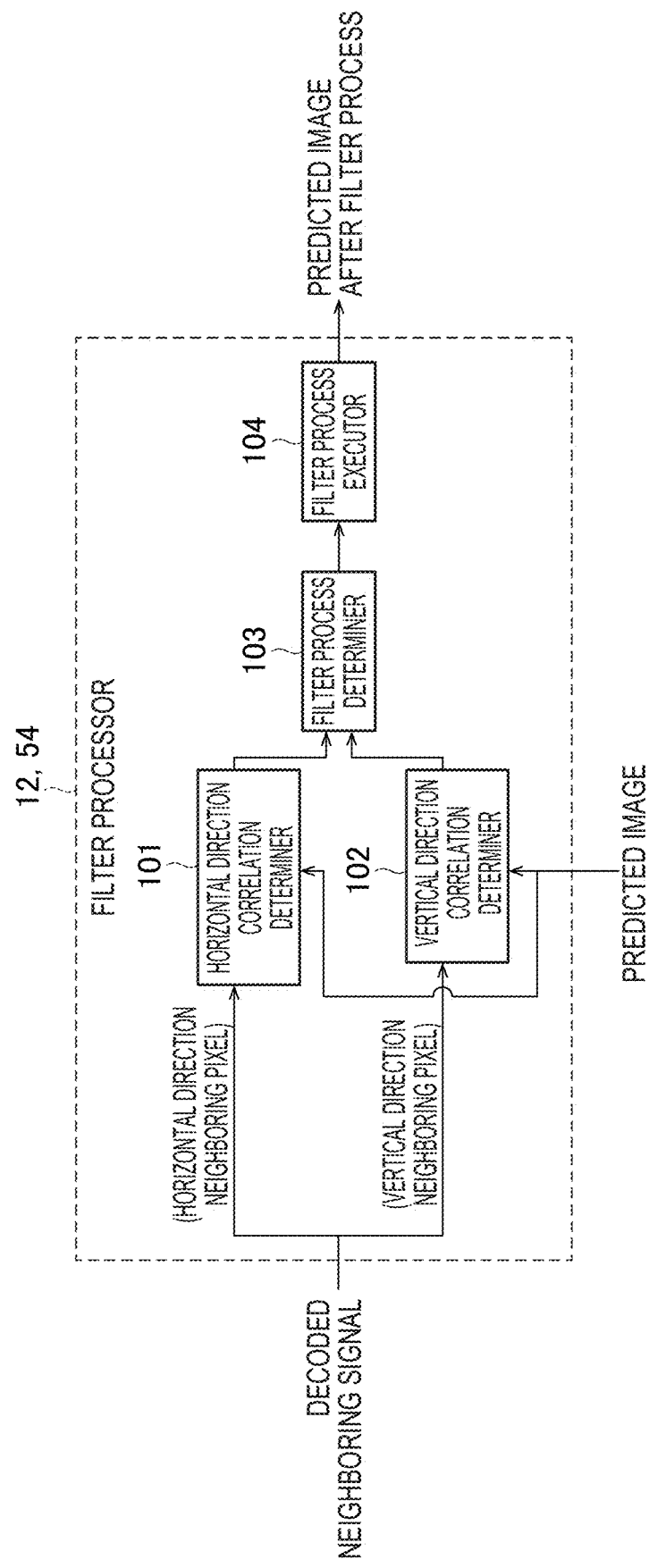
FIG. 8 is a block diagram of a filter processor in an image encoding device or an image decoding device according to a second embodiment of the present disclosure.
Figure 9:
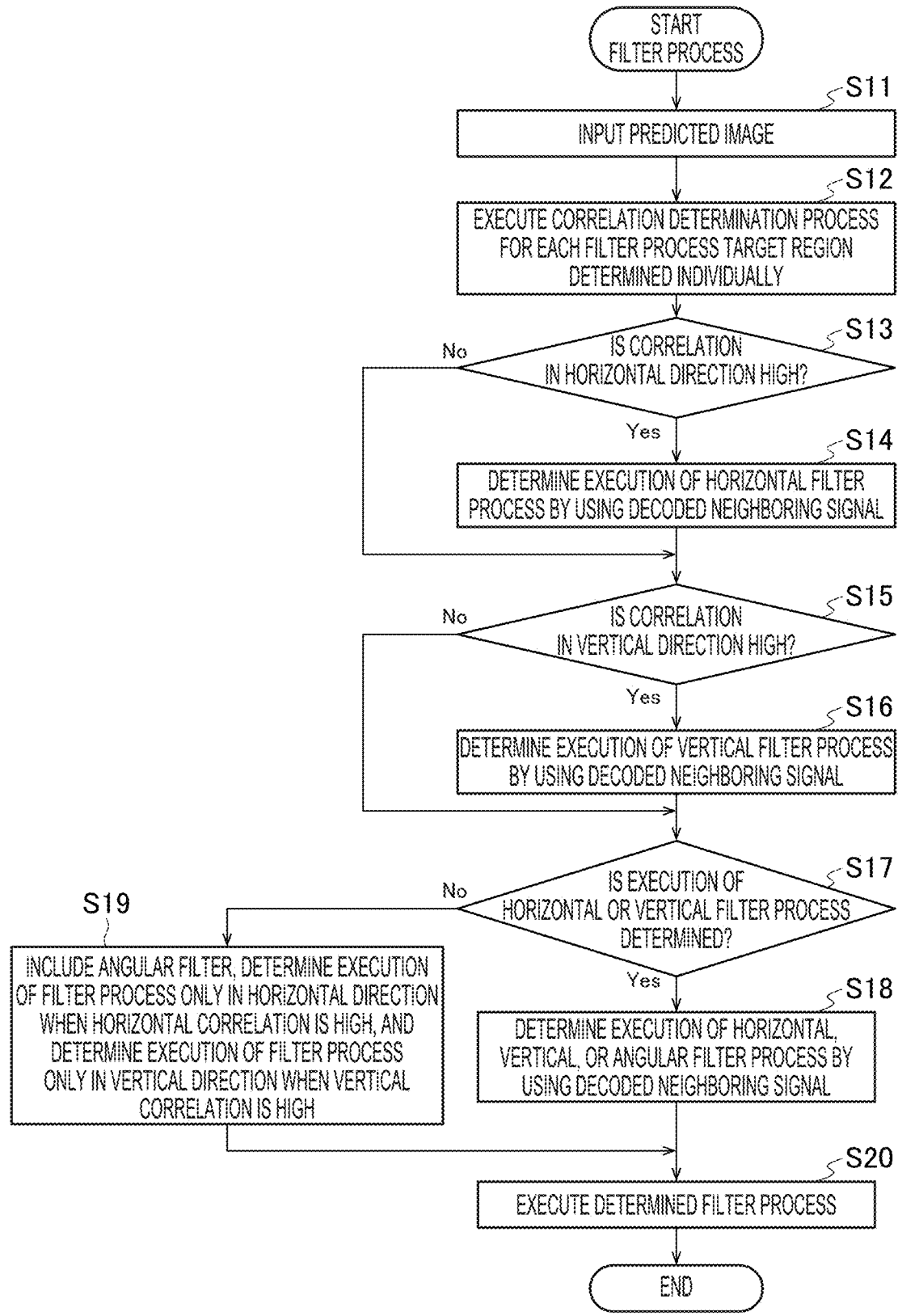
FIG. 9 is a flowchart of a filter process of a predicted image in the image encoding device or the image decoding device according to the second embodiment of the present disclosure.

FIG. 8 is a block diagram of the filter processors 12 and 54 in the image encoding device 1 or the image decoding device 5 according to the present embodiment. In addition, FIG. 9 is a flowchart of the filter processes 12 and 54 of the predicted image in the image encoding device 1 or the image decoding device 5 according to the present embodiment.

The filter processors 12 and 54 of the present embodiment include a horizontal direction correlation determiner 101, a vertical direction correlation determiner 102, a filter process determiner 103, and a filter process executor 104. The operation of these functional blocks will be described with reference to the processing example illustrated in FIG. 9. It should be noted that the filter processors 12 and 54 of the present embodiment may be configured to process whether the neighboring pixel non-reference prediction is performed, for example, whether the inter-prediction or the intra-prediction is performed, but an example in which the filter process is performed on the predicted image of the neighboring pixel non-reference prediction according to the present disclosure will be described.

When a predicted image is input (step S11), the filter processors 12 and 54 perform a correlation determination process for each filter process target region individually determined by the horizontal direction correlation determiner 101 and the vertical direction correlation determiner 102 (step S12).

That is, the horizontal direction correlation determiner 101 determines the correlation with the decoded neighboring signal on the left side of the predicted image (step S13), When the horizontal direction correlation determiner 101 determines that the correlation in the horizontal direction is high (step S13: Yes), the execution of the horizontal filter process is determined by using the decoded neighboring signal (step S14). When the horizontal direction correlation determiner 101 determines that the correlation in the horizontal direction is low (step S13: No), it is output to the filter process determiner 103 that the horizontal filter process is not to be executed.

Similarly, the vertical direction correlation determiner 102 determines the correlation with the decoded neighboring signal on the upper side of the predicted image (step S15). When the vertical direction correlation determiner 102 determines that the correlation in the vertical direction is high (step S15: Yes), the execution of the vertical filter process is determined by using the decoded neighboring signal (step S16). When the vertical direction correlation determiner 102 determines that the correlation in the vertical direction is low No), it is output to the filter process determiner 103 that the vertical filter process is not to be executed.

The filter process determiner 103 determines whether it is determined that both the horizontal and vertical filter processes are to be executed (step S17). If the filter process determiner 103 receives a determination to execute both the horizontal and vertical filter processes (step S17: Yes), the filter process determiner 103 determines that both the horizontal and vertical filter processes and a 3-tap angular filter process are executed (step S18). If the filter process determiner 103 receives a determination not to execute both the horizontal and vertical filter processes (step S17: No), the filter process determiner 103 determines that the filter process is performed only in the horizontal direction when the horizontal correlation is high and the filter process is performed only in the vertical direction when the correlation in the vertical direction is high. In the case of only one of the horizontal and vertical filter processes, the filter process determiner 103 determines that the angular filter performs the horizontal or vertical filter process (step S19).

The process order of steps S13 to S19 illustrated in FIG. 9 is merely an example and can be configured in random order. Therefore, the filter process determiner 103 performs correlation determination for each filter process target region individually determined in the horizontal direction and the vertical direction, determines the filter process to be "execute only in the horizontal direction", "execute only in the vertical direction", or "execute both in the horizontal direction, the vertical direction, and the corner", or "not execute in the horizontal direction, the vertical direction, and the corner", and the filter process determiner 103 outputs the determination to the filter process executor 104.

The filter process executor 104 performs a filter process according to the determination result of the filter process determiner 103 to output a filtered predicted image (step S20), and when the determination result of the filter process determiner 103 is "not execute in the horizontal direction, the vertical direction, or the corner", the filter process determiner 103 outputs the predicted image input to the filter processors 12 and 54 as it is.

Figure 10A:
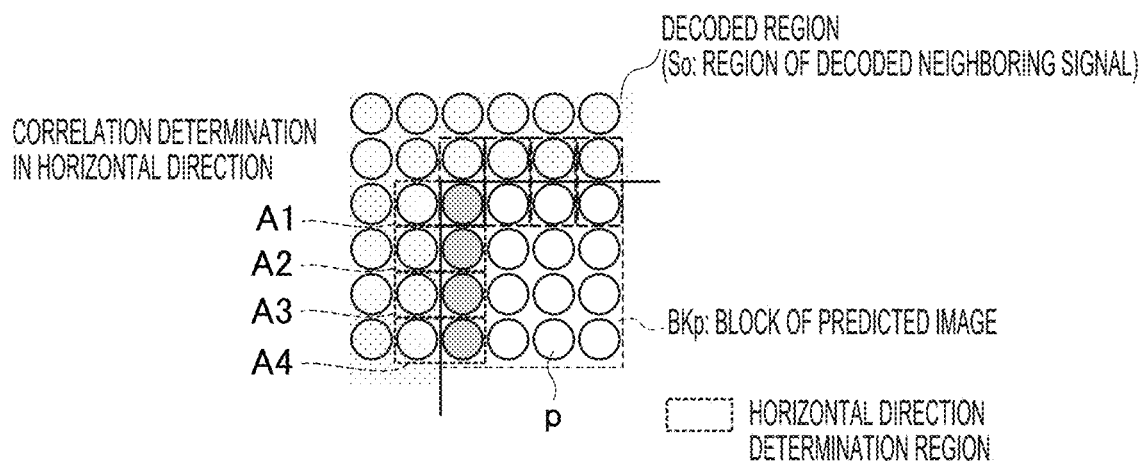
FIGS. 10A and 10B are explanatory diagrams of the filter process of the predicted image in the image encoding device or the image decoding device according to the second embodiment of the present disclosure.
Figure 10B:
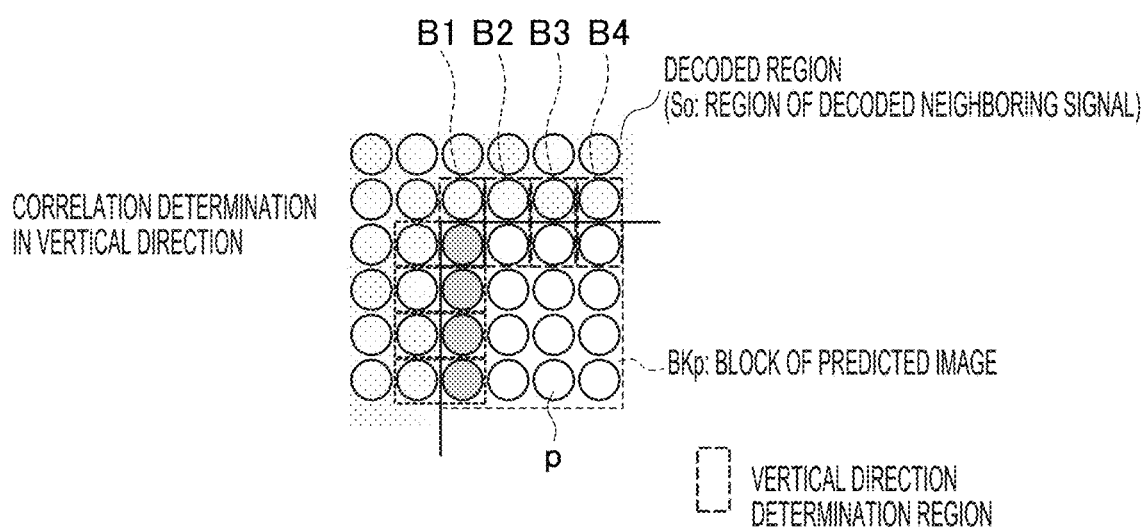

For example, the horizontal direction correlation determiner 101 obtains differences between neighboring pixels for each of four horizontal direction determination regions A1 to A4 illustrated in FIG. 10A. If the sum of the differences in the horizontal direction determination regions A1 to A4 is equal to or less than a predetermined threshold value, the horizontal direction correlation determiner 101 determines that the correlation is high, and otherwise, the horizontal direction correlation determiner 101 determines that the correlation is low. Similarly, the vertical direction correlation determiner 102 obtains differences between neighboring pixels for each of four vertical direction determination regions B1 to B4 illustrated in FIG. 10B. If the sum of the differences in the vertical direction determination regions B1 to B4 is equal to or less than a predetermined threshold value, the vertical direction correlation determiner 102 determines that the correlation is high, and otherwise, the vertical direction correlation determiner 102 determines that the correlation is low. Then, by applying the filter process in the direction of high correlation as illustrated in FIG. 5, the filter process can be determined to "execute only in the horizontal direction", "execute only in the vertical direction", "execute both in the horizontal direction, the vertical direction, or the corner", and "not execute in the horizontal direction, the vertical direction, and the corner". Then, when the filter process is performed only in the horizontal or vertical direction, a horizontal or vertical filter is applied to a pixel (prediction signal) located at the corner of the block of the predicted image.

The correlation determination region need not be necessarily identical to the filter process target region the same, but if so, the process becomes simple. In addition, it should be noted that various techniques are assumed for concrete processing methods of the correlation determination process and the filter process, and only one example is illustrated.

By configuring the filter processors 12 and 54 as in the present embodiment and applying the filter processors 12 and 54 to the image encoding device 1 and the image decoding device 5, respectively, it is possible to improve the encoding efficiency and suppress the deterioration of the image quality caused by this.

Third Embodiment

Image Encoding Device

Next, the filter processor 12 and an orthogonal transformation selection controller 25 related to a predicted image, which are main components of the present disclosure in the image encoding device 1 according to a third embodiment of the present disclosure, will be described with reference to FIGS. 1B and 11, and image encoding devices 1 of two specific examples will be described with reference to FIGS. 5 and 12 to 15. The following description focuses on differences from the above-described embodiment. That is, in the present embodiment, the same reference numerals are assigned to the same components as those in the above embodiment, and a further detailed description thereof will be omitted.

Figures 11A, 11B, 11C:
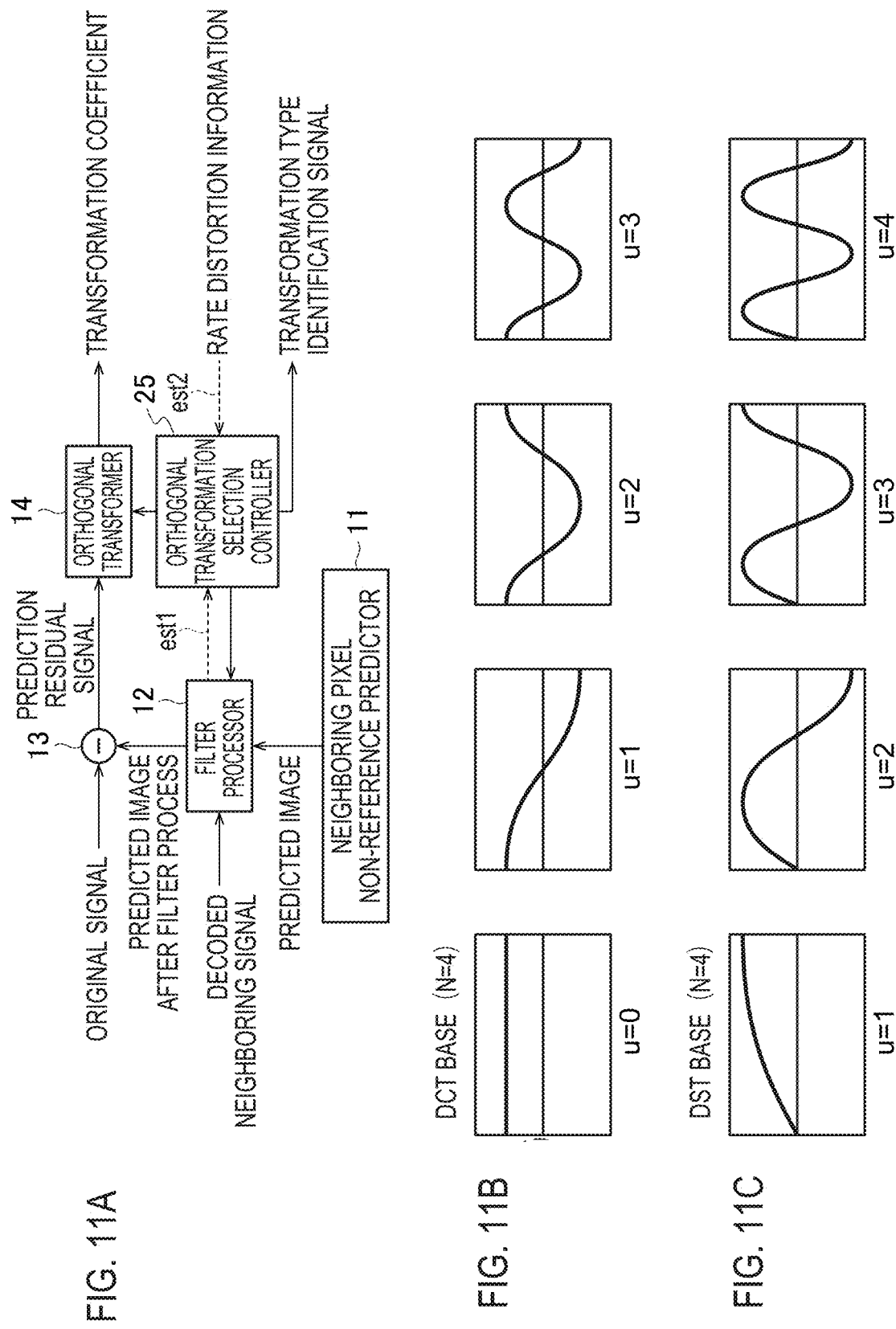
FIG. 11A is a block diagram of a periphery of a filter processor and an orthogonal transformation selection controller in an image encoding device according to a third embodiment of the present disclosure.
FIGS. 11B and 11C are diagrams illustrating an example of a base waveform of orthogonal transformation.

FIG. 11A is a block diagram of the periphery of the filter processor 12 and an orthogonal transformation selection controller 25 with respect to a predicted image in the image encoding device 1 according to the present embodiment, and FIG. 1B is an explanatory diagram illustrating an example of the filter process of the predicted image in the filter processor 12.

As illustrated in FIG. 11A, the image encoding device 1 according to the present embodiment includes the neighboring pixel non-reference predictor 11, the filter processor 12, the prediction residual signal generator 13, the orthogonal transformer 14, and an orthogonal transformation selection controller 25.

The filter processor 12 in the present embodiment is a functional part that, under the control of the orthogonal transformation selection controller 25, generates a predicted image including a new prediction signal by performing a low-pass filter process on the prediction signal by using decoded signals (decoded neighboring signals) neighboring to the left side and the upper side of the predicted image, among the pixel signals (prediction signals) in the block of the predicted image generated by the neighboring pixel non-reference predictor 11, and outputs the predicted image to the prediction residual signal generator 13.

Under the control of the orthogonal transformation selection controller 25, the orthogonal transformer 14 performs one of two types of orthogonal transformation processes on the prediction residual signal input from the prediction residual signal generator 13, and generates a transformation coefficient signal.

For example, as the two types of the orthogonal transformation processes, there are an orthogonal transformation process in which the end of the transformation base is closed (for example, DST (Discrete Sine Transform)), and an orthogonal transformation process in which the end of the transformation base is opened (for example, DCT (Discrete Cosine Transform)), and it is not limited as to whether it is real number precision or integer precision. For example, it can be an integer orthogonal transformation process defined by H.264 or H.265 which approximates an integer, as long as it conforms to the encoding method to be used.

Here, an example of a base waveform of an orthogonal transformation is illustrated in FIGS. 11B and 11C. In the examples illustrated in FIGS. 11B and 11C, with respect to four transformation bases (N=4) usable for orthogonal transformation of a block of a 4×4 prediction residual signal, transformation base waveforms from low to high frequencies (u=0 to 3 for DCT, u=1 to 4 for DST) are illustrated as patterns of frequency components of cosine and sine in the DCT transformation base (FIG. 11B) and the DST transformation base (FIG. 11C). As illustrated in FIGS. 11B and 11C, a main difference other than u=0 for DCT and u=4 for DST is a phase, and it can be seen that each transformation base (for example u=2) of the corresponding frequency has the same correlation between pixels at the same frequency (base amplitude is the same), and the phase is shifted by $\pi/2$. Then, even in any transformation base waveform, in the DCT, as illustrated in FIG. 11B, an orthogonal transformation process is realized in which the end point is opened with a large value and the end of the transformation base is opened. On the other hand, in the DST, as illustrated in FIG. 11C, an orthogonal transformation process is realized in which the end point is closed with a small value and the end of the transformation base is closed.

It should be noted that "the orthogonal transformation process in which the end of the transformation base is closed" refers to a state in which one end on the side close to the prediction reference block is closed in the block of the prediction residual signal, for example, may be an asymmetric DST type 7 of the transformation base with the other end opened as illustrated in FIG. 11C.

At the time of the neighboring pixel non-reference prediction, under a predetermined evaluation criterion, when the filter processor 12 performs a low-pass filter process on a pixel value (prediction signal) located at a block boundary of the predicted image, the orthogonal transformation selection controller 25 selectively controls the orthogonal transformation type to instruct the orthogonal transformer 14 to use an orthogonal transformation process (for example, DST), in which the end of the transformation base is closed, with respect to the block of the prediction residual signal obtained from the prediction residual signal generator 13 based on the block of the predicted image after the low-pass filter process. Under the predetermined evaluation criterion, when the low-pass filter process is not executed on the block of the predicted image, the orthogonal transformation selection controller 25 selectively controls the orthogonal transformation type to instruct the orthogonal transformer 14 to use an orthogonal transformation process (e.g., DCT), in which the end of the transformation base is opened, with respect to the block of the prediction residual signal. The orthogonal transformation selection controller 25 outputs, to the decoding side, a transformation type identification signal indicating which one of the two types of the orthogonal transformation processes has been applied as one of the encoding parameters.

Two examples will be described as the predetermined evaluation criterion in the orthogonal transformation selection controller 25.

As will be described in detail later, in the first embodiment, the orthogonal transformation selection controller 25 causes the filter processor 12 to select a signal of a filter process target region as illustrated in FIG. 1B, and instruct provisional execution of the low-pass filter process by using a decoded neighboring signal, and acquires each predicted image of execution/non-execution of the filter process as prediction block information (est1) from the filter processor 12. Subsequently, the orthogonal transformation selection controller 25 compares each predicted image of execution/non-execution of the filter process from the prediction block information (est1), and when the orthogonal transformation selection controller 25 determines that the influence of the end point of the prediction region (that is, a prediction residual signal for a pixel signal located at the outer periphery of the block of the predicted image) is relatively large with respect to the block size (4×4 is exemplified in this example, but the block size is not limited), the predicted image after the execution of the filter process is output from the filter processor 12 to the prediction residual signal generator 13. Then, the orthogonal transformation selection controller 25 instructs the orthogonal transformer 14 to use the orthogonal transformation process (for example, DST), in which the end of the transformation base is closed, with respect to the block of the prediction residual signal obtained from the prediction residual signal generator 13 based on the block of the predicted image after the low-pass filter process.

Subsequently, the orthogonal transformation selection controller 25 compares each predicted image of execution/non-execution of the filter process obtained from the filter processor 12, and when the orthogonal transformation selection controller 25 determines that the influence of the end point of the prediction region (that is, a prediction residual signal for a pixel signal located at the outer periphery of the block of the predicted image) is relatively small with respect to the block size (4×4 is exemplified in this example, but the block size is not limited), the predicted image of the non-execution of the filter process is output from the filter processor 12 to the prediction residual signal generator 13. Then, the orthogonal transformation selection controller 25 instructs the orthogonal transformer 14 to use the orthogonal transformation process (for example, DCT), in which the end of the transformation base is opened, with respect to the block of the prediction residual signal obtained from the prediction residual signal generator 13 based on the block of the predicted image of the non-execution of the low-pass filter process.

Here, various evaluation methods are assumed as to whether the influence of the end point of the prediction region is relatively large with respect to the block size (4×4 is exemplified in this example, but the block size is not limited), but for example, it may be determined whether it is equal to or higher than a predetermined level by a ratio comparison between a variance value of the density distribution of the end point of the prediction region and a variance value of the density distribution of the entire block size. As described above, in the first embodiment, the orthogonal transformation selection controller 25 determines the presence or absence of execution of the filter process based on the criterion for determining whether the filter process effect by the filter process is equal to or higher than a predetermined level, further determines the type of the orthogonal transformation process to be applied according to the presence or absence of execution of the filter process, and controls the filter processor 12 and the orthogonal transformer 14.

In addition, in the second embodiment, the orthogonal transformation selection controller 25 causes the filter processor 12 to select the signal of the filter process target region as illustrated in FIG. 1B, instructs provisional execution of the low-pass filter process by using the decoded neighboring signal, acquire and compares rate distortion information (est2) of the generated encoding amount (R) and the encoding distortion amount (D) in a case where the quantization process and the entropy encoding process are performed by orthogonal transformation using the orthogonal transformation process (for example, DST) in which the end of the transformation base is closed when the filter process is executed, and in a case where the quantization process and the entropy encoding process are performed by orthogonal transformation using the orthogonal transformation process (for example, DCT) in which the end of the transformation base is opened when the filter process is not executed, and selects a combination that is excellent as an RD cost (for example, a combination of execution of the filter process and DST, and a combination of non-execution of the filter process and the DCT).

With such RD optimization, the orthogonal transformation selection controller 25 causes the filter processor 12 to output the predicted image after the execution of the filter process to the prediction residual signal generator 13 when the combination of "the execution of the filter process and the orthogonal transformation process in which the end of transformation base is closed" is excellent, and instructs the orthogonal transformer 14 to use the orthogonal transformation process (for example, DST) in which the end of the transformation base is closed with respect to the block of the prediction residual signal obtained from the prediction residual signal generator 13 based on the block of the predicted image after the low-pass filter process.

On the other hand, the orthogonal transformation selection controller 25 causes the filter processor 12 to output the predicted image of the non-execution of the filter process to the prediction residual signal generator 13 when the combination of "the non-execution of the filter process and the orthogonal transformation process in which the end of the transformation base is opened" is excellent, and instructs the orthogonal transformer 14 to use the orthogonal transformation process (for example, DCT) in which the end of the transformation base is opened with respect to the block of the prediction residual signal obtained from the prediction residual signal generator 13 based on the block of the predicted image of the non-execution of the low-pass filter process.

As described above, in the second embodiment, the orthogonal transformation selection controller 25 determines the presence or absence of execution of the filter process based on the RD optimization, further determines the type of the orthogonal transformation process to be applied according to the presence or absence of execution of the filter process, and controls the filter processor 12 and the orthogonal transformer 14.

Finally, the image encoding device 1 according to the present embodiment performs a quantization process and an entropy encoding process on a transformation coefficient signal obtained from the orthogonal transformer 14 and outputs the resultant signal to the outside. Then, in the entropy encoding process, it is possible to transmit a video by transforming into a code by arithmetic encoding represented by CABAC together with various encoding parameters and the like. In addition to a transformation type identification signal according to the present disclosure, parameters that can be selected and set, such as inter-prediction parameters, intra-prediction parameters, parameters of a block size related to block division (block division parameter), quantization parameters related to a quantization process, and the like, can be included in the encoding parameters and transmitted.

Hereinafter, more specifically, the configuration of the image encoding device 1, in which the inter-predictor 11a based on the inter-prediction is adopted as the representative example of the neighboring pixel non-reference predictor 11 and the examples described above are applied as the predetermined evaluation criterion in the orthogonal transformation selection controller 25, will be described.

First Example

Figure 12:
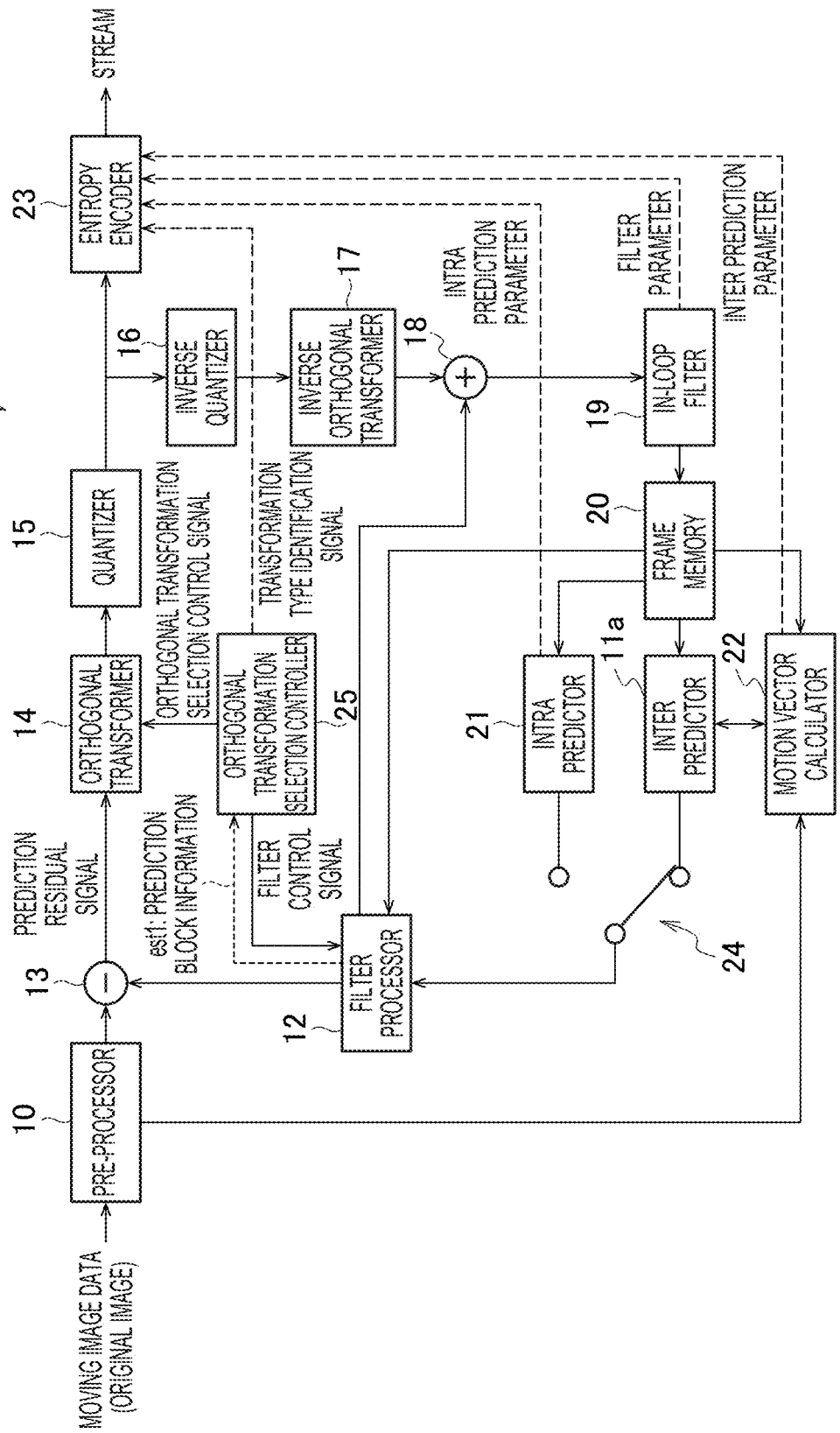
FIG. 12 is a block diagram illustrating a first example of the image encoding device according to the third embodiment of the present disclosure.

FIG. 12 is a block diagram illustrating a first example of the image encoding device 1 according to the present embodiment. The image encoding device 1 illustrated in FIG. 12 includes the pre-processor 10, the inter-predictor 11a, the filter processor 12, the prediction residual signal generator 13, the orthogonal transformer 14, the quantizer 15, the inverse quantizer 16, the inverse orthogonal transformer 17, the decoded image generator 18, the in-loop filter 19, the frame memory 20, the intra-predictor 21, the motion vector calculator 22, the entropy encoder 23, the predicted image selector 24, an orthogonal transformation selection controller 25.

Under the control of the orthogonal transformation selection controller 25, the orthogonal transformer 14 performs a predetermined orthogonal transformation process on the prediction residual signal input from the prediction residual signal generator 13, and generates a transformation coefficient signal.

Under the control of the orthogonal transformation selection controller 25, the filter processor 12 in the first example controls the execution and non-execution of the low-pass filter process, and generates a predicted image including a new prediction signal by performing a low-pass filter process on the prediction signal by using decoded signals (decoded neighboring signals) neighboring to the left side and the upper side of the predicted image, among the pixel signals (prediction signals) in the block of the predicted image generated by the inter-predictor 11a that is the neighboring pixel non-reference prediction at the time of the execution, and outputs the predicted image to the prediction residual signal generator 13. The predicted image generated by the inter-predictor 11a at the time of the non-execution is output to the prediction residual signal generator 13. At the time of the prediction other than the neighboring pixel non-reference prediction such as the intra-prediction, the filter processor 12 determines the presence or absence of the execution of the filter process according to a predetermined method.

Figure 13:
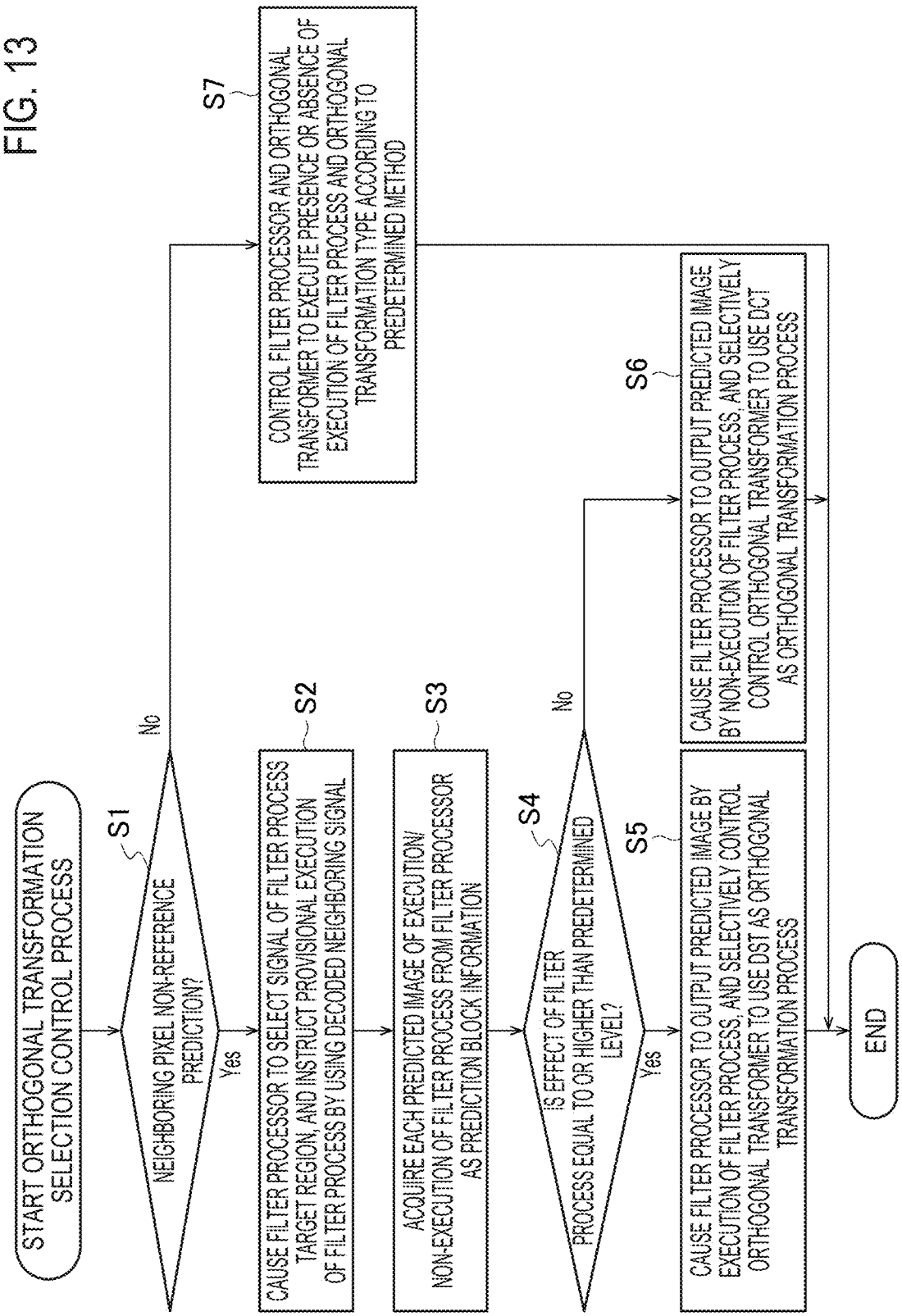
FIG. 13 is a flowchart of an orthogonal transformation selection control process of the first example in the image encoding device of the third embodiment according to the present disclosure.

The operation of the orthogonal transformation selection controller 25 in the first example will be described with reference to FIG. 13. FIG. 13 is a flowchart of the process of the orthogonal transformation selection controller 25 of the first example in the image encoding device 1 of the present embodiment. First, the orthogonal transformation selection controller 25 receives, for example, notification from the filter processor 12 or the predicted image selector 24, and determines whether the predicted image processed by the filter processor 12 is the neighboring pixel non-reference prediction (step S1).

When the predicted image is the neighboring pixel non-reference prediction (step S1: Yes), the orthogonal transformation selection controller 25 causes the filter processor 12 to select a signal of a filter process target region and instructs the provisional execution of the low-pass filter process by using the decoded neighboring signal (step S2).

For example, as illustrated in FIG. 5, the filter processor 12 defines, as a filter process target regions Sf, the pixel signals (prediction signals) on the leftmost side and the uppermost side of the predicted image among the pixel signals (prediction signals) in the 4×4 predicted image block. Subsequently, the filter processor 12 generates a predicted image including a new prediction signal by performing a low-pass filter process on the pixel signal (prediction signal) of the selected filter process target region by using the decoded signal (the decoded neighboring signal) neighboring on the left side and the upper side of the predicted image. For example, as illustrated in FIG. 5, the filter processor 12 generates a filtered predicted image by performing a smoothing filter process with a predetermined weighting factor for each of a horizontal filter region, a vertical filter region, and an angular filter region in the filter process target region Sf among the pixel signals (prediction signals) in the block Bkp of the 4×4 predicted image.

It should be noted that the filter process by the filter processor 12 may be a low-pass filter process, filter processes other than the smoothing filter may be applied, and the region of the decoded neighboring signal or the weighting factor used for the filter process are not necessarily limited to the example illustrated in FIG. 5. For example, in the case of a large-size encoded block, the filter process may be applied to a plurality of rows or columns. In addition, the filter type, the filter process target region, and the weighting factor, which are related to the filter process performed by the filter processor 12, may be configured to be transmitted as additional information of the encoding process, but need not be transmitted if they are determined in advance between transmission and reception (between encoding and decoding).

Subsequently, referring to FIG. 13, the orthogonal transformation selection controller 25 acquires, from the filter processor 12, each predicted image of execution/non-execution of the filter process as prediction block information (est1) (step S3).

Subsequently, the orthogonal transformation selection controller 25 compares each predicted image of execution/non-execution of the filter process from the prediction block information (est1), and determines whether the effect of the filter process is equal to or higher than a predetermined level according to whether the influence of the end point of the prediction region (that is, a prediction residual signal for a pixel signal located at the outer periphery of the block of the predicted image) is relatively large with respect to the block size (4×4 is illustrated in this example, but the block size is not limited) (step S4).

When it is determined that the influence of the end point of the prediction region is relatively large with respect to the block size (step S4: Yes), the orthogonal transformation selection controller 25 causes the filter processor 12 to output the predicted image after the execution of the filter process to the prediction residual signal generator 13, and instructs the orthogonal transformer 14 to use the orthogonal transformation process (for example, DST) in which the end of the transformation base is closed, with respect to the block of the prediction residual signal obtained from the prediction residual signal generator 13 based on the block of the predicted image after the low-pass filter process (step S5).

On the other hand, when it is determined that the influence of the end point of the prediction region is relatively smaller with respect to the block size (step S4: No), the orthogonal transformation selection controller 25 causes the filter processor 12 to output the predicted image of the non-execution of the filter process to the prediction residual signal generator 13, and instructs the orthogonal transformer 14 to use the orthogonal transformation process (for example, DCT) in which the end of the transformation base is opened, with respect to the block of the prediction residual signal obtained from the prediction residual signal generator 13 based on the block of the predicted image of the non-execution of the low-pass filter process (step S6).

At the time of the prediction other than the neighboring pixel non-reference prediction such as the intra-prediction (step S1: No), the orthogonal transformation selection controller 25 controls the filter processor 12 and the orthogonal transformer 14 so that the presence or absence of the execution of the filter process and the orthogonal transformation type are executed according to a predetermined method (step S7).

As described above, in the first example, the orthogonal transformation selection controller 25 controls the filter processor 12 and the orthogonal transformer 14 to determine the presence or absence of execution of the filter process and the type of the orthogonal transformation process to be applied, based on the criterion for determining whether the filter process effect by the filter process is equal to or higher than a predetermined level. Then, the orthogonal transformation selection controller 25 outputs, to the decoding side through the entropy encoder 23, a transformation type identification signal indicating which one of the two types of the orthogonal transformation processes has been applied as one of the encoding parameters.

As described above, since the filter processor 12 and the orthogonal transformer 14 are controlled to determine the presence or absence of execution of the filter process and the type of the orthogonal transformation process to be applied, based on the criterion for determining whether the filter process effect by the filter process is equal to or higher than a predetermined level, the residual component in the prediction residual signal can be further reduced, and the encoding efficiency can be improved by reducing the amount of information to be encoded and transmitted.

In particular, even at the time of the neighboring pixel non-reference prediction, since the correlation between neighboring pixel signals is used for the block of the prediction residual signal obtained based on the block of the predicted image after the filter process and the orthogonal transformation process (for example, DST) in which the end of the transformation base is closed is used, not only the phase but also the feature of the transformation base corresponding to the end point of the prediction region are matched, thereby improving the encoding efficiency more remarkably.

Second Example

Figure 14:
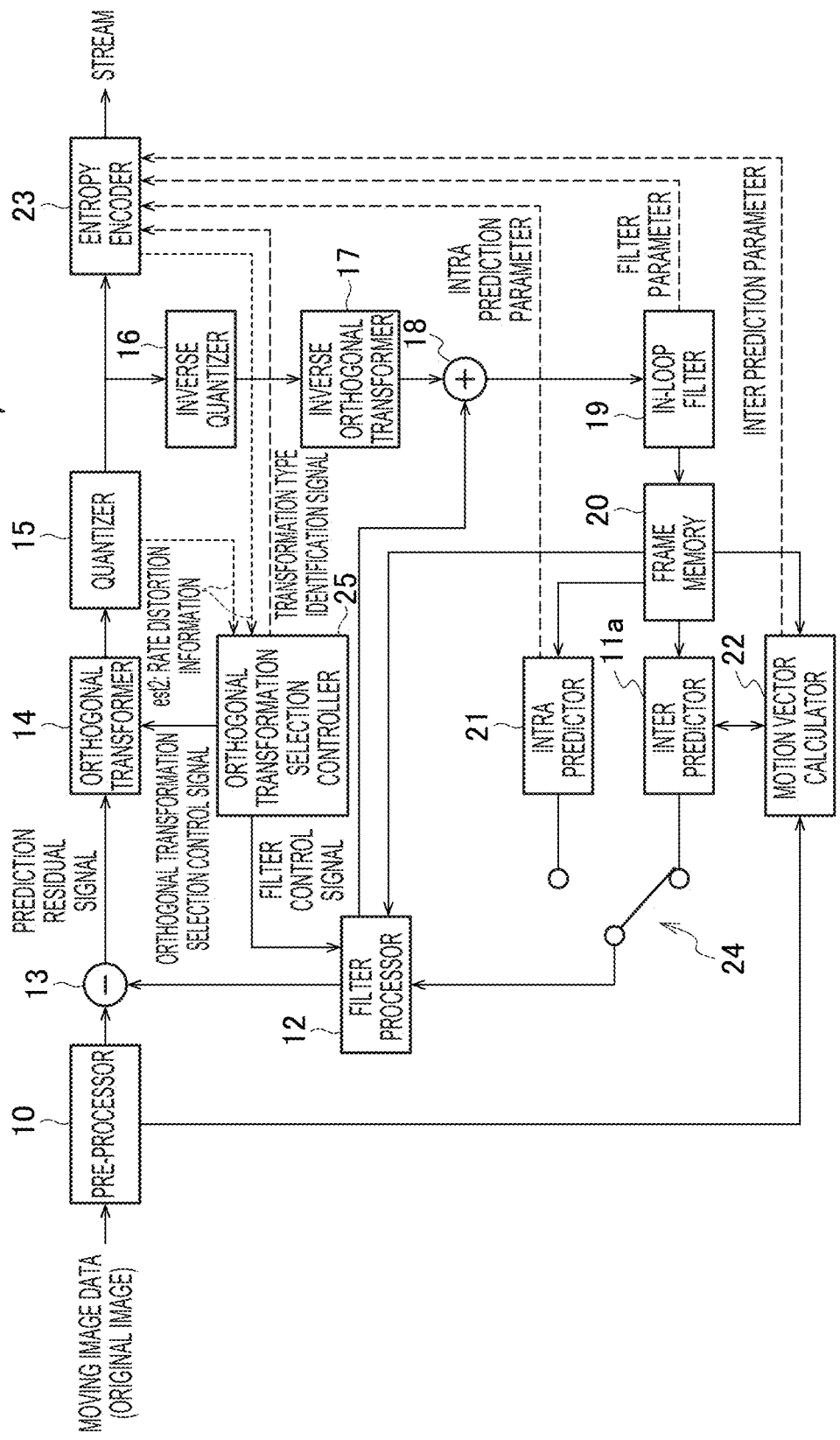
FIG. 14 is a block diagram illustrating a second example of the image encoding device according to the third embodiment of the present disclosure.

Next, a second example will be described, FIG. 14 is a block diagram illustrating a second example of the image encoding device 1 according to the present embodiment. In FIG. 14, the same reference numerals are assigned to the same components as those in FIG. 12, and a further detailed description thereof will be omitted.

Similarly to the first example, under the control of the orthogonal transformation selection controller 25, the filter processor 12 in the second example controls the execution and non-execution of the low-pass filter process, and generates a predicted image including a new prediction signal by performing a low-pass filter process on the prediction signal by using decoded signals (decoded neighboring signals) neighboring to the left side and the upper side of the predicted image, among the pixel signals (prediction signals) in the block of the predicted image generated by the inter-predictor 11a that is the neighboring pixel non-reference prediction, and outputs the predicted image to the prediction residual signal generator 13. The predicted image generated by the inter-predictor 11a at the time of the non-execution is output to the prediction residual signal generator 13. At the time of the prediction other than the neighboring pixel non-reference prediction such as the intra-prediction, the filter processor 12 determines the presence or absence of the execution of the filter process according to a predetermined method.

Figure 15:
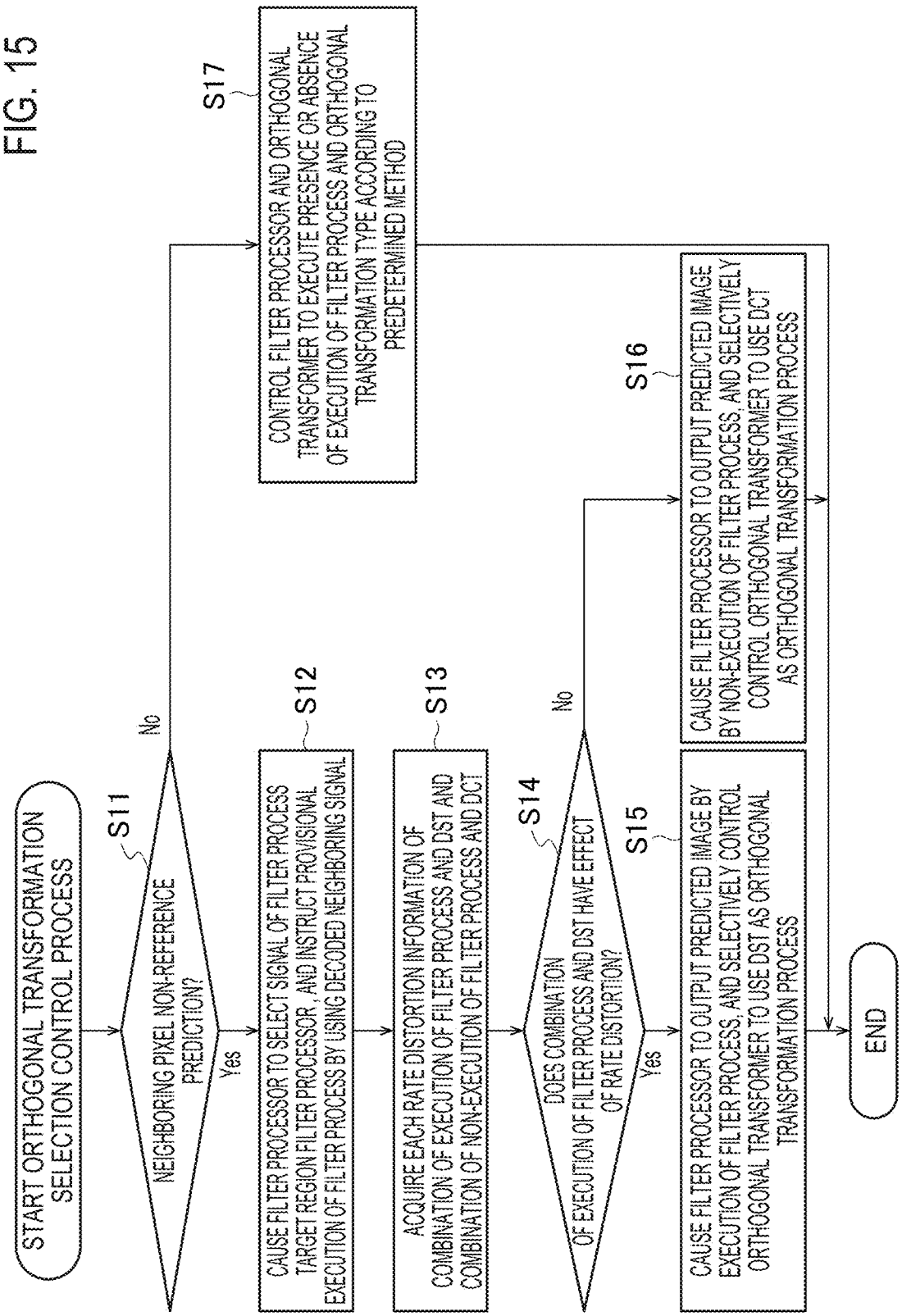
FIG. 15 is a flowchart of an orthogonal transformation selection control process of the second example in the image encoding device of the third embodiment according to the present disclosure.

The operation of the orthogonal transformation selection controller 25 in the second example will be described with reference to FIG. 15. FIG. 15 is a flowchart of the process of the orthogonal transformation selection controller 25 of the second example in the image encoding device 1 of the present embodiment. First, the orthogonal transformation selection controller 25 receives, for example, notification from the filter processor 12 or the predicted image selector 24, and determines whether the predicted image processed by the filter processor 12 is the neighboring pixel non-reference prediction (step S11).

When the predicted image is the neighboring pixel non-reference prediction (step S11: Yes), the orthogonal transformation selection controller 25 causes the filter processor 12 to select a signal of a filter process target region as illustrated in FIG. 1B, and instructs the provisional execution of the low-pass filter process by using the decoded neighboring signal (step S12).

Subsequently, the orthogonal transformation selection controller 25 causes the filter processor 12 to output the predicted image after the execution of the filter process to the prediction residual signal generator 13 by using the orthogonal transformation process (for example, DST), in which the end of the transformation base is closed, with respect to the orthogonal transformer 14 upon the execution of the filter process of the filter processor 12, performs the orthogonal transformation on the block of the prediction residual signal obtained from the prediction residual signal generator 13 based on the block of the predicted image after the low-pass filter process, outputs the predicted image of the non-execution of the filter process from the filter processor 12 to the prediction residual signal generator 13 by using the orthogonal transformation process (for example, DCT) in which the end of the transformation base is opened with respect to the orthogonal transformer 14 in a case where the quantization process and the entropy encoding process are performed by the quantizer 15 and the entropy encoder 23 and at the time of the non-execution of the filter process of the filter processor 12, performs the orthogonal transformation on the block of the prediction residual signal obtained from the prediction residual signal generator 13 based on the block of the predicted image of the non-execution of the low-pass filter process, and acquires rate distortion information (est2) of each generated encoding amount (R) and the encoding distortion amount (D) from the quantizer 15 and the entropy encoder 23 in a case where the quantization process and the entropy encoding process are performed by the quantizer 15 and the entropy encoder 23 (step S13).

Subsequently, the orthogonal transformation selection controller 25 compares and determines, from the rate distortion information (est2), which combination (for example, a combination of the execution of the filter process and the DST, a combination of the non-execution of the filter process and the DCT) is excellent as RD cost (step S14).

When the orthogonal transformation selection controller 25 determines that the execution of the filter process and the use of the orthogonal transformation process (for example, DST), in which the end of the transformation base is closed, is excellent as the RD cost (step S14: Yes), the predicted image after the execution of the filter process is output from the filter processor 12 to the prediction residual signal generator 13, and the orthogonal transformer 14 is instructed to use the orthogonal transformation process (for example, DST), in which the end of the transformation base is closed, with respect to the block of the prediction residual signal obtained from the prediction residual signal generator 13 based on the block of the predicted image after the low-pass filter process (step S15).

On the other hand, when the orthogonal transformation selection controller 25 determines that the non-execution of the filter process and the use of the orthogonal transformation process (for example, DCT), in which the end of the transformation base is opened, is excellent as the RD cost (step S14: No), the predicted image of the non-execution of the filter process is output from the filter processor 12 to the prediction residual signal generator 13, and the orthogonal transformer 14 is instructed to use the orthogonal transformation process (for example, DCT), in which the end of the transformation base is opened, with respect to the block of the prediction residual signal obtained from the prediction residual signal generator 13 based on the block of the predicted image of the non-execution of the low-pass filter process (step S16).

At the time of the prediction other than the neighboring pixel non-reference prediction such as the intra-prediction (step S11: No), the orthogonal transformation selection controller 25 controls the filter processor 12 and the orthogonal transformer 14 so that the presence or absence of the execution of the filter process and the orthogonal transformation type are executed according to a predetermined method (step S17).

As described above, in the second example, the orthogonal transformation selection controller 25 controls the filter processor 12 and the orthogonal transformer 14 to determine the presence or absence of execution of the filter process and the type of the orthogonal transformation process to be applied, based on the result selected by the RD optimization. Then, the orthogonal transformation selection controller 25 outputs, to the decoding side through the entropy encoder 23, a transformation type identification signal indicating which one of the two types of the orthogonal transformation processes has been applied as one of the encoding parameters.

As described above, since the orthogonal transformation selection controller 25 controls the filter processor 12 and the orthogonal transformer 14 to determine the presence or absence of execution of the filter process and the type of the orthogonal transformation process to be applied, based on the result selected by the RD optimization, the residual component in the prediction residual signal can be further reduced, and the encoding efficiency can be improved by reducing the amount of information to be encoded and transmitted.

In particular, even at the time of the neighboring pixel non-reference prediction, since the execution of the filter process is permitted, the correlation between neighboring pixel signals is used for the block of the prediction residual signal obtained based on the block of the predicted image after the filter process and the orthogonal transformation process (for example, DST) in which the end of the transformation base is closed is used, not only the phase but also the feature of the transformation base corresponding to the end point of the prediction region are matched, thereby improving the encoding efficiency more remarkably.

Image Decoding Device

Next, the peripheral functional blocks of the filter processor 54 and the inverse orthogonal transformation selection controller 60, which are the main components of the image decoding device 5 according to the present embodiment, will be described with reference to FIG. 16, and a specific typical example of the image decoding device 5 will be described with reference to FIG. 17.

Figure 16:
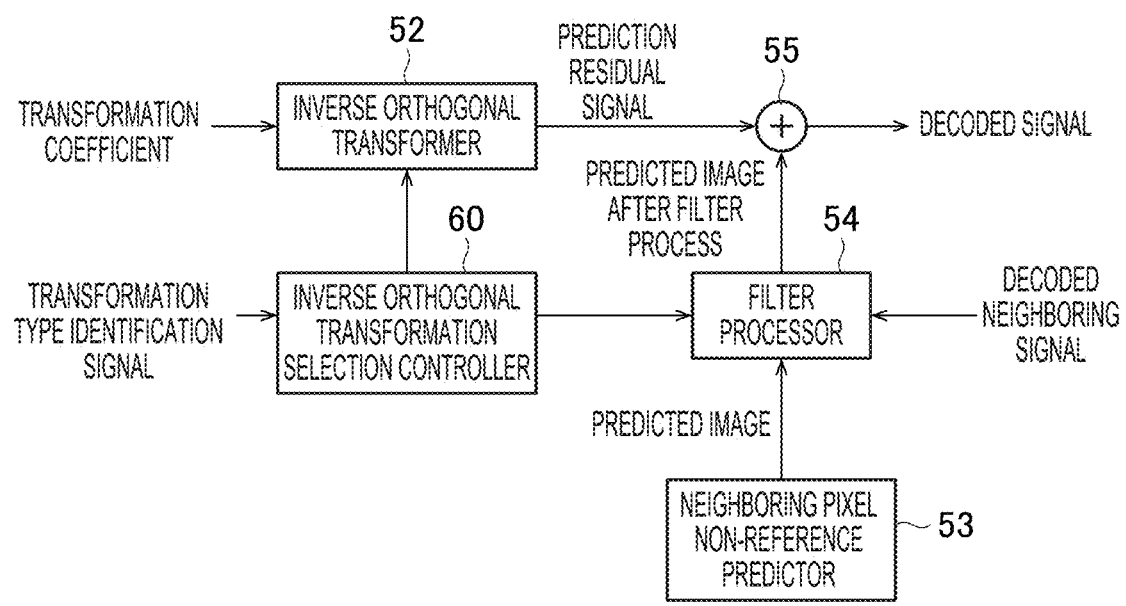
FIG. 16 is a block diagram of the periphery of the filter processor and an inverse orthogonal transformation selection controller in the image decoding device according to the third embodiment of the present disclosure.

FIG. 16 is a block diagram of the periphery of the filter processor 54 and the inverse orthogonal transformation selection controller 60 with respect to the predicted image in the image decoding device 5 according to the present embodiment. As illustrated in FIG. 16, the image decoding device 5 according to the present embodiment includes an inverse orthogonal transformer 52, a neighboring pixel non-reference predictor 53, a filter processor 54, a decoded image generator 55, and an inverse orthogonal transformation selection controller 60.

Under the control of the inverse orthogonal transformation selection controller 60, the inverse orthogonal transformer 52 receives the stream signal transmitted from the image encoding device 1 side, performs an inverse orthogonal transformation process on transformation coefficients reconstructed through a entropy decoding process and an inverse quantization process, and outputs the obtained prediction residual signal to the decoded image generator 55.

The filter processor 54 is a functional part corresponding to the filter processor 12 on the image encoding device 1 side. Under the control of the inverse orthogonal transformation selection controller 60, the filter processor 54 controls the execution and non-execution of the low-pass filter process, generates a predicted image including a new prediction signal by performing a low-pass filter process on the prediction signal by using decoded signals (decoded neighboring signals) neighboring to the left side and the upper side of the predicted image, among the pixel signals (prediction signals) in the block of the predicted image generated by the neighboring pixel non-reference predictor 53 at the time of the execution, and outputs the predicted image to the decoded image generator 55. The predicted image generated by the neighboring pixel non-reference predictor 53 at the time of the non-execution is output to the decoded image generator 55. At the time of the prediction other than the neighboring pixel non-reference prediction such as intra-prediction, the filter processor 54 corresponds to the encoding side and determines the presence or absence of the execution of the filter process according to a predetermined method.

At the time of the neighboring pixel non-reference prediction, when the use of the orthogonal transformation process (for example, DST), in which the end of the transformation base is closed, is indicated with respect to the transformation coefficient to be processed, with reference to the transformation type identification signal obtained from the image encoding device 1 side, the inverse orthogonal transformation selection controller 60 performs selective control by instructing the inverse orthogonal transformer 52 to apply the inverse orthogonal transformation process (for example, IDST), in which the end of the transformation base is closed with respect to the reconstructed transformation coefficient, and instructs the filter processor 54 to execute the corresponding low-pass filter process.

On the other hand, when the use of the orthogonal transformation process (for example, DCT), in which the end of the transformation base is opened, is indicated with reference to the transformation type identification signal obtained from the image encoding device 1 side, the inverse orthogonal transformation selection controller 60 performs selective control by instructing the inverse orthogonal transformer 52 to apply the inverse orthogonal transformation process (for example, IDCT), in which the end of the transformation base is opened with respect to the reconstructed transformation coefficient, and instructs the filter processor 54 not to execute the corresponding low-pass filter process.

That is, the prediction residual signal generated through the filter process on the predicted image by the filter processor 12 in the image encoding device 1 is transmitted through the orthogonal transformation process (for example, DST), in which the end of the transformation base is closed, in a state in which the video encoding efficiency is improved, and the image decoding device 5 can efficiently reconstruct the video related to this transmission. Similarly to the case of the filter processor 12, the filter processor 54 may use a filter other than the smoothing filter as long as the filter process is a low-pass filter process, and the region of the decoded neighboring signal or the weighting factor used for the filter process may be appropriately determined. Then, when the filter type, the filter process target region, and the weighting factor, which are related to the filter process by the filter processor 12 from the image encoding device 1 side, are determined in advance between transmission and reception (between encoding and decoding), or are transmitted as additional information of the encoding process, the accuracy of the decoded signal can be improved by performing the filter process similarly to the filter processor 54 of the image decoding device 5 according to this.

Next, the inter-predictor 53$a$ based on the inter-prediction will be described as a representative example of the neighboring pixel non-reference predictor 53, and a configuration example of the image decoding device 5 to which the inverse orthogonal transformation selection controller 60 that selectively controls the inverse orthogonal transformer 52 and the filter processor 54 is applied with respect to the prediction signal by the inter-prediction will be described.

Figure 17:
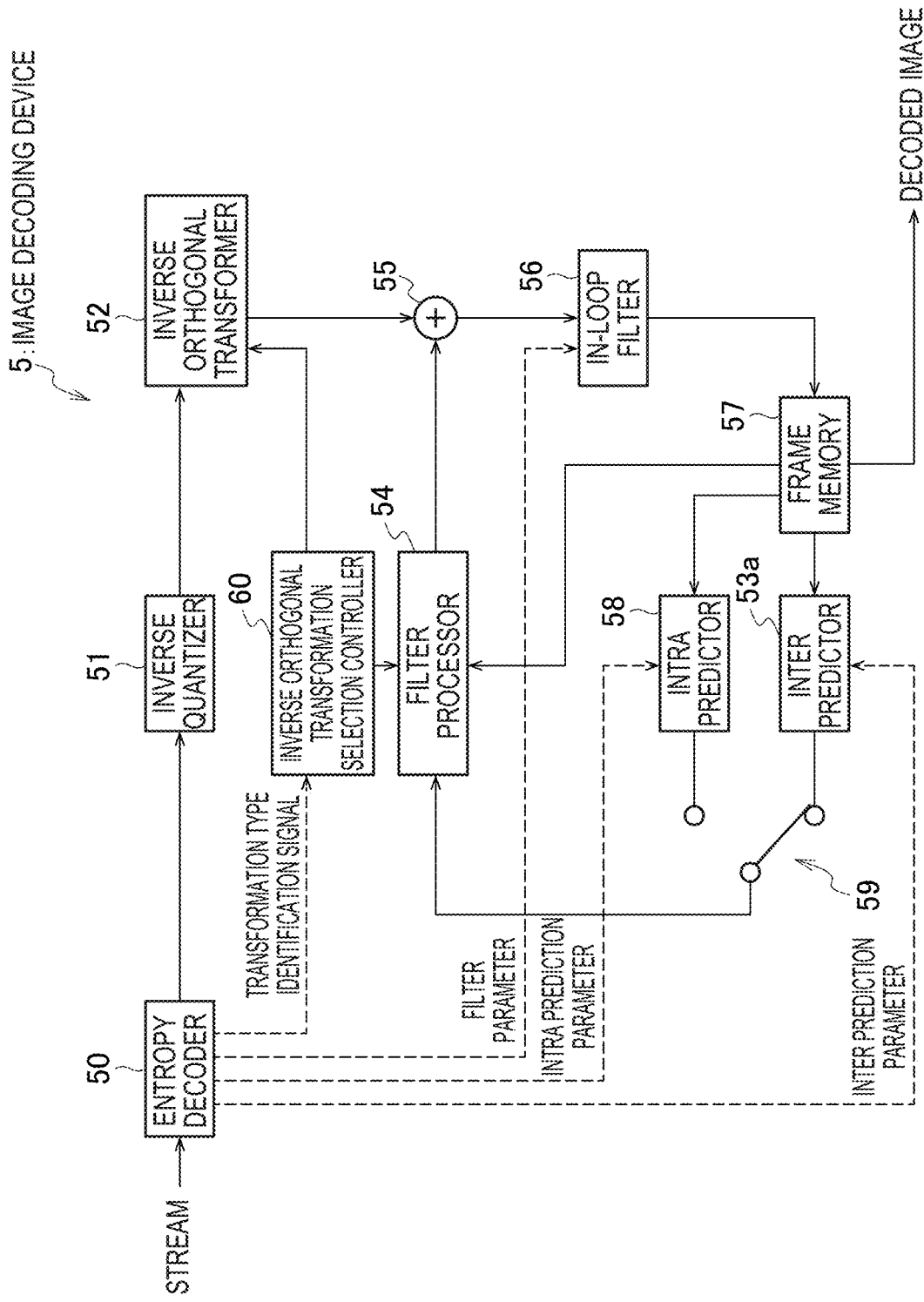
FIG. 17 is a block diagram illustrating an example in the image decoding device according to the third embodiment of the present disclosure.

FIG. 17 is a block diagram illustrating an example of the image decoding device 5 according to the present embodiment. The image decoding device 5 illustrated in FIG. 17 includes an entropy decoder 50, an inverse quantizer 51, an inverse orthogonal transformer 52, an inter-predictor 53$a$, a filter processor 54, a decoded image generator 55, an in-loop filter 56, a frame memory 57, an intra-predictor 58, a predicted image selector 59, and an inverse orthogonal transformation selection controller 60.

Under the control of the inverse orthogonal transformation selection controller 60, the inverse orthogonal transformer 52 reconstructs the prediction residual signal by performing an inverse orthogonal transformation process corresponding to the orthogonal transformation process of the image encoding device 1 to the transformation coefficient obtained from the inverse quantizer 51, and outputs the reconstructed prediction residual signal to the decoded image generator 55.

Under the control of the inverse orthogonal transformation selection controller 60, the filter processor 54 operates in the same manner as that illustrated and described with reference to FIG. 5. That is, the filter process in the filter processor 54 according to the present embodiment is performed when the predicted image is the neighboring pixel non-reference prediction, that is, in this example, when it is the inter-prediction, the pixel signal (prediction signal) of the predetermined filter process target region is selected from the predicted image, a predicted image including a new prediction signal is generated by performing a low-pass filter process on the pixel signal (prediction signal) of the selected filter process target region by using decoded signals (decoded neighboring signals) neighboring on the left side or the upper side of the predicted image, and is output to the decoded image generator 55. For example, as illustrated in FIG. 5, under the control of the inverse orthogonal transformation selection controller 60, the filter processor 54 performs a smoothing filter process with a predetermined weighting factor for each of the horizontal filter region, the vertical filter region, and the angular filter region in the filter process target region Sf among the pixel signals (prediction signals) in the block Bkp of the predicted image by using the decoded neighboring signal So around the block boundary of the block Bkp of the predicted image, and outputs the resultant signal to the decoded image generator 55.

Figure 18:
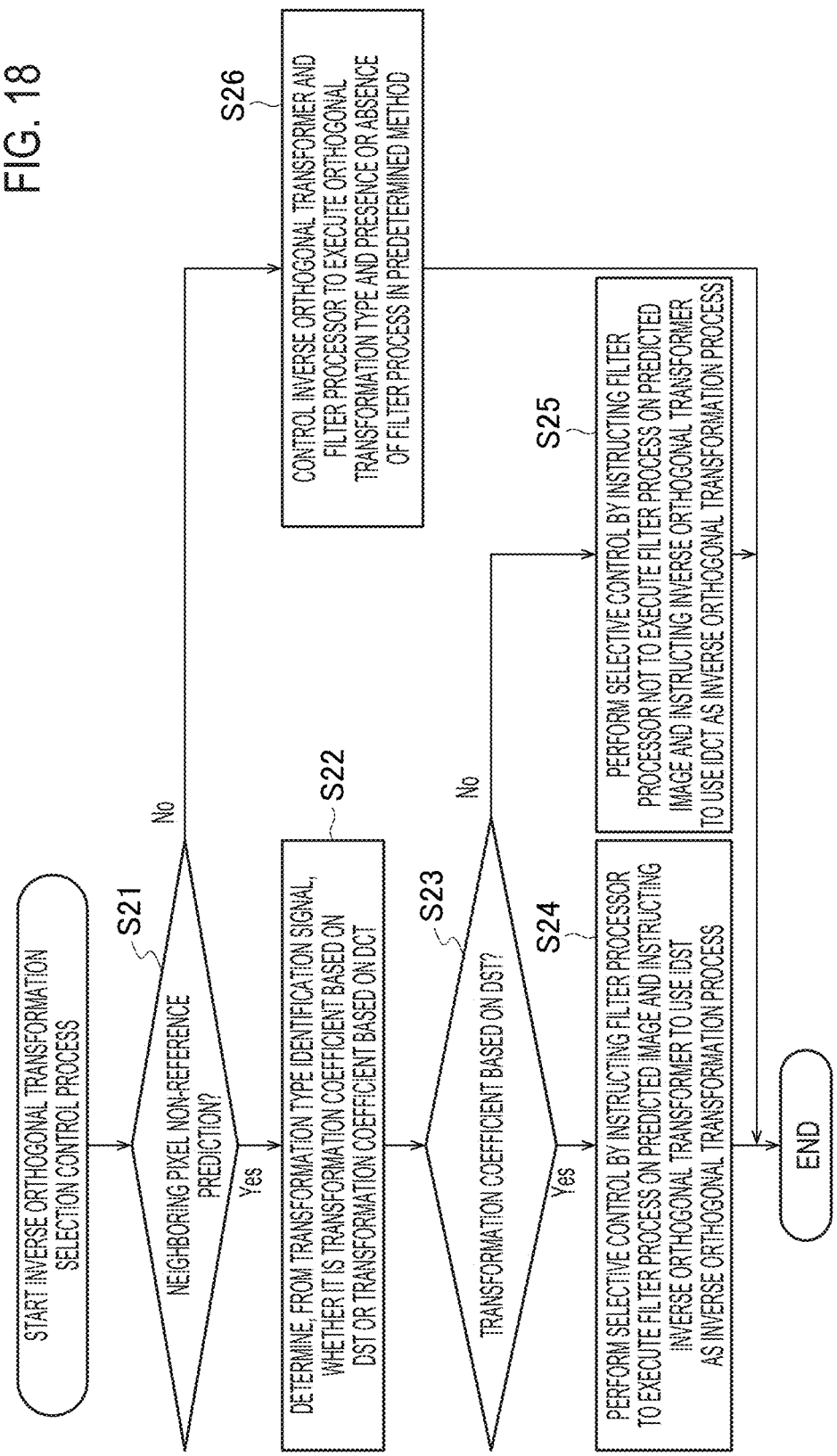
FIG. 18 is a flowchart of an inverse orthogonal transformation selection control process of an example in the image decoding device according to the third embodiment of the present disclosure.

The operation of the inverse orthogonal transformation selection controller 60 will be described with reference to FIG. 18. FIG. 18 is a flowchart of the process of the inverse orthogonal transformation selection controller 60 according to an example in the image decoding device 5 of the present embodiment. First, the inverse orthogonal transformation selection controller 60 grasps a current processing state by receiving, from the predicted image selector 59, a notification as to whether the current processing state is a neighboring pixel non-reference prediction (step S21).

Subsequently, when the current processing state is the neighboring pixel non-reference prediction (step S21: Yes), the inverse orthogonal transformation selection controller 60 determines whether the orthogonal transformation process (for example, DST) in which the end of the transformation base is closed is used with respect to the transformation coefficient, with reference to the transformation type identification signal obtained from the image encoding device 1, and whether the orthogonal transformation process (for example, DCT) in which the end of the transformation base is opened is used with respect to the transformation coefficient (step S22).

Subsequently, when the inverse orthogonal transformation selection controller 60 determines that the orthogonal transformation process (for example, DST) in which the end of the transformation base is closed with respect to the transformation coefficient is used (step S23: Yes), the inverse orthogonal transformation selection controller 60 performs selective control by instructing the filter processor 54 to execute the low-pass filter process and instructing the inverse orthogonal transformer 52 to apply the inverse orthogonal transformation process (for example, IDST) in which the end of the transformation base is closed with respect to the transformation coefficient reconstructed through the inverse quantizer 51, and causes the inverse orthogonal transformer 52 to generate a prediction residual signal to be added to the predicted image obtained through the filter processor 54 (step S24).

Subsequently, when the inverse orthogonal transformation selection controller 60 determines that the orthogonal transformation process (for example, DCT) in which the end of the transformation base is opened with respect to the transformation coefficient is used (step S23: No), the inverse orthogonal transformation selection controller 60 instructs the filter processor 54 not to execute the low-pass filter process, performs selective control by instructing the inverse orthogonal transformer 52 to apply the inverse orthogonal transformation process (for example, IDCT) in which the end of the transformation base is opened with respect to the transformation coefficient reconstructed through the inverse quantizer 51, and causes the inverse orthogonal transformer 52 to generate a prediction residual signal to be added to the predicted image obtained through the filter processor 54 (step S25).

At the time of the prediction other than the neighboring pixel non-reference prediction such as the intra-prediction (step S21: No), the inverse orthogonal transformation selection controller 60 controls the inverse orthogonal transformer 52 and the filter processor 54 so that the presence or absence of the execution of the filter process and the orthogonal transformation type are executed according to a predetermined method (step S26).

As described above, since the inverse orthogonal transformer 52 and the filter processor 54 are controlled to determine a type of the inverse orthogonal transformation process to be applied and the presence or absence of the execution of the filter process with reference to the transformation type identification signal obtained from the image encoding device 1, the inverse orthogonal transformation selection controller 60 can reduce the residual component in the prediction residual signal on the image encoding device 1 side and can perform decoding with a small amount of information, thereby improving the encoding efficiency by a series of processes on the encoding side and the decoding side.

In particular, even at the time of the neighboring pixel non-reference prediction, since the inverse orthogonal transformation process (for example, IDST) in which the end of the transformation base is closed is used for the block of the prediction residual signal obtained based on the block of the predicted image after the filter process, with corresponding to the encoding device 1 side, not only the phase but also the feature of the transformation base corresponding to the end point of the prediction region are matched, thereby improving the encoding efficiency more remarkably.

According to the image encoding device 1 and the image decoding device 5 of the present embodiment configured as described above, since a signal error occurring between the prediction signal of the predicted image and the neighboring decoded block signal is reduced and the encoding efficiency is improved, it is possible to realize an image encoding device and an image decoding device of a video encoding method with high encoding efficiency.

Image Encoding Device

Next, the filter processor 12 related to a predicted image, which is a main component of the present disclosure in the image encoding device 1 according to a fourth embodiment of the present disclosure, will be described with reference to FIGS. 19 and 20, and the image encoding device 1 of a specific typical example will be described with reference to FIGS. 4, 21, and 22. The following description focuses on differences from the above-described embodiment. That is, in the present embodiment, the same reference numerals are assigned to the same components as those in the above embodiment, and a further detailed description thereof will be omitted.

Comprehensively, similarly to the intra-prediction for a predicted image used for the inter-prediction, the image encoding device 1 of the present embodiment reduces the prediction residual signal for the leftmost and uppermost regions of the predicted image of the inter-prediction by applying, for example, a low-pass filter process by using an encoded and decoded neighboring signal, divides the block of the prediction residual signal, and applies one of the DST and the DCT according to the directionality of the low-pass filter process. According to the current H.265 standard, the block size of the predicted image to which the DST can be applied is limited to only a small block size (for example, 4×4). Therefore, in the image encoding device 1 of the present embodiment, in the inter-prediction in the block of a larger predicted image, after applying the low-pass filter process to the predicted image, block division is performed up to a prescribed block size (for example, a block size to which DST according to the standard is allowed to be applied), and then which one of the DST and the DCT is applied is determined without any flag and the corresponding orthogonal transformation process is executed.

FIG. 19A is a block diagram of the periphery of the filter processor 12 with respect to a predicted image in the image encoding device 1 according to the present embodiment, and FIG. 19B is an explanatory diagram illustrating an example of the filter process of the predicted image in the filter processor 12.

As illustrated in FIG. 19A, the image encoding device 1 according to the present embodiment includes the neighboring pixel non-reference predictor 11, the filter processor 12, the prediction residual signal generator 13, and the orthogonal transformer 14. The orthogonal transformer 14 includes a block divider 141 and an orthogonal transformation selection applier 142.

The filter processor 12 in the present embodiment is a functional part that generates a prediction signal including a new prediction signal by performing a low-pass filter process on the prediction signal by using decoded signals (decoded neighboring signals) neighboring to the left side and the upper side of the predicted image, among the pixel signals (prediction signals) in the block of the predicted image generated by the neighboring pixel non-reference predictor 11, and outputs the predicted image to the prediction residual signal generator 13.

For example, as illustrated in FIG. 19B, when the block Bkp of the predicted image including 8×8 pixel signals p corresponding to the block Bko of the encoding target region of the original image is generated by the neighboring pixel non-reference predictor 11, the filter processor 12 generates a predicted image including a new prediction signal by performing a low-pass filter process such as a smoothing filter (indicated by a double arrow) such as a horizontal filter, a vertical filter, and an angular filter by setting pixel signals (prediction signals) on the leftmost side and the uppermost side in the predicted image as a signal Sf of the filter target region, by using a decoded neighboring signal So in the vicinity of the block boundary of the block Bkp of the predicted image neighboring on the predicted image.

More specifically, in the example illustrated in FIG. 19B, for the smoothing filter target pixel on the upper side of the block Bkp of the predicted image, a smoothing filter process is performed by using the decoded neighboring signal (pixel signal of a locally decoded image) located at the same coordinates in the transverse direction, and for the smoothing filter target pixel on the left side, a smoothing filter process is performed by using the decoded neighboring signal (pixel signal of the locally decoded image) located at the same coordinate in the longitudinal direction. For the target pixels located on the upper side and the left side, a smoothing filter process is performed by using the pixels of the locally decoded video on the upper and left sides. In the example illustrated in FIG. 19B, a 3-tap smoothing filter process using two pixels of the reference pixel is applied. For example, a low-pass filter process such as ¼[1 2 1] is applied. The number of taps and reference pixels in the low-pass filter process are not limited to this example.

The orthogonal transformer 14 includes the block divider 141 and the orthogonal transformation selection applier 142. The block divider 141 divides the block of the prediction residual signal input from the prediction residual signal generator 13 into a block shape designated in advance and outputs the same to the orthogonal transformation selection applier 142. For each block of the block-divided prediction residual signal, the orthogonal transformation selection applier 142 selectively applies a plurality of types of orthogonal transformation processes (a combination of longitudinal/transverse DST and longitudinal/transverse DCT) according to the position to which the filter process is applied by the filter processor 12.

For example, as illustrated in FIG. 19B, the block divider 141 divides the block of the prediction residual signal with respect to the block Bkp of the predicted image including a 8×8 pixel signal p into four groups of 4×4 prediction residual signals (upper left, upper right, lower left, and lower right) and outputs the divided blocks to the orthogonal transformation selection applier 142. At this time, the orthogonal transformation selection applier 142 applies a plurality of types of orthogonal transformation processes (a combination of the longitudinal/transverse DST and the longitudinal/transverse DCT) corresponding to the positions to which the smoothing filter process is applied, in order to be able to handle transformation coefficients using the high degree of correlation for blocks of decoded neighboring signals with respect to the divided block of the prediction residual signal located at the upper end and the left end including the pixel position to which the smoothing filter process is applied among the divided blocks divided by the block divider 141, and applies the orthogonal transformation process of longitudinal and transverse DCTs for the other divided blocks. The longitudinal direction means the vertical direction, and the transverse direction means the horizontal direction. Here, it is assumed that the orthogonal transformation process including the longitudinal DST and the transverse DCT is a first orthogonal transformation process, the orthogonal transformation process including the transverse DST and the longitudinal DCT is a second orthogonal transformation process, the orthogonal transformation process including the longitudinal and transverse DSTs is a third orthogonal transformation process, and the orthogonal transformation process including the longitudinal and transverse DCTs is a fourth orthogonal transformation process.

Figure 20A:
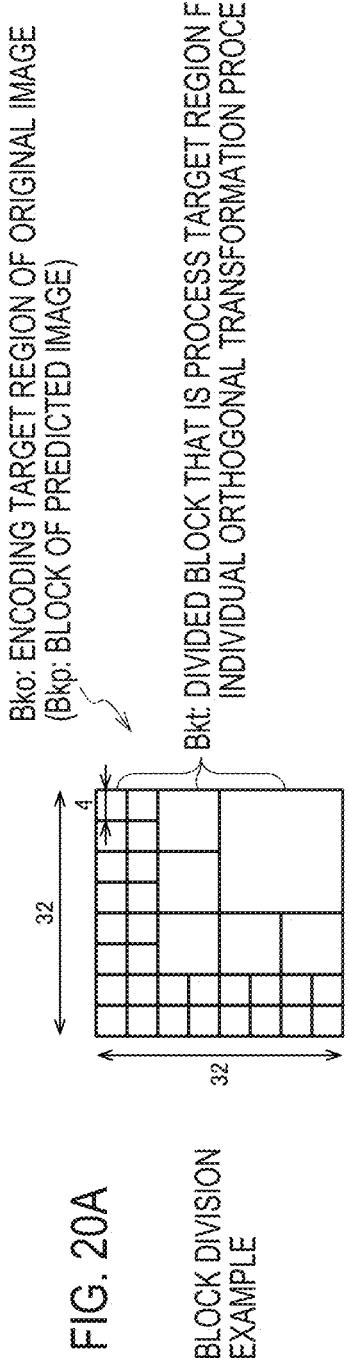
FIGS. 20A, 20B, and 20C are explanatory diagrams exemplifying an orthogonal transformation application block after block division with respect to the predicted image according to the present disclosure.
Figure 20B:
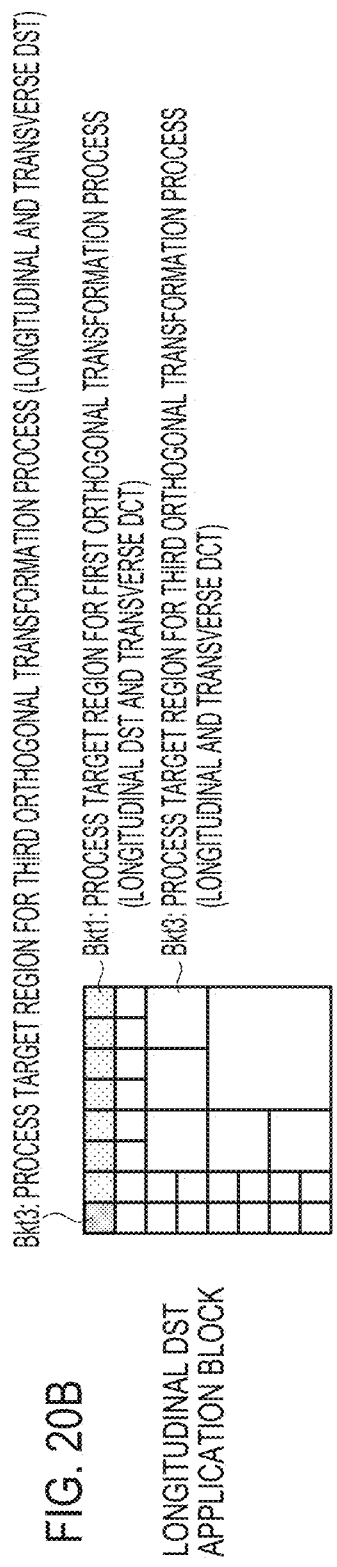
Figure 20C:
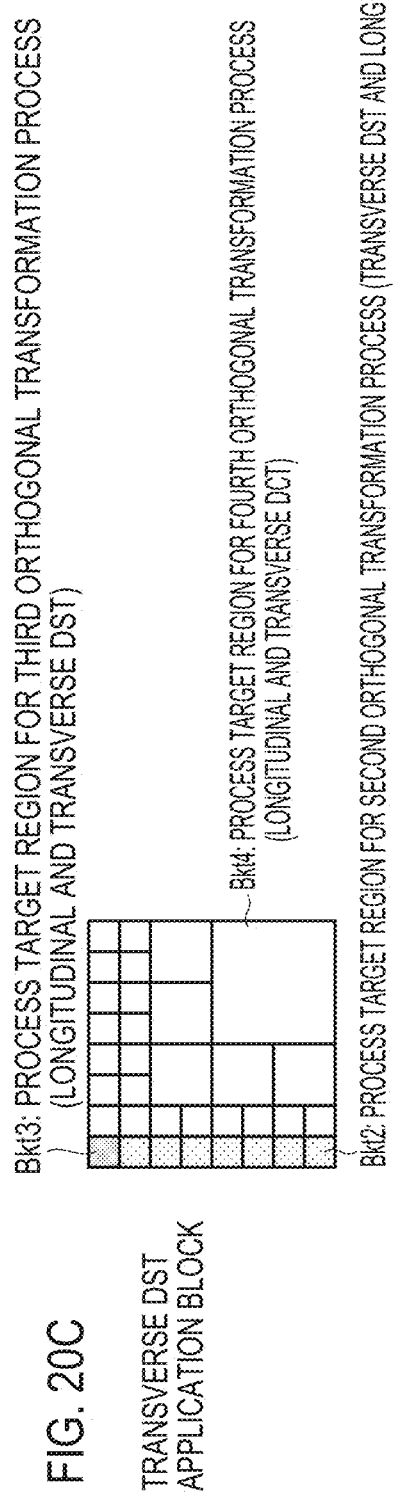

In the example illustrated in FIG. 19B, an example of dividing the block of the prediction residual signal for the block Bkp of the predicted image including the 8×8 pixel signal p into four blocks (upper left, upper right, lower left, and lower right) of the 4×4 prediction residual signal is illustrated, but the divided blocks (divided blocks located at the upper end and the left end in the present example) at positions neighboring to the decoded neighboring signal in the block of the prediction residual signal corresponding to the block of the predicted image having a block size larger than a size (8×8 in the present example), which is doubled in the longitudinal and transverse directions with respect to a predetermined specified block size (4×4 in this example), are assumed that the block size is specified (4×4 in this example), and the other blocks are divided so that the block size is as large as possible, and it is preferable to perform re-division appropriately according to the feature of the image to be encoded. For example, depending on the characteristics of the image to be encoded, as illustrated in FIG. 20A, the divided blocks located at the upper end and the left end of the block of the prediction residual signal of the block size of 32×32 is 4×4, and it can be divided so as to become a divided block of a block size enlarged as it goes away from the upper end and the left end. By performing the block division in this manner, the orthogonal transformation selection applier 142 in the latter stage can select and apply the orthogonal transformation suitable for the signal characteristics with respect to the divided blocks of the prediction residual signal including the smoothing filter process target pixel position.

For example, as illustrated in FIG. 20A, if the pixel to which the smoothing filter process is applied is on the uppermost side (that is, if the application direction of the smoothing filter process is the vertical direction) among the divided blocks of the divided prediction residual signal, the orthogonal transformation selection applier 142 applies the first orthogonal transformation process in the longitudinal DST and the transverse DCT to the divided block Bkt1 of the prediction residual signal located on the uppermost side (see FIG. 20B), and if the pixel to which the smoothing filter process is applied is on the leftmost side (that is, if the application direction of the smoothing filter process is the horizontal direction), the orthogonal transformation selection applier 142 applies the second orthogonal transformation process in the transverse DST and the longitudinal DCT to the divided block Bkt2 of the prediction residual signal located on the leftmost side (see FIG. 20C), Then, if the pixel to which the smoothing filter process is applied is the uppermost side and is the leftmost side (that is, if the application direction of the smoothing filter process is the application direction of the angular filter process), the third orthogonal transformation process in the longitudinal and transverse DST's is applied to the divided block Bkt3 located in the corner region. In addition, for the divided block Bkt4 of the prediction residual signal having no pixel to which the smoothing filter process is applied, the fourth orthogonal transformation process of DCTs is applied in the vertical and transverse directions. Even in the case of the block division as illustrated in FIG. 19B, the orthogonal transformation process is similarly performed. This makes it possible to handle transformation coefficients that maximize the high correlation of the blocks of the decoded neighboring signals.

Next, the inter-predictor 11a based on the inter-prediction will be described as a representative example of the neighboring pixel non-reference predictor 11, and a configuration and an operation example of the image encoding device 1 that performs the filter process on the prediction signal of the block of the predicted image by the filter processor 12 will be described with reference to FIGS. 21 to 23.

Figure 21:
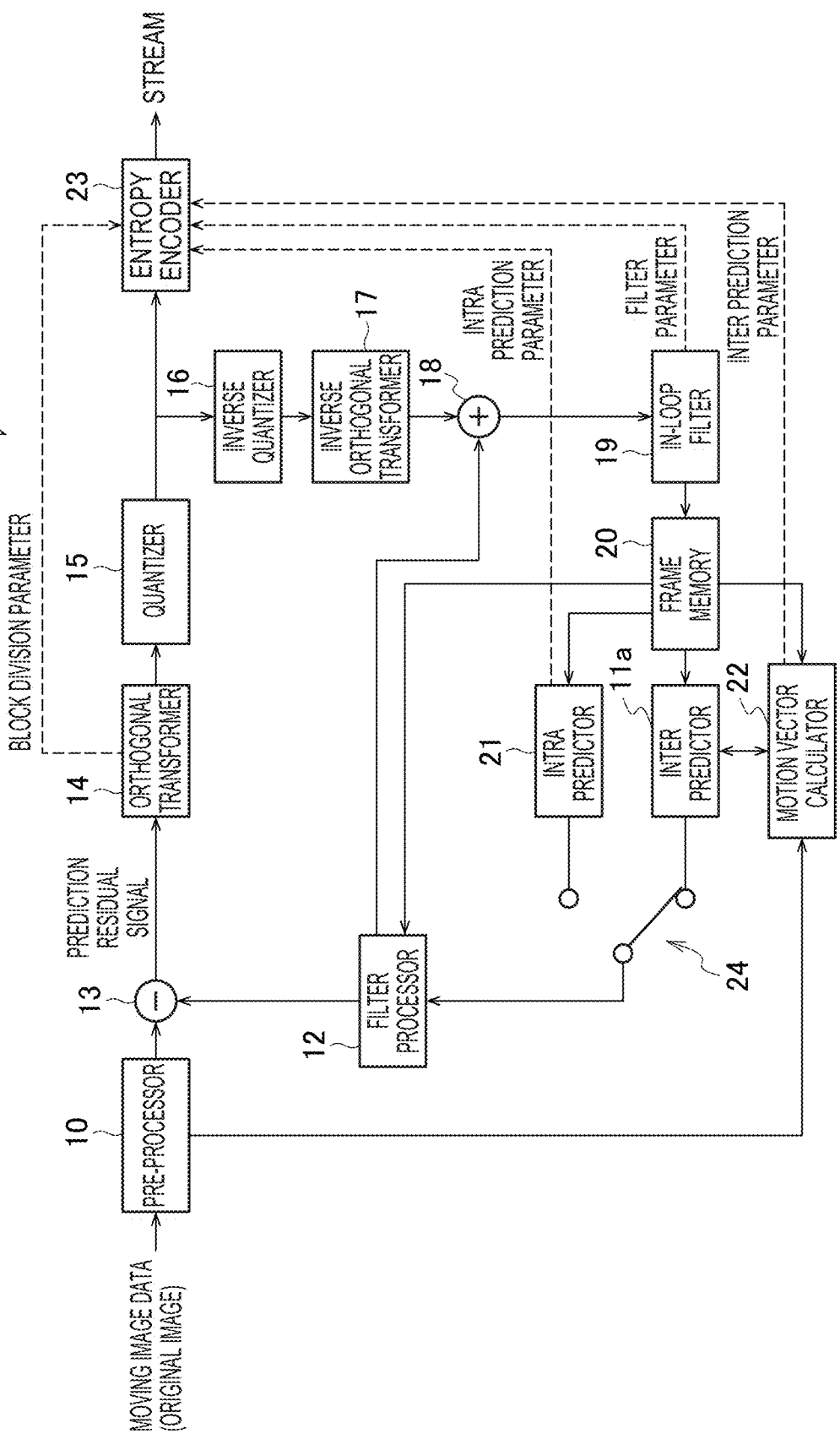
FIG. 21 is a block diagram illustrating an example of the image encoding device according to the fourth embodiment of the present disclosure.
Figure 22:
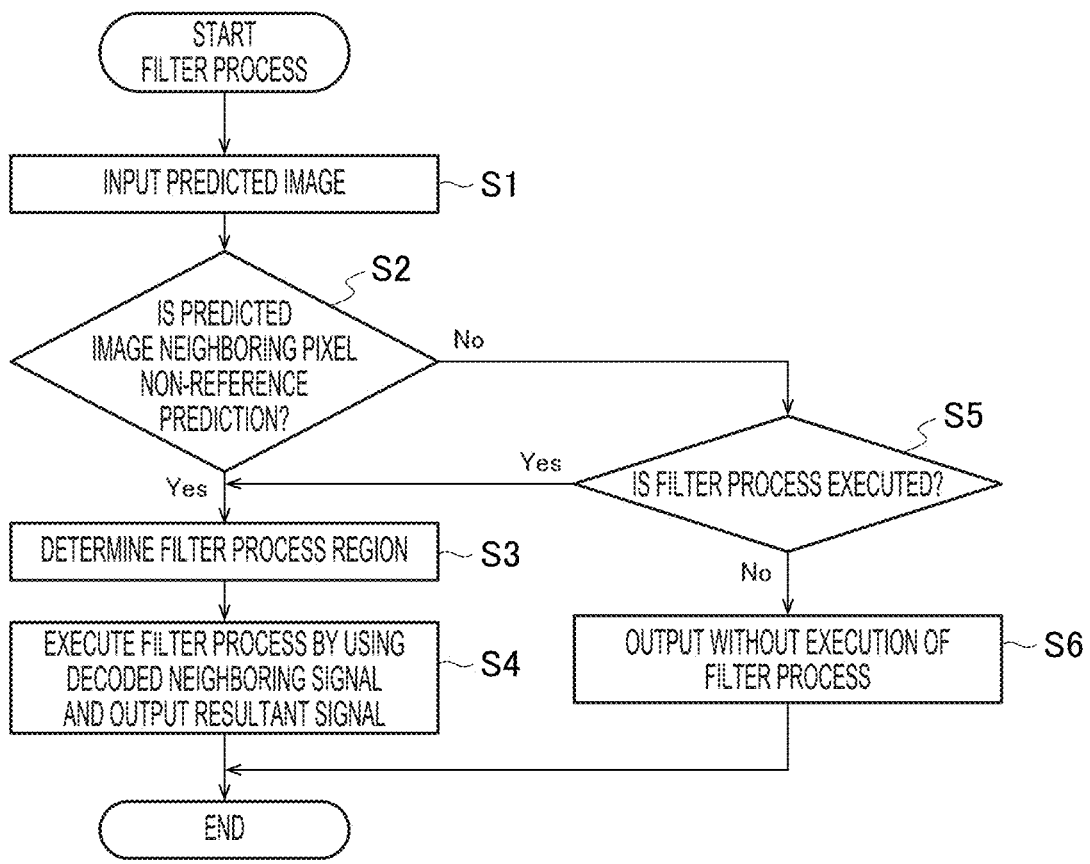
FIG. 22 is a flowchart of the filter process of the predicted image in the image encoding device according to the fourth embodiment of the present disclosure.

FIG. 21 is a block diagram illustrating an example of the image encoding device 1 according to the present embodiment. The image encoding device 1 illustrated in FIG. 21 includes the pre-processor 10, the inter-predictor 11a, the filter processor 12, the prediction residual signal generator 13, the orthogonal transformer 14, the quantizer 15, the inverse quantizer 16, the inverse orthogonal transformer 17, the decoded image generator 18, the in-loop filter 19, the frame memory 20, the intra-predictor 21, the motion vector calculator 22, the entropy encoder 23, and the predicted image selector 24.

The orthogonal transformer 14 performs a predetermined orthogonal transformation process on the prediction residual signal input from the prediction residual signal generator 13, and generates a signal of a transformation coefficient. The orthogonal transformer 14 includes the block divider 141 and the orthogonal transformation selection applier 142. The block divider 141 divides the block of the prediction residual signal input from the prediction residual signal generator 13 into a block shape designated in advance and outputs the same to the orthogonal transformation selection applier 142. For each divided block of the block-divided prediction residual signal, the orthogonal transformation selection applier 142 applies a plurality of types of orthogonal transformation processes (a combination of longitudinal/horizontal DST and horizontal/vertical DCT) according to the position to which the filter process is applied by the filter processor 12. The block division parameter related to these block division process is output to the entropy encoder 23 (and the inverse orthogonal transformer 17) as one of the encoding parameters to be used as additional information of the encoding process.

The inverse orthogonal transformer 17 reconstructs the prediction residual signal by performing an inverse orthogonal transformation process on the inversely quantized transformation coefficient signal obtained from the inverse quantizer 16 and outputs the reconstructed prediction residual signal to the decoded image generator 18. In particular, the inverse orthogonal transformer 17 determines the type of the orthogonal transformation process for the transformation coefficients that have been divided into blocks, as in FIG. 20, performs the inverse orthogonal transformation process corresponding to each orthogonal transformation process, combines each divided block of the prediction residual signal obtained for parallel process to reconfigure a block corresponding to the block size of the predicted image, and outputs the resultant signal to the decoded image generator 18.

An operation example of the filter processor 12 will be described with reference to FIG. 22. As illustrated in FIG. 22, when the predicted image from the intra-predictor 21 or the inter-predictor 11a is input (step S1), the filter processor 12 identifies whether the predicted image is the neighboring pixel non-reference prediction, that is, in this example, identifies whether the predicted image is the inter-prediction based on the signal selection by the predicted image selector 24 (step S2). The same applies to a case where the neighboring pixel non-reference prediction is an intra-block copy prediction or a cross component signal prediction to be described above.

Subsequently, when the filter processor 12 determines that the predicted image is not the neighboring pixel non-reference prediction, that is, that the predicted image is the intra-prediction in this example (step S2: No), the filter processor 12 determines whether or not to perform the filter process by a predetermined processing method (step S5). When the filter process is not performed on the predicted image of the intra-prediction (step S5: No), the filter processor 12 outputs the prediction signal to the prediction residual signal generator 13 without performing the filter process thereon (step S6), On the other hand, when filter process is performed on the predicted image of the intra-prediction (step S5: Yes), the filter processor 12 proceeds to step S3. Since the filter process on the predicted image of the intra-prediction may be performed in the same manner as the currently defined H.265 and is not directly related to the gist of the present disclosure, the description of the step S3 is described as an example that performs the filter process on the predicted image of the inter-prediction.

When the filter processor 12 determines that the predicted image is the neighboring pixel non-reference prediction, that is, the inter-prediction in this example (step S2: Yes), the filter processor 12 extracts a pixel signal of a filter process target region in advance from the predicted image (prediction signal) (step S3). For example, as illustrated in FIG. 19B, the pixel signals (prediction signals) on the leftmost side and the uppermost side of the predicted image among the pixel signals (prediction signals) in the 8×8 predicted image block are defined as a filter process target regions Sf.

Subsequently, the filter processor 12 generates a predicted image including a new prediction signal by performing a low-pass filter process on the pixel signal (prediction signal) of the selected filter process target region by using the decoded signal (the decoded neighboring signal) neighboring on the left side and the upper side of the predicted image, and outputs the generated predicted image to the prediction residual signal generator 13 (step S4).

It should be noted that the filter process by the filter processor 12 may be a low-pass filter process, filter processes other than the smoothing filter may be applied, and the region of the decoded neighboring signal or the weighting factor used for the filter process are not necessarily limited to the example illustrated in FIG. 19B. In addition, the filter type, the filter process target region, and the weighting coefficient, which are related to the filter process performed by the filter processor 12, may be configured to be transmitted as additional information of the encoding process, but need not be transmitted if they are determined in advance between transmission and reception (between encoding and decoding).

By performing the filter process on the predicted image by the filter processor 12 in this way, a signal error occurring between the pixel signals (prediction signals) on the leftmost side and the uppermost side in the predicted image and the neighboring decoded signal is reduced, regardless of the type of the orthogonal transformation process of the orthogonal transformer 14, and it is possible to improve the encoding efficiency of the video.

Next, an operation example of the orthogonal transformer 14 will be described with reference to FIG. 23. As illustrated in FIG. 23, the orthogonal transformer 14 divides the block of the prediction residual signal input from the prediction residual signal generator 13 into block shapes designated in advance by the block divider 141 (step S11). At this time, the block divider 141 sets the divided block of the prediction residual signal located at the upper end and the left end to a predetermined block size (4×4 in this example) for the block of the predicted image of the block size larger than 8×8 (for example, for the predicted image of the block size of 32×32), divides the other blocks into so that the block size is as large as possible, and appropriately performs re-division according to the feature of the image to be encoded.

Subsequently, when the orthogonal transformation process is performed on the divided blocks of the divided prediction residual signal by the orthogonal transformation selection applier 142, the orthogonal transformer 14 determines whether the pixel position to which the filter process by the filter processor 12 is applied is included (that is, whether it is the prediction residual signal of the block including the uppermost or leftmost pixel position of the predicted image) (step S12). When the orthogonal transformer 14 determines that it is not the divided block including the pixel position to which the filter process is applied (step S12: No), the orthogonal transformer 14 applies the fourth orthogonal transformation process of the DCT to the divided blocks of the prediction residual signal in the longitudinal and transverse directions (step S15).

On the other hand, when the orthogonal transformer 14 determines that it is the divided block including the pixel position to which the filter process by the filter processor 12 is applied (step S12: Yes), it is determined whether only the filter process in the vertical direction by the filter processor 12 has been applied (that is, whether it is the prediction residual signal of the block including only the uppermost pixel of the predicted image) (step S13), and when only the filter process in the vertical direction is applied (step S13: Yes), the first orthogonal transformation process of the longitudinal DST and the transverse DCT is applied to the divided blocks of the prediction residual signal (step S16).

Subsequently, when only the filter process in the vertical direction is not applied (step S12: No), it is determined whether only the filter process in the horizontal direction by the filter processor 12 has been applied (that is, whether it is the prediction residual signal of the block including only the leftmost pixel of the predicted image) (step S14), and when only the filter process in the horizontal direction is applied (step S14: Yes), the second orthogonal transformation process of the transverse DST and the longitudinal DCT is applied to the divided blocks of the prediction residual signal (step S17).

When it is determined that the horizontal and vertical filter processes by the filter processor 12 are applied (that is, when it is the prediction residual signal of the block including the uppermost and leftmost pixel positions of the predicted image) (step S14: No), the third orthogonal transformation process of the longitudinal and transverse DSTs is applied to the divided block of the prediction residual signal (step S18).

Figure 23:
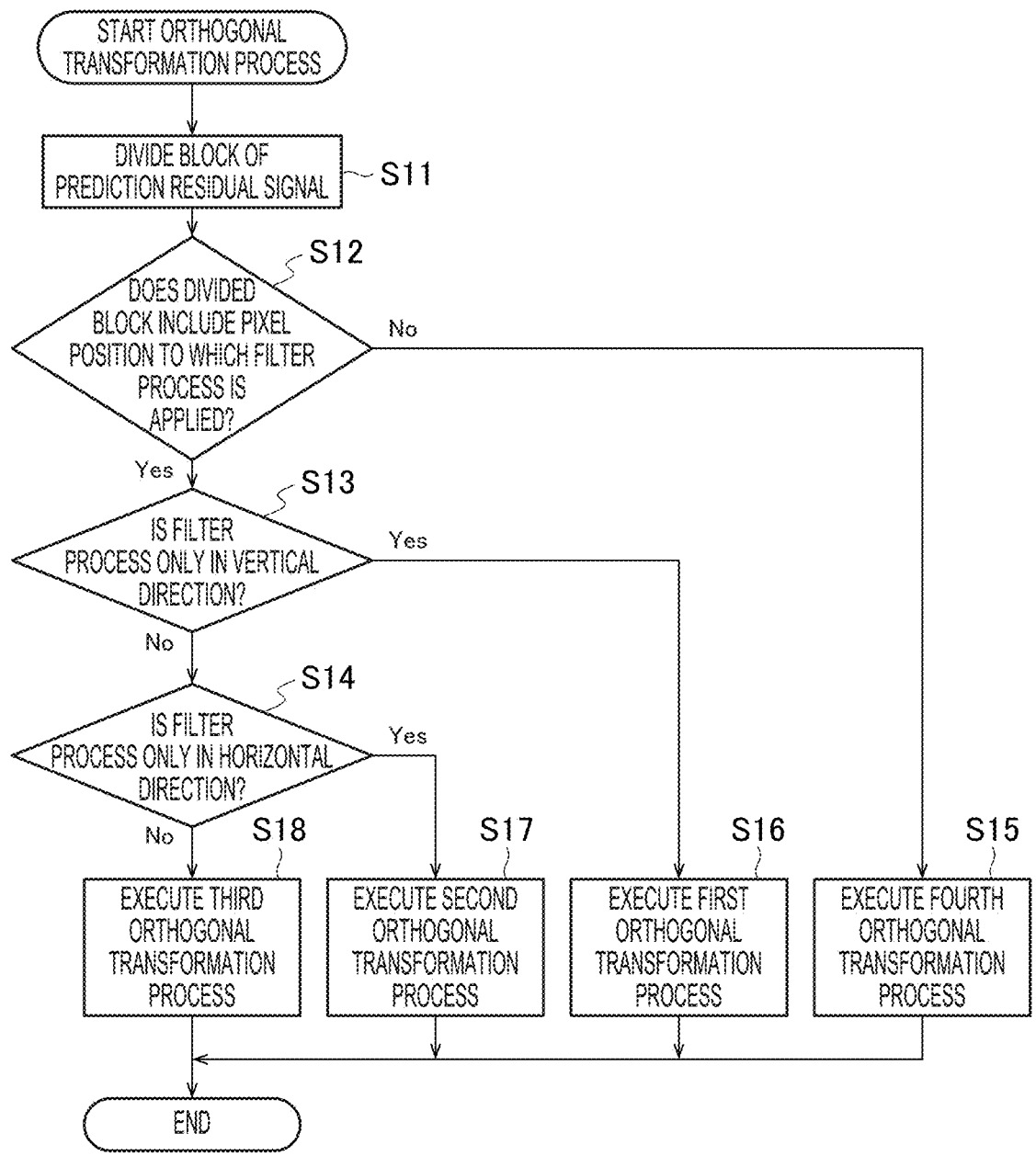
FIG. 23 is a flowchart of an orthogonal transformation process in the image encoding device according to the fourth embodiment of the present disclosure.

In FIG. 23, it has been described that the orthogonal transformation process is sequentially performed in order to enhance the understanding of the processing contents, but parallel processing can be performed on the implementation. This makes it possible to handle transformation coefficients that maximize the high correlation of the blocks of the decoded neighboring signals.

Image Decoding Device

Next, a filter processor 54 and its peripheral functional blocks, which are the main components of the image decoding device 5 according to the present embodiment of the present disclosure, will be described with reference to FIG. 24, and a specific typical example of the image decoding device 5 will be described with reference to FIG. 25.

Figure 24:
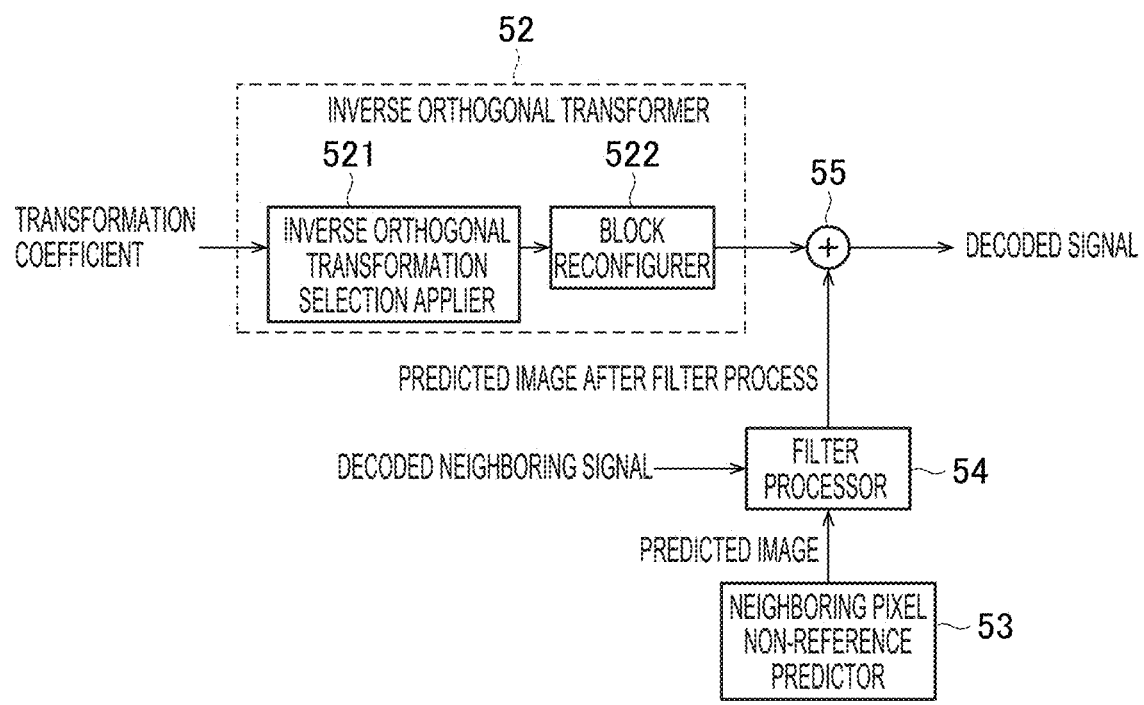
FIG. 24 is a block diagram of the periphery of the filter processor related to the predicted image in an image decoding device according to the fourth embodiment of the present disclosure.

FIG. 24 is a block diagram of the periphery of the filter processor 54 with respect to the predicted image in the image decoding device 5 according to the present embodiment. As illustrated in FIG. 24, the image decoding device 5 according to the present embodiment includes an inverse orthogonal transformer 52, a neighboring pixel non-reference predictor 53, a filter processor 54, and a decoded image generator 55. The inverse orthogonal transformer 52 includes an inverse orthogonal transformation selection applier 521 and a block reconfigurer 522.

The inverse orthogonal transformer 52 receives the stream signal transmitted from the image encoding device 1 side, performs an inverse orthogonal transformation process on transformation coefficients reconstructed through a entropy decoding process and an inverse quantization process, and outputs the obtained prediction residual signal to the decoded image generator 55. In particular, the inverse orthogonal transformer 52 includes an inverse orthogonal transformation selection applier 521 and a block reconfigurer 522. The inverse orthogonal transformation selection applier 521 determines the type of the orthogonal transformation process as in FIG. 23 for the transformation coefficients block-divided by the image encoding device 1 side, performs the inverse orthogonal transformation process corresponding to the orthogonal transformation process in the image encoding device 1, and outputs the divided block of the prediction residual signal to the block reconfigurer 522. The block reconfigurer 522 reconstructs a block corresponding to the block size of the predicted image by connecting the divided blocks of the prediction residual signal obtained for parallel processing, and outputs the block to the decoded image generator 55.

Next, the inter-predictor 53a based on the inter-prediction will be described as a representative example of the neighboring pixel non-reference predictor 53, and a configuration and an operation example of the image decoding device 5 that performs the filter process on the prediction signal based on the inter-prediction by the filter processor 54 will be described with reference to FIG. 25.

Figure 25:
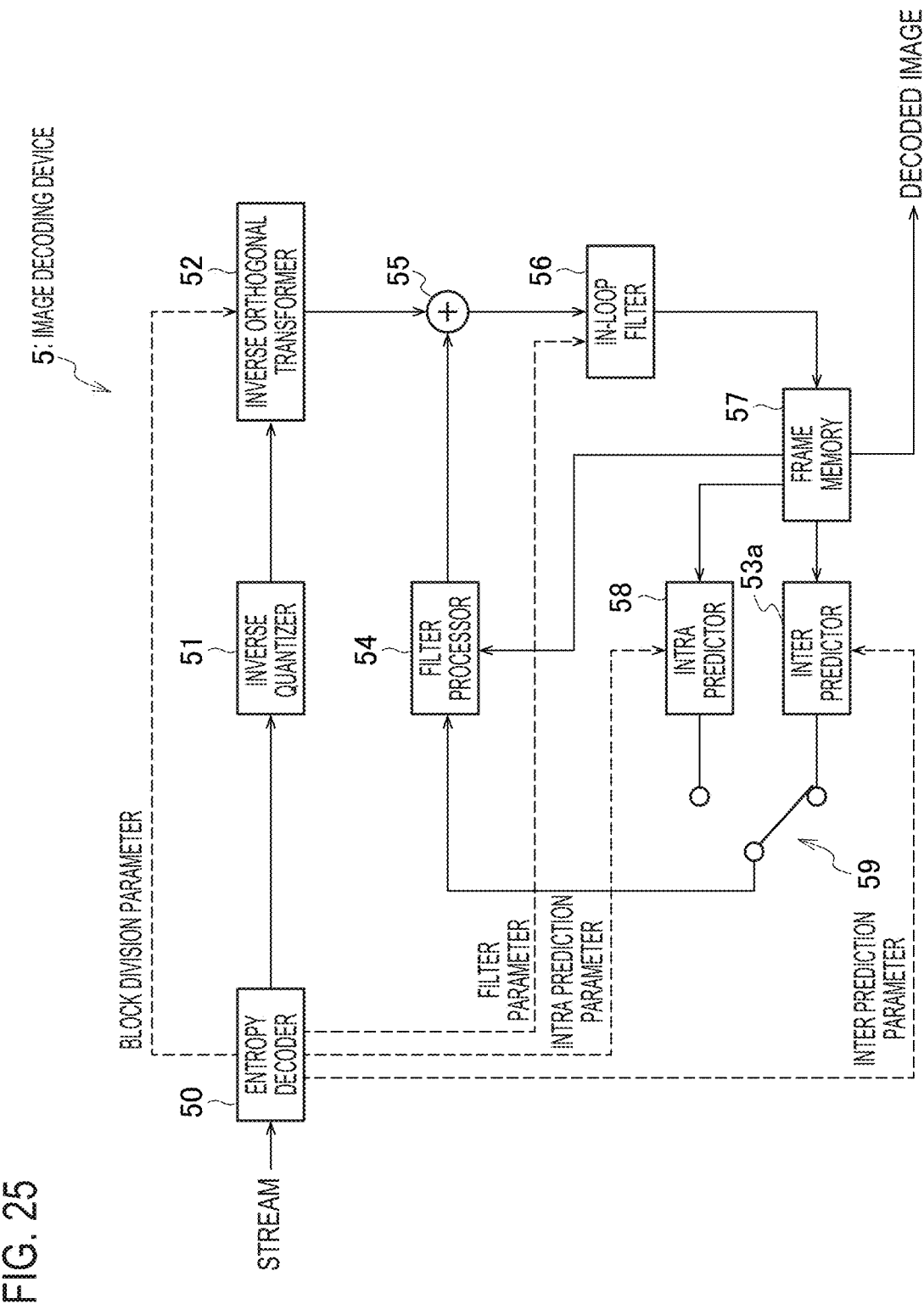
FIG. 25 is a block diagram illustrating an example of the image decoding device according to the fourth embodiment of the present disclosure.

FIG. 25 is a block diagram illustrating an example of the image decoding device 5 according to the present embodiment. The image decoding device 5 illustrated in FIG. 25 includes an entropy decoder 50, an inverse quantizer 51, an inverse orthogonal transformer 52, an inter-predictor 53a, a filter processor 54, a decoded image generator 55, an in-loop filter 56, a frame memory 57, an intra-predictor 58, and a predicted image selector 59.

The inverse orthogonal transformer 52 reconstructs the prediction residual signal by performing an inverse orthogonal transformation process corresponding to the orthogonal transformation process of the image encoding device 1 to the transformation coefficient obtained from the inverse quantizer 51, and outputs the reconstructed prediction residual signal to the decoded image generator 55. In particular, the inverse orthogonal transformer 52 includes an inverse orthogonal transformation selection applier 521 and a block reconfigurer 522. The inverse orthogonal transformation selection applier 521 performs the inverse orthogonal transformation process to the transformation coefficients block-divided by the image encoding device 1, and outputs the divided block of the prediction residual signal to the block reconfigurer 522. The block reconfigurer 522 constructs a block corresponding to the block size of the predicted image by connecting the divided blocks of the prediction residual signal obtained for parallel processing, and outputs the block to the decoded image generator 55.

The filter processor 54 operates in the same manner as that illustrated and described with reference to FIG. 22. That is, the filter process according to the present disclosure in the filter processor 54 is performed when the predicted image is the neighboring pixel non-reference prediction, that is, in this example, when it is the inter-prediction, the pixel signal (prediction signal) of the predetermined filter process target region is selected from the predicted image, a predicted image including a new prediction signal is generated by performing a low-pass filter process on the pixel signal (prediction signal) of the selected filter process target region by using decoded signals (decoded neighboring signals) neighboring on the left side or the upper side of the predicted image, and is output to the decoded image generator 55. For example, as illustrated in FIG. 19B, the filter processor 54 performs a smoothing filter process with a predetermined weighting factor for each of the horizontal filter region, the vertical filter region, and the angular filter region in the filter process target region Sf among the pixel signals (prediction signals) in the block Bkp of the predicted image by using the decoded neighboring signal So around the block boundary of the block Bkp of the predicted image, and outputs the resultant signal to the decoded image generator 55.

According to the image encoding device 1 and the image decoding device 5 of the present embodiment configured as described above, since a signal error occurring between the prediction signal of the predicted image and the neighboring decoded block signal is reduced and the encoding efficiency is improved, it is possible to realize an image encoding device and an image decoding device of a video encoding method with high encoding efficiency. That is, the residual component in the prediction residual signal can be made smaller, and the encoding efficiency can be improved by reducing the amount of information to be encoded and transmitted.

Fifth Embodiment

Next, the periphery of filter processors 12 and 54 in the image encoding device 1 and the image decoding device 5 according to a fifth embodiment of the present disclosure will be described with reference to FIG. 26. In the filter processors 12 and 54 of the fourth embodiment, an example that generates the predicted image including the new prediction signal by performing the low-pass filter process on the prediction signal by using only the decoded signals (decoded neighboring signals) neighboring to the left side and the upper side of the predicted image, among the pixel signals (prediction signals) in the block of the predicted image generated by the neighboring pixel non-reference prediction has been described.

On the other hand, the filter processors 12 and 54 of the present embodiment acquire a locally decoded image for each divided block based on the block division process of the block divider 141, replaces the pixel signal (prediction signal) in the block of the predicted image generated by the neighboring pixel non-reference prediction whenever the locally decoded image is acquired, and performs a low-pass filter process according to each block size by using the decoded signal (decoded neighboring signal) neighboring on the left side and the upper side of the predicted image among pixel signals (prediction signals) in the replaced predicted image block and the locally decoded image for each divided block in the block size unit of the divided block of the prediction residual signal.

Therefore, as illustrated in FIGS. 26A and 26B, the filter processors 12 and 54 acquire a locally decoded image for each divided block based on the block division process of the block divider 141, update the predicted image by replacing the pixel signal (prediction signal) in the block of the predicted image generated by the neighboring pixel non-reference prediction whenever the locally decoded image is acquired, and perform a low-pass filter process according to each block size by using the decoded signal (decoded neighboring signal) neighboring to the left side and the upper side of the updated predicted image and the locally decoded image of each divided block. That is, the filter processors 12 and 54 are different from the configurations illustrated in FIGS. 19A and 24, but the other components operate in the same manner.

As an example of the operation, unlike the configuration illustrated in FIG. 24, the block reconfigurer 522 in the inverse orthogonal transformer 52 illustrated in FIG. 26B complements the region other than the divided block to be processed with dummy data when reconfiguring the block size corresponding to the predicted image by determining the position of the divided block to be processed. This makes it possible to obtain a locally decoded image for each divided block. Alternatively, another loop may be configured so that a locally decoded image for each divided block can be obtained. Therefore, the inverse orthogonal transformer 17 in the image encoding device 1 of the present embodiment may be configured similarly to the inverse orthogonal transformer 52 in the present embodiment. It should be noted that the same applies to the fourth embodiment, but the frame memory 20 can hold the locally decoded image of each divided block so as to be used as a reference signal.

Figure 27:
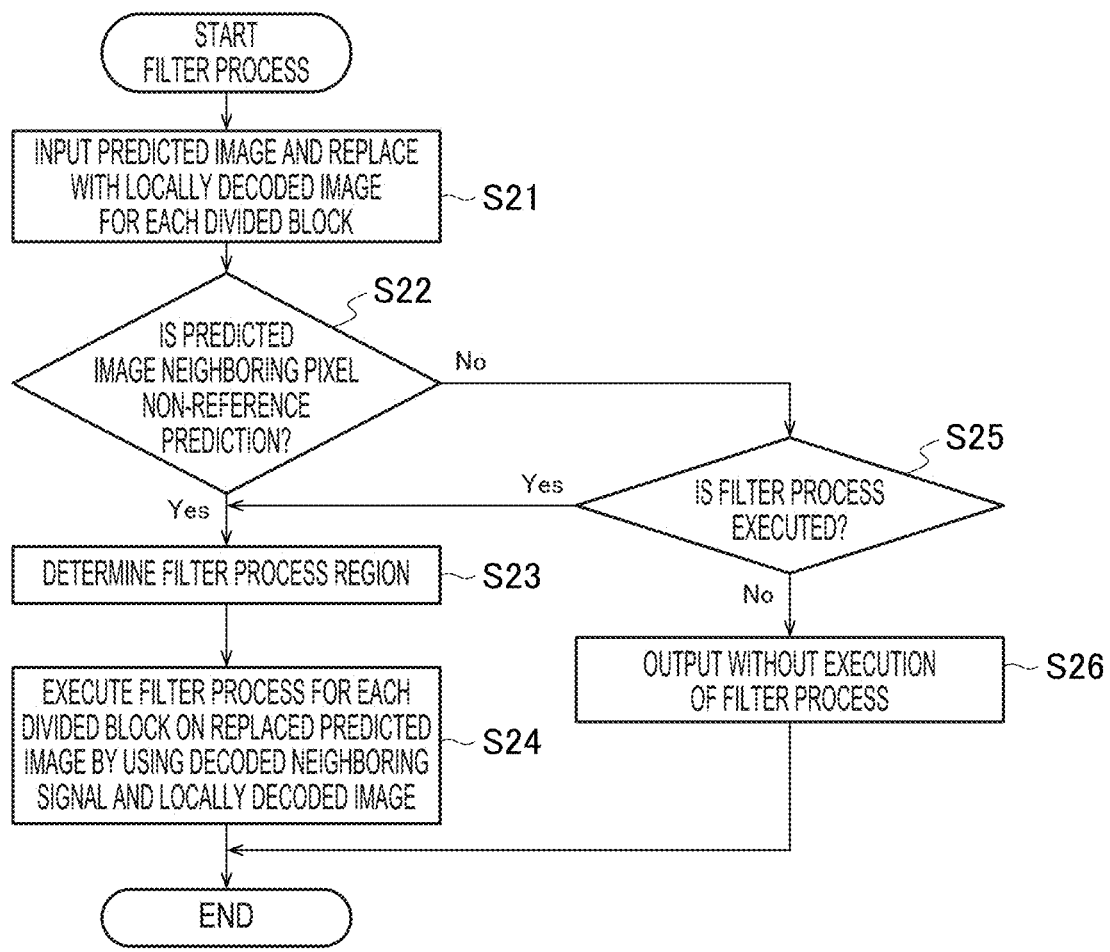
FIG. 27 is a flowchart of a filter process of a predicted image in the image encoding device or the image decoding device according to the fifth embodiment of the present disclosure.
Figure 28:
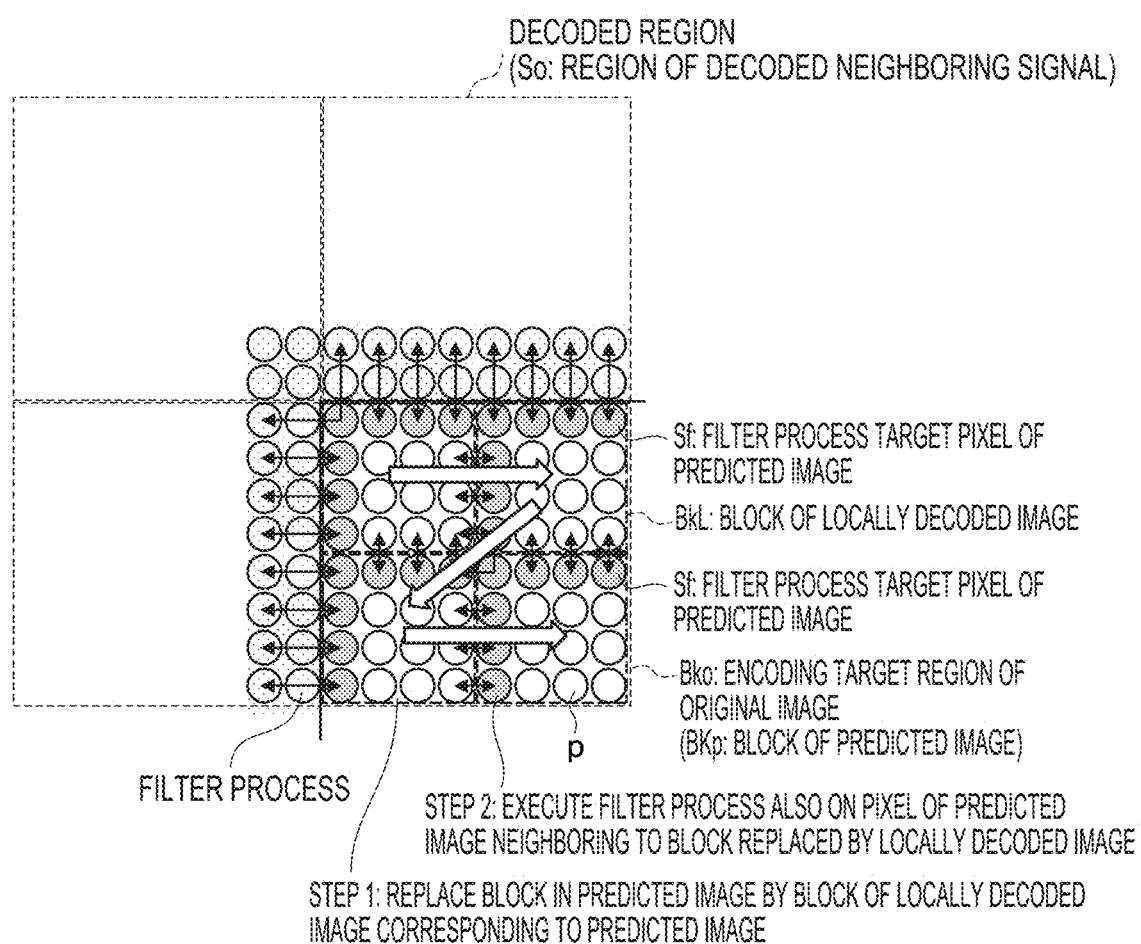
FIG. 28 is an explanatory diagram of the filter process of the predicted image in the image encoding device or the image decoding device according to the fifth embodiment of the present disclosure.

FIG. 27 is a flowchart of the filter processes 12 and 54 of the predicted image in the image encoding device 1 or the image decoding device 5 according to the present embodiment. In addition, FIG. 28 is an explanatory diagram of the filter processes 12 and 54 of the predicted image in the image encoding device 1 or the image decoding device 5 according to the present embodiment.

First, when the predicted image is input, the filter processors 12 and 54 acquire a locally decoded image for each divided block based on the block division process of the block divider 141, replace the locally decoded image with a predicted image, and generate an updated predicted image (step S21). For example, as illustrated in FIG. 28, the block Bkp of the 8×8 predicted image is sequentially replaced with the block BkL of the locally decoded image of the block size divided by four in the order indicated by outlined arrows and updated, for example, but the following process indicates the operation when the predicted image is updated with the locally decoded image for each one of the divided blocks (for example, "STEP 1" illustrated in the drawing).

Subsequently, the filter processors 12 and 54 determine whether the predicted image is the neighboring pixel non-reference prediction, for example, whether it is the inter-prediction (step S22). The same applies to a case where the neighboring pixel non-reference prediction is an intra-block copy prediction or a cross component signal prediction to be described above.

Subsequently, when the filter processors 12 and 54 determine that the predicted image is not the neighboring pixel non-reference prediction, for example, that the predicted image is the intra-prediction in this example (step S22: No), the filter processors 12 and 54 determine whether or not to perform the filter process by a predetermined processing method (step S25). When the filter process is not performed on the predicted image of the intra-prediction (step S25: No), the filter processors 12 and 54 output the prediction signal to the prediction residual signal generator 13 or the decoded image generator 55 without performing the filter process thereon (step S26). On the other hand, when filter process is performed on the predicted image of the intra-prediction (step S25: Yes), the filter processors 12 and 54 proceed to step S23. Since the filter process on the predicted image of the intra-prediction may be performed in the same manner as the currently defined H.265 and is not directly related to the gist of the present disclosure, the description of the step S23 is described as an example that performs the filter process on the predicted image of the inter-prediction.

When the filter processors 12 and 54 determine that the predicted image is the neighboring pixel non-reference prediction, that is, the inter-prediction in this example (step S22: Yes), the filter processors 12 and 54 extracts a pixel signal of a filter process target region in advance from the predicted image (prediction signal) (step S23). For example, as illustrated in FIG. 28, the pixel signals (prediction signals) on the leftmost side and the uppermost side with respect to the neighboring signal are determined as the filter process target region Sf in units of 4×4 divided blocks.

Subsequently, the filter processors 12 and 54 generate a predicted images including a new prediction signal by performing a low-pass filter process on the pixel signal (prediction signal) of the selected filter process target region by using the decoded signal (decoded neighboring signal) neighboring to the left side and/or the upper side for each divided block for the predicted image replaced by the locally decoded image of the divided block and the locally decoded image, and outputs the generated predicted image to the prediction residual signal generator 13 and the decoded image generator 55 (step S24).

In this manner, by performing the low-pass filter process by using the decoded signal (decoded neighboring signal) neighboring to the left side and/or the upper side of the predicted image and the locally decoded image neighboring to the left side and/or the upper side for each divided block, for example, the pixel signal of the block Bkp of the 8×8 predicted image is smoothed not only at the upper side and the left side but also at the boundary position of the divided block which is the cross-shape in this example (for example, "STEP 2" in the drawing), as illustrated in FIG. 28.

By configuring the filter processors 12 and 54 as in the present embodiment and applying the filter processors 12 and 54 to the image encoding device 1 and the image decoding device 5, respectively, it is possible to improve the encoding efficiency and suppress the deterioration of the image quality caused by this. In particular, even in the signal of the divided block other than the divided block located on the leftmost side or the uppermost side of the predicted image which can be a prediction residual signal of a large value (the block located inside the predicted image when dividing the block), it is possible to reduce the values of the leftmost and the uppermost prediction residual signals for each divided block.

In the example of the present embodiment, since all the divided blocks include pixel positions as the filter process targets, DST in the longitudinal direction or the transverse direction is always applied. Therefore, in the example of the present embodiment, as in the fourth embodiment, as for the block shape upon block division, the divided block located at the upper end and the left end in the block of the corresponding prediction residual signal is set to the predetermined block size (4×4 in this example), and it is preferable to perform re-division appropriately according to the feature of the image to be encoded after the other blocks are divided so that the block size is as large as possible. It is unnecessary to divide the block size so as to have an enlarged block size as it goes away from the upper end and the left end thereof, all are divided up to a prescribed size (4×4 in this example) that can be applied with DST, and DST can be applied according to the processing order as illustrated in FIG. 23.

In addition, when comparing the fourth embodiment with the present embodiment, in the fourth embodiment, since each divided block of the prediction residual signal can be processed independently, there is an advantage that parallel processing is possible. In the present embodiment, since locally decoded images in divided block units can be used sequentially, it is expected that the encoding efficiency can be further improved.

In addition, since the block shape of the block division can be variably set for each encoding target block and the block division parameter can be transmitted as one of the encoding parameters, the fourth embodiment and the present embodiment may be combined.

The image encoding device 1 and the image decoding device 5 of each embodiment can function as a computer, and a program for realizing the respective components according to the present disclosure can be stored in a memory installed internally or externally to the computer. Under control of a central processing unit (CPU) or the like provided in the computer, a program in which processing contents for realizing the function of each component are written can be read from a memory as appropriate, and the functions of the respective components of the image encoding device 1 and the image decoding device 5 of each embodiment can be realized by the computer. Here, the function of each component may be realized as a part of hardware.

Although the present disclosure has been described by way of examples of specific embodiments, the present disclosure is not limited to the above-described examples, and various modifications can be made without departing from the technical idea thereof. For example, in the examples of the above-described embodiments, the example in which the block sizes of the encoding target region, the predicted image, and the orthogonal transformation process target are the same has been described, but the same applies to a case where the block size of the predicted image is smaller than the encoding target region, or a case where the block size of the orthogonal transformation process target is smaller than the predicted image. In addition, the same as the orthogonal transformation process may be used according to use, or another orthogonal transformation process may be used.

In addition, in the example of each above-described embodiment, the example in which the image decoding device 5 decodes the transformation coefficients related to the prediction residual signal encoded based on the predicted image subjected to the filter process by the corresponding image encoding device 1 as a target has been described, the image decoding device 5 according to the present disclosure can also decode a signal encoded without a filter process by the same process in the applications where the decompression accuracy of the block end for the original image is not considered.

INDUSTRIAL APPLICABILITY

According to the present disclosure, it is possible to realize an image encoding device and an image decoding device using a video encoding method with high encoding efficiency, it is useful for improving the encoding efficiency of the video transmission.

What is claimed is:

1. An image decoding device for decoding a signal encoded by block-dividing a frame constituting a moving image, the image decoding device comprising:
 a predictor circuitry configured to generate an inter predicted block corresponding to a decoding target block by an inter prediction that performs signal prediction for each pixel signal of the decoding target block;
 a weighted average filter processor configured to perform a weighted average filter process to the inter predicted block before performing a block configuring process that generates a decoded block, wherein the weighted average filter processor is configured to modify the inter predicted block by using weighting factors and decoded neighboring pixels neighboring to the inter predicted block;
 an inverse orthogonal transformer comprising:
  an inverse transformation selection applier circuitry configured to selectively apply a plurality of types of inverse transformation processes according to a sub-block division to transformation coefficients of a prediction residual block that has been sub-block-divided by an image encoding side, and to generate a sub-block of the prediction residual block; and
  a block reconfigurer circuitry configured to perform the block configuring process that generates the decoded block corresponding to the decoding target block based on the sub-block of the prediction residual block; and
 the image decoding device further comprises a decoded image generator configured to generate and output the decoded block by receiving, as inputs: the inter predicted block and an output of the block reconfigurer circuitry.

2. An image decoding method for decoding a signal encoded by block-dividing a frame constituting a moving image, the image decoding method comprising:
 generating an inter predicted block corresponding to a decoding target block by an inter prediction that performs signal prediction for each pixel signal of the decoding target block;
 performing a weighted average filter process to the inter predicted block before performing a block configuring process that generates a decoded block, wherein the weighted average filter process is configured to modify the inter predicted block by using weighting factors and decoded neighboring pixels neighboring to the inter predicted block;
 selectively applying, by an inverse orthogonal transformer, a plurality of types of inverse transformation processes according to a sub-block division to transformation coefficients of a prediction residual block that has been sub-block-divided by an image encoding side, and generating a sub-block of the prediction residual block;
 performing, by the inverse orthogonal transformer, the block configuring process that generates the decoded block corresponding to the decoding target block based on the sub-block of the prediction residual block; and
 generating the decoded block by using, as inputs: the inter predicted block and an output of the block configuring process.

* * * * *